United States Patent
Bakke

(10) Patent No.: US 12,129,707 B2
(45) Date of Patent: Oct. 29, 2024

(54) DOOR PEEPHOLE VIEWER CAMERA WITH WIRELESS CONNECTIVITY

(71) Applicant: Erik Bakke, Seattle, WA (US)

(72) Inventor: Erik Bakke, Seattle, WA (US)

(*) Notice: Subject to any disclaimer, the term of this patent is extended or adjusted under 35 U.S.C. 154(b) by 248 days.

(21) Appl. No.: 17/551,181

(22) Filed: Dec. 15, 2021

(65) Prior Publication Data

US 2022/0217307 A1 Jul. 7, 2022

Related U.S. Application Data

(60) Provisional application No. 63/125,402, filed on Dec. 15, 2020.

(51) Int. Cl.
| | | |
|---|---|---|
| *E06B 7/30* | (2006.01) | |
| *H04N 7/18* | (2006.01) | |
| *H04N 23/51* | (2023.01) | |
| *H04N 23/57* | (2023.01) | |
| *H04N 23/54* | (2023.01) | |

(52) U.S. Cl.
CPC ............... *E06B 7/30* (2013.01); *H04N 7/186* (2013.01); *E06B 2007/305* (2013.01); *H04N 23/51* (2023.01); *H04N 23/54* (2023.01)

(58) Field of Classification Search
CPC ..... E06B 7/30; E06B 2007/305; H04N 23/51; H04N 23/54; H04N 23/57; H04N 7/18; H04N 7/186; H04N 23/90; H04N 23/64; H04N 7/188; G06F 2218/12; G06V 20/52; G06V 10/82; G06V 40/10; G07C 9/00182; G07C 9/00563; G07C 9/00571; G07C 9/00896; G07C 9/00904
See application file for complete search history.

(56) References Cited

U.S. PATENT DOCUMENTS

| | | | |
|---|---|---|---|
| 9,912,920 B2* | 3/2018 | Chuter | H04N 7/186 |
| 11,501,618 B1* | 11/2022 | Siminoff | H04N 23/56 |
| 11,501,619 B2* | 11/2022 | Cherney | G08B 21/02 |
| 2006/0221183 A1* | 10/2006 | Sham | H04N 7/186 |
| | | | 348/143 |
| 2014/0028866 A1* | 1/2014 | Miyachi | H04N 23/661 |
| | | | 348/E5.042 |
| 2016/0050399 A1* | 2/2016 | Chuter | H04N 7/186 |
| | | | 348/155 |
| 2017/0048495 A1* | 2/2017 | Scalisi | H04L 12/2803 |

* cited by examiner

*Primary Examiner* — Ahmed A Berhan

(57) ABSTRACT

Assemblies, sensors, methods of attachment, communication networks, and operational processes of a door-mounted camera apparatus for use with a door's peephole viewer. Some embodiments include a door bracket for attaching the camera apparatus to the door using removable adhesive or embedded magnets. Embodiments may include a movable mirror assembly which may be operated by a hand or by electrically powered mechanical actuator. Some embodiments include a peephole viewer apparatus with integrated sensors. Embodiments can include a digital display for viewing the camera's video output. Some embodiments can include a wired or wireless external sensor module which may detect whether a person is present in front of the door. Another embodiment includes a key-holder magnet.

15 Claims, 47 Drawing Sheets

DOOR PEEPHOLE VIEWER CAMERA WITH WIRELESS CONNECTIVITY

CROSS-REFERENCE TO RELATED APPLICATIONS

This application claims the benefit of Provisional Patent Application Ser. No. 63/125,402, filed on Dec. 15, 2020, which is entirely incorporated herein by reference.

TECHNICAL FIELD

The present disclosure relates generally to the field of wireless camera systems for home monitoring. More particularly, the present disclosure relates to assemblies, sensors, methods of attachment, and operational processes of door mounted camera systems intended to be used in conjunction with a door's peephole viewer.

BACKGROUND

Many home entry doors include a peephole viewer mounted in the door, as described in U.S. Pat. No. 4,269,474A to Yasushi Kamimura (1979). In the past decade, video doorbells became affordable and popular as an alternative to peephole viewers.

Video doorbells allow a homeowner or renter to monitor the area around the front entrance to the home. Such video doorbells are convenient for homeowners, but are not conducive to installation in most rental apartment units. Many home owners' associations (HOA) and landlords will not allow residents to install cameras outside of their homes. Such devices provides wireless remote monitoring, alerting the user when a person is present on the other side of the door.

Peephole door viewer camera devices are available from a number of companies. One example is the Ring Peephole Cam (https://ring.com/products/door-peephole-security-camera). Such devices require the user to remove or alter the current peephole viewer using tools, and to install a bulky module over the peephole on both sides of the door. Most of these devices include a camera module with a button, which is mounted on the outside-facing side of the door over the peephole, or next to the door. This makes it obvious to any passer-by that they are potentially being recorded. These devices usually use a low power PIR (passive infrared) sensor to turn the camera on only when activity is detected, in order to maximize battery life. PIR and other proximity sensors cannot operate through opaque materials or glass. Thus, these camera devices must have an enclosure with a camera and PIR sensor which is mounted over the peephole viewer on the outside-facing side of the door.

Although other door peephole viewer camera designs exist, some embodiments in the specification herein have the following advantages:
  (a) The door peephole viewer camera does not require replacing the current peephole viewer.
  (b) It is simpler to install, requiring no tools.
  (c) It is easy to remove.
  (d) The outside-facing side of the door remains unchanged.
  (e) Any passer-by is not alerted to being video-monitored.
  (f) External motion sensors can be added to extend battery life.
  (g) It is portable, for temporary use such as on a hotel room door.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION—FIGS. 1, 2, 3A, 3B, 3C, 4—EMBODIMENT A

Figure 1:
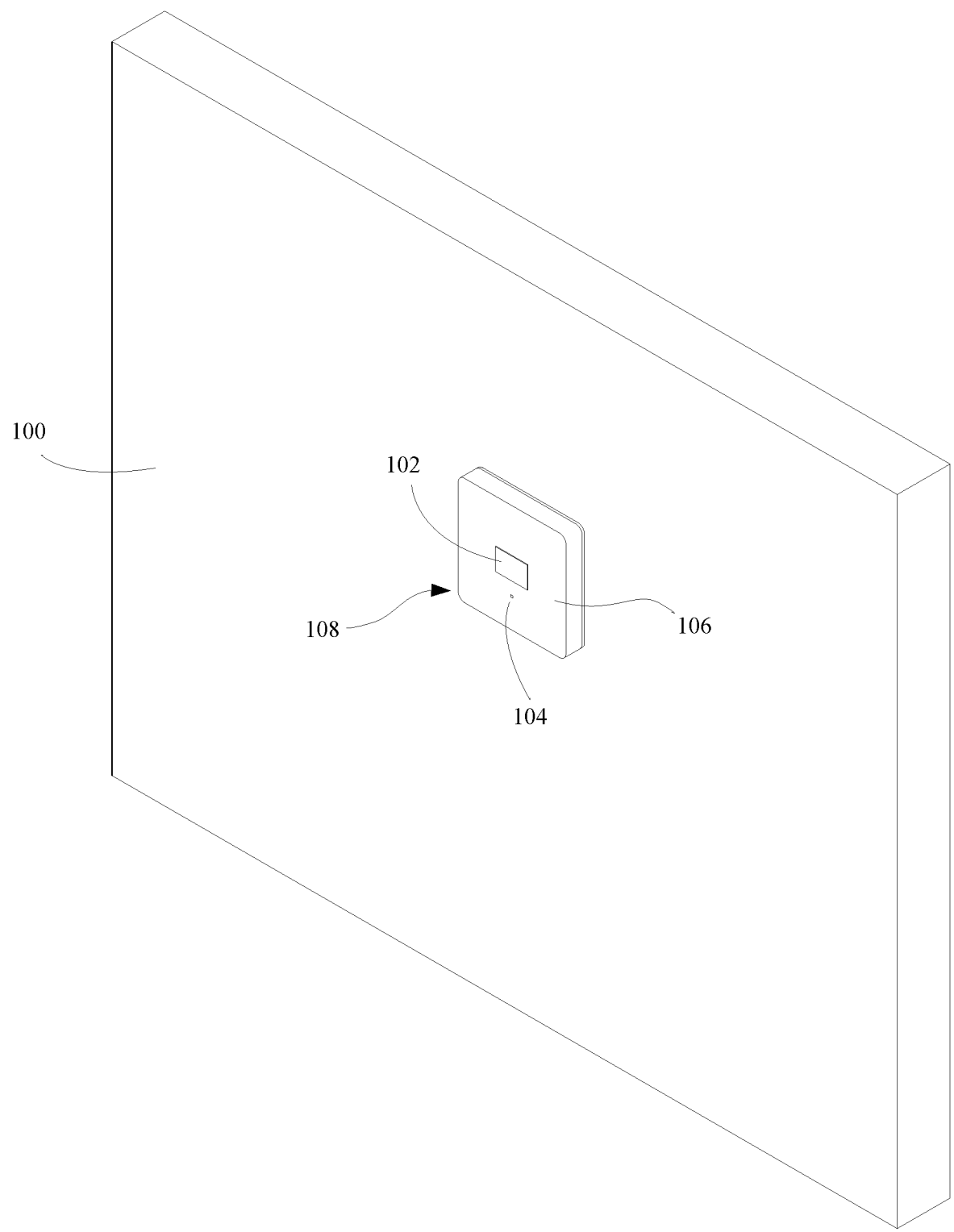
FIG. 1—Embodiment A—isometric view of peephole viewer camera apparatus installed on the door FIG. 2—Embodiment A—isometric view of removable camera apparatus assembly, door bracket assembly installed on the door FIG. 3A—Embodiment A—front view of peephole viewer camera apparatus FIG. 3B—Embodiment A—side cross-section view of peephole viewer camera apparatus installed on the door FIG. 3C—Embodiment A—side cross-section view of camera module FIG. 4 Embodiment A—exploded isometric view of peephole viewer camera apparatus FIG. 4A—Embodiment A—diagram of system components FIG. 4B—Embodiment A—operational flow chart FIG. 4C—Embodiment A—operational flow chart with cloud processing FIG. 4D—Embodiment A—operational flow chart for cloud server FIG. 4E—Embodiment A1—exploded isometric view of door bracket assembly with support ring FIG. 4F—Embodiment A1—front view of door bracket assembly with support ring FIG. 4G—Embodiment A1—exploded isometric view of door bracket assembly with support ring with cutout FIG. 5—Embodiment B—side cross-section view of peephole viewer camera apparatus installed on the door FIG. 6—Embodiment B—exploded isometric view of peephole viewer camera apparatus FIG. 7—Embodiment C—isometric view of peephole viewer camera apparatus as it can be attached to a steel door FIG. 8—Embodiment C—exploded isometric view of peephole viewer camera apparatus FIG. 9—Embodiment C—side cross-section view of peephole viewer camera apparatus installed on the door FIG. 10—Embodiment D—isometric view of peephole viewer camera apparatus with hinge, installed on the door FIG. 11—Embodiment D—front view of peephole viewer camera apparatus with hinge FIG. 12—Embodiment D—exploded isometric view of peephole viewer camera apparatus with hinge FIG. 14—Embodiment D—isometric view of peephole viewer camera apparatus with hinge, opened to show hinge operation FIG. 15—Embodiment E—isometric view of peephole viewer camera apparatus with pivot hinge, installed on the door FIG. 16—Embodiment E—isometric view of peephole viewer camera apparatus with pivot hinge, installed on the door, opened to show hinge operation FIG. 17—Embodiment E—exploded isometric view of peephole viewer camera apparatus with pivot hinge FIG. 18—Embodiment F—exploded isometric view of peephole viewer camera apparatus with internal flip mirror and actuator FIG. 19—Embodiment F—isometric internal view of mirror actuator apparatus only FIG. 20—Embodiment F—isometric internal view of mirror actuator apparatus only, mirror flipped up by actuator FIG. 21—Embodiment F—side cross-section view of peephole viewer camera apparatus with internal flip mirror and actuator FIG. 22—Embodiment F—side cross-section view of peephole viewer camera apparatus with internal flip mirror and actuator, mirror flipped up by actuator FIG. 23—Embodiment G—isometric view of peephole viewer camera apparatus with internal flip mirror and external lever means of actuation FIG. 24—Embodiment G—isometric view of peephole viewer camera apparatus with internal flip mirror and external lever actuated FIG. 25—Embodiment G—isometric internal view of mirror actuator apparatus only FIG. 26—Embodiment G—isometric internal view of mirror actuator apparatus only, mirror flipped up by lever FIG. 27—Embodiment H—isometric view of peephole viewer camera apparatus with external lever, installed on the door FIG. 28—Embodiment H—exploded isometric view of peephole viewer camera apparatus with external lever FIG. 29—Embodiment H—isometric internal view of mirror actuator apparatus only FIG. 30—Embodiment H—isometric internal view of mirror actuator apparatus only, mirror flipped up by lever FIG. 31—Embodiment J—side cross-section view of peephole viewer apparatus with integrated sensors FIG. 32—Embodiment J—side cross-section isolated view of sensor with FFC (flat flexible cable) only FIG. 33—Embodiment J—side cross-section exploded view of peephole viewer apparatus with integrated sensors FIG. 34—Embodiment J—isometric exploded view of peephole viewer apparatus with integrated sensors FIG. 35—Embodiment J—isometric isolated view of sensor with FFC (flat flexible cable) only FIG. 36—Embodiment J—front view of peephole viewer apparatus with integrated sensors FIG. 37—Embodiment J—opaque front view of peephole viewer apparatus with integrated sensors FIG. 38—Embodiment K—exploded view of welcome mat with integrated proximity sensors FIG. 39—Embodiment K—top view of welcome mat with integrated proximity sensors FIG. 40—Embodiment K—side view of welcome mat with integrated proximity sensors FIG. 41—Embodiment L—isometric view of wireless passive infrared proximity sensor module FIG. 42—Embodiment L—exploded isometric view of wireless passive infrared proximity sensor module FIG. 43—Embodiment L—top view of wireless passive infrared proximity sensor module FIG. 44—Embodiment L—side cross-section view of wireless passive infrared proximity sensor module FIG. 45—Embodiment M—isometric view of wireless proximity sensor module FIG. 46—Embodiment M—exploded isometric view of wireless proximity sensor module FIG. 47—Embodiment N—isometric view of wireless proximity sensor module with varied sensor angles FIG. 48—Embodiment N—exploded isometric view of wireless proximity sensor module with varied sensor angles FIG. 49—Embodiment N—top view of wireless proximity sensor module with varied sensor angles FIG. 50—Embodiment N—side cross-section view of wireless proximity sensor module with varied sensor angles FIG. 51—Embodiment P—isometric view of the door hanger sensor apparatus FIG. 52—Embodiment Q—isometric view of the door hanger sensor apparatus with key-holder magnet

FIG. 1 shows an overview of embodiment A in isometric view. Peephole viewer camera apparatus 108 is mounted on door 100. Display 102 is on the front face of camera apparatus front housing 106. Front proximity sensor 104 is also on the front face of housing 106.

Figure 2:
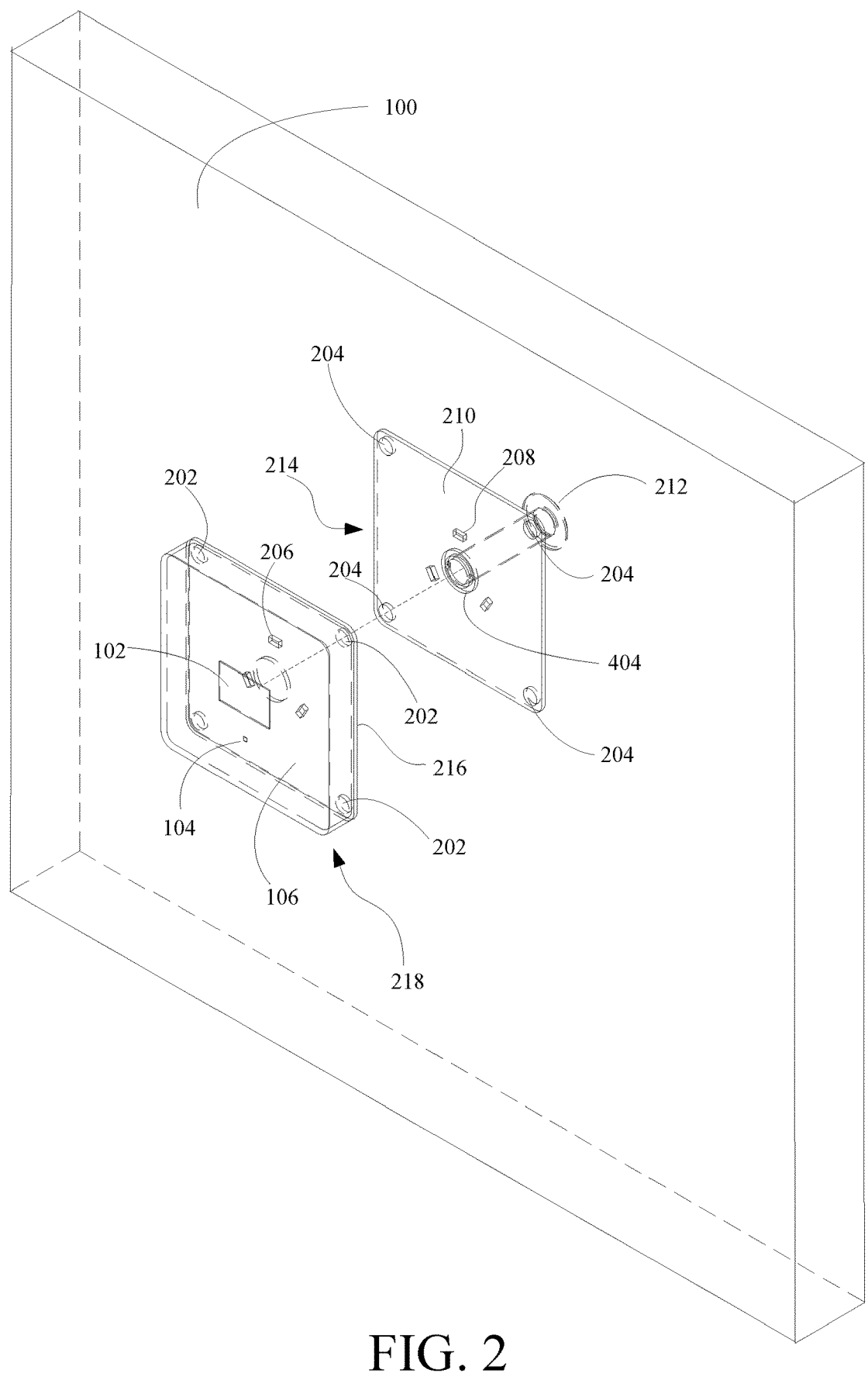

FIG. 2 shows an exploded isometric view of removable camera apparatus assembly 218 and door bracket assembly 214 installed on the door 100. The main structure of door bracket assembly 214 is door bracket 210, which is attached to door 100 by means of removable adhesive tape. The door bracket 210 has a door bracket viewing aperture 404, which is centered on door peephole viewer 212. A door bracket alignment magnet 204 is placed in each corner of the bracket 210. On the surface of bracket 210 is door bracket alignment feature 208. Alignment feature 208 may be a notch or ridge in a known configuration. FIG. 2 depicts the alignment feature 208 as three notches positioned radially in a symmetric pattern surrounding aperture 404.

FIG. 2 also shows removable camera apparatus assembly 218. It includes camera apparatus front housing 106, which is rigidly attached to housing lid 216. A housing alignment magnet 202 is placed in each corner of the lid 216 such that each matches the placement of magnet 204 on bracket 210. On the surface of lid 216 is housing alignment feature 206. Alignment feature 206 may be a notch or ridge in a known configuration. FIG. 2 depicts the alignment feature 206 as three notches or ridges positioned radially in a symmetric pattern such that the alignment feature 206 mates with alignment feature 208 when assembly 218 is pressed against assembly 214. Similarly, magnets 202 and magnets 204 will align and come into contact, pulling together assembly 218 and assembly 214 against door 100. Display 102 and front proximity sensor 104 are shown on the front face of housing 106.

Note that alignment features 206 and 208 are described as notches or ridges. However, these alignment features can represent any type of protrusion, cavity, or other type of feature, as long as feature 206 and 208 are able to mate. For instance, if feature 206 is a protrusion, then feature 208 must be a cavity, and vice versa.

Figure 3A:
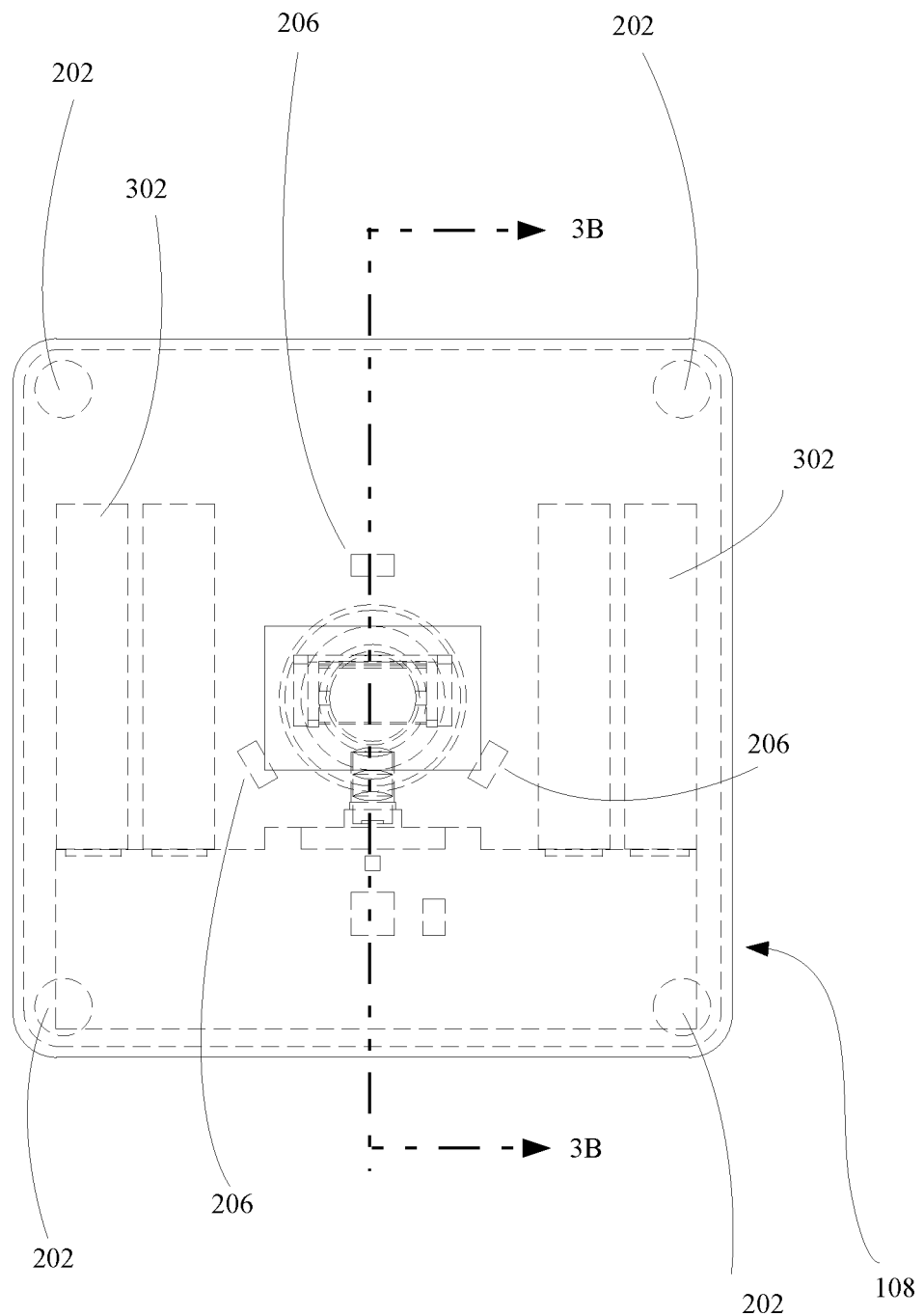

FIG. 3A shows a front view of peephole viewer camera apparatus 108. It shows placement of magnets 202, alignment features 206, and battery 302.

Figure 3B:
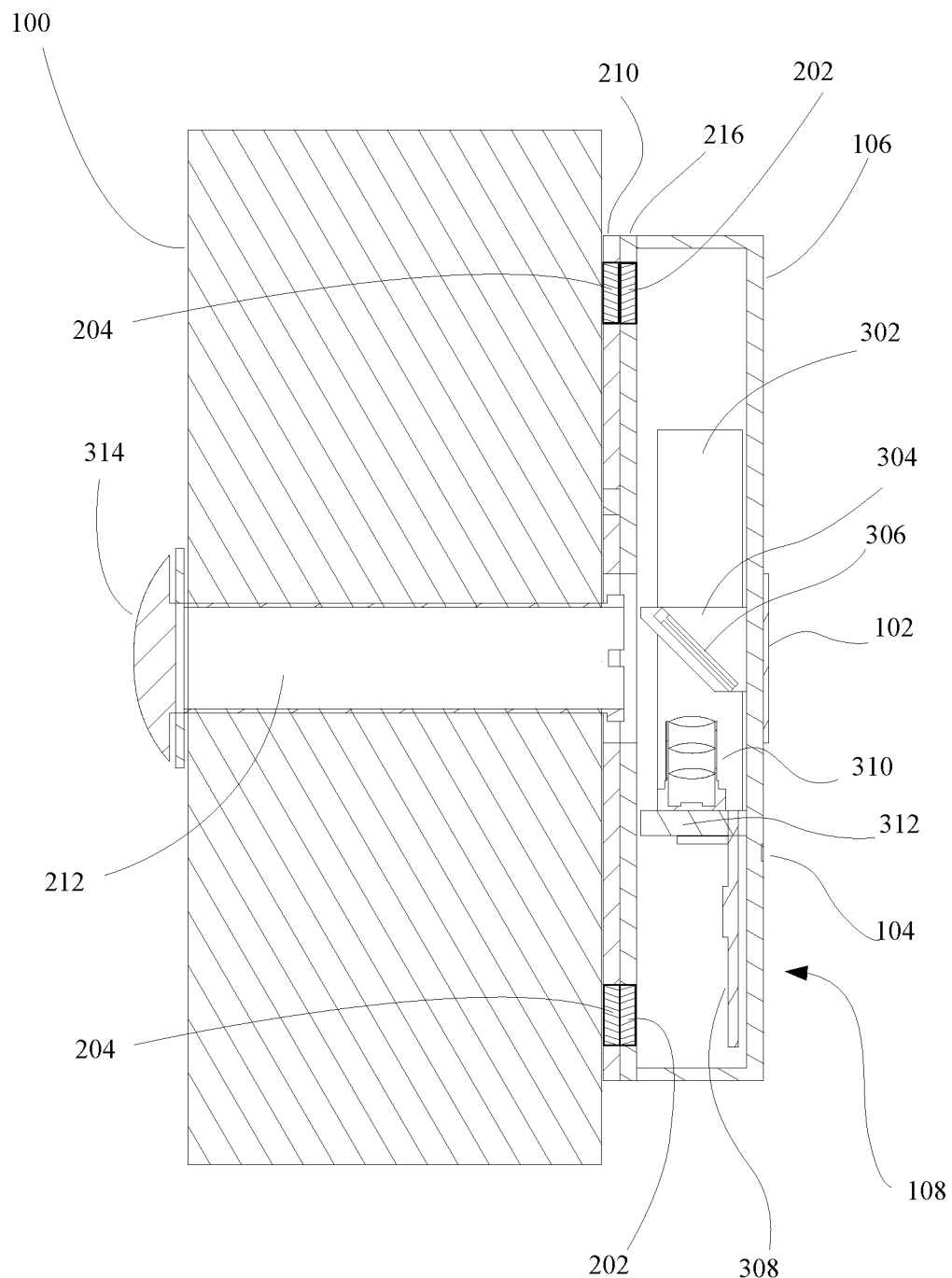

FIG. 3B shows a cross-section view from FIG. 3A. Door bracket 210 is attached to door 100 by means of removable adhesive tape. Magnets 202 and magnets 204 align and pull bracket 210 and lid 216 tightly face to face. Housing 106 is rigidly attached to lid 216. Peephole viewer 212 with peephole viewer primary lens 314 are mounted on door 100. Camera attachment bracket 312 is rigidly attached to housing 106. Camera module 310 is attached to bracket 312 such that its optical axis is 90 degrees offset from optical axis of peephole viewer 212. Mirror 306 is rigidly attached to mirror bracket 304, which is rigidly attached to housing 106. Mirror 306 is mounted such that its optical axis is 45 degrees offset from the optical axis of peephole viewer 212. Main processing board 308 and battery 302 are also attached to housing 106. Display 102 and front proximity sensor 104 are shown on the front face of housing 106.

Figure 3C:
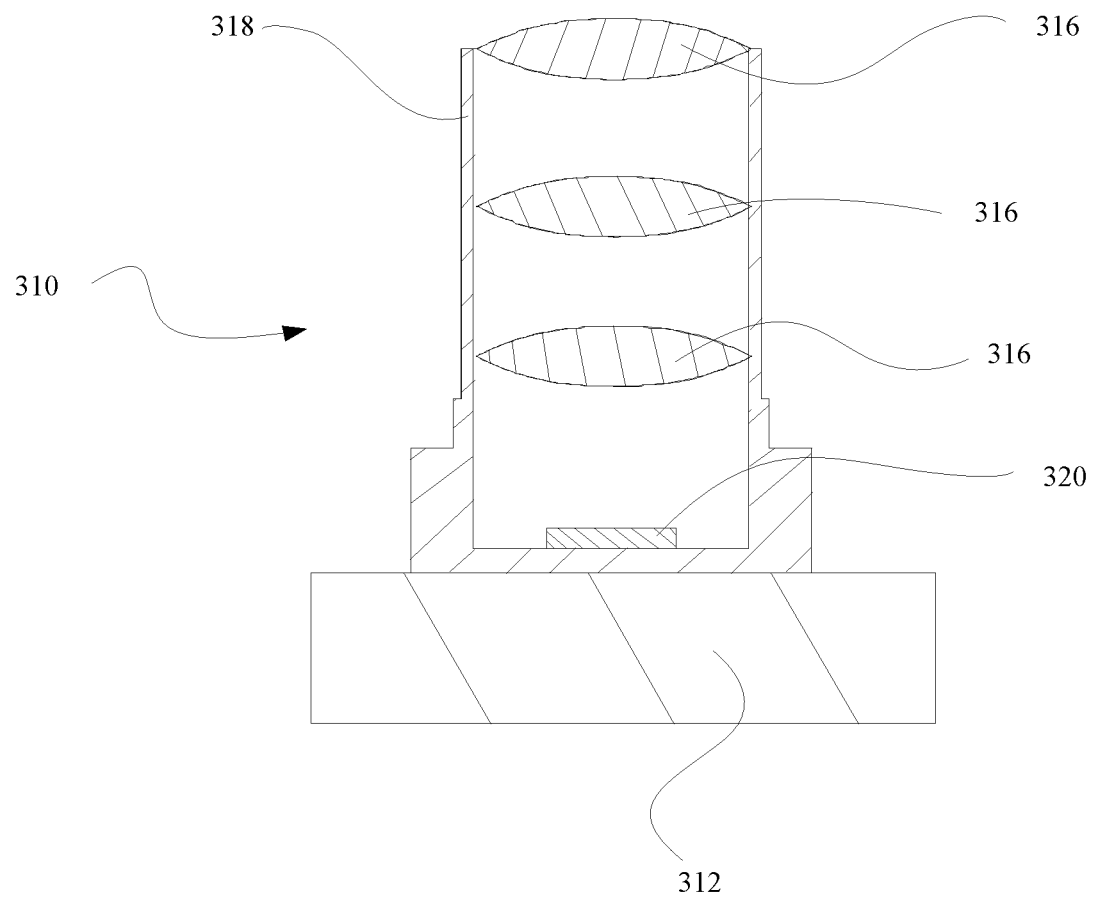

FIG. 3C shows a side cross-section view of camera module 310. One or more lenses 316 are mounted in camera lens housing 318 such that they are optically aligned with image sensor 320. Housing 318 is rigidly attached to camera attachment bracket 312.

Figure 4:
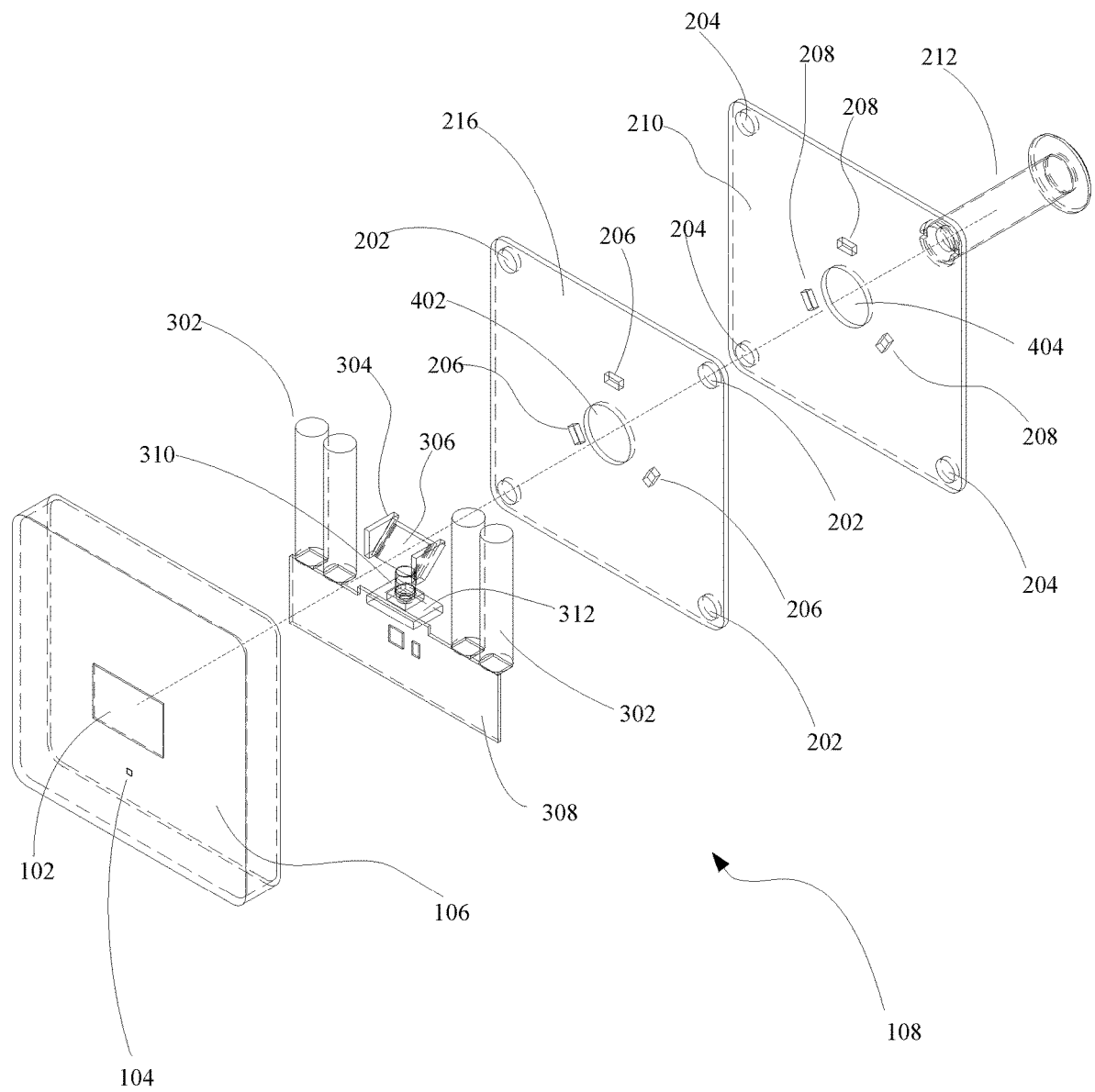

FIG. 4 is an exploded isometric view of peephole viewer camera apparatus 108. Door peephole viewer 212 defines an optical axis which is aligned with door bracket viewing aperture 404, housing lid viewing aperture 402, and mirror 306. Mirror 306 is mounted to mirror bracket 304 such that its optical axis is 45 degrees offset from the optical axis of peephole viewer 212. Camera module 310 is attached to bracket 312 such that its optical axis is 90 degrees offset from optical axis of peephole viewer 212.

Display 102 is an optional feature. Front proximity sensor 104 is also an optional feature. Magnet 204 and magnet 202 are each preferably a strong magnet such as one made of neodymium. However, magnet 204 may be replaced by a simple piece of ferromagnetic metal such as steel. It should be noted that fewer or greater number of magnets 202 and magnet 204 can be used, and need not be located in the corners of bracket 210. Similarly, alignment features 206 and 208 may be arranged in any pattern, and there may be more or fewer features than depicted in the figure.

Door bracket 210 may made from a rigid material such as ABS plastic. Alternatively, door bracket 210 may be a thin, flexible material such as a thermoplastic.

Batteries 302 provide power to the apparatus 108. Although not shown in the figures, a connector may be added to the peephole viewer camera apparatus 108 for charging the batteries 302 and providing power to the apparatus 108, which may bypass usage of the batteries 302 when plugged in to a power source. It should be noted that the peephole viewer camera apparatus 108 may be plugged in via power cable while mounted on the door. The power cable may be routed to the door hinge, and along the wall to a power supply, preferably plugged into a wall outlet. Such a power supply could be a simple USB charger or similar. In this case, the peephole viewer camera apparatus 108 may operate without as limited constraints on power usage.

Operation—FIGS. 1, 2, 3A, 3B, 3C, 4, 4A, 4B, 4C—Embodiment A

As shown in FIG. 3B and FIG. 4, Door peephole viewer 212 defines an optical axis which is aligned with door bracket viewing aperture 404, housing lid viewing aperture 402, and mirror bracket 304. Mirror 306 is mounted to mirror bracket 304 such that its optical axis is 45 degrees offset from the optical axis of peephole viewer 212. Camera module 310 is attached to bracket 312 such that its optical axis is 90 degrees offset from optical axis of peephole viewer 212. Mirror 306 redirects the optical path such that it aligns with camera module 310. The view seen through the peephole will pass through lenses 316 and resolve the image on image sensor 320. Peephole viewer 212 offers a wide angle view. One or more lenses 316 within camera module 310 are arranged such that they alter the field of view seen through the peephole viewer such that it covers image sensor 320.

Removable camera apparatus assembly 218 blocks the person's view through the door peephole viewer 212. In some cases, a person on the inner side of the door may want to look through the door peephole viewer 212 to verify that it is safe to open the door. FIG. 2 illustrates how assembly 218 may be separated from the door bracket assembly 214. Assemblies 218 and 214 are held firmly together by magnets 202 and 204. In addition, alignment features 206 and 208 aid in keeping the assemblies 218 and 214 aligned and prevents them from sliding or rotating with respect to each other. This maintains that the optical axis of peephole viewer 212 will project correctly onto mirror 306, and finally onto image sensor 320 as shown in FIG. 4.

Once assemblies 214 and 218 are separated, the user may look unobstructed through peephole viewer 212. When done looking, the user places removable camera apparatus assembly 218 against assembly 214 again. It will snap into place from the magnetic force of magnets 202 and 204. The alignment features 206 and 208 ensure that the two assemblies 214 and 218 are aligned. Once in place, the optical path through peephole 212 will pass directly onto image sensor 320.

Figure 4A:
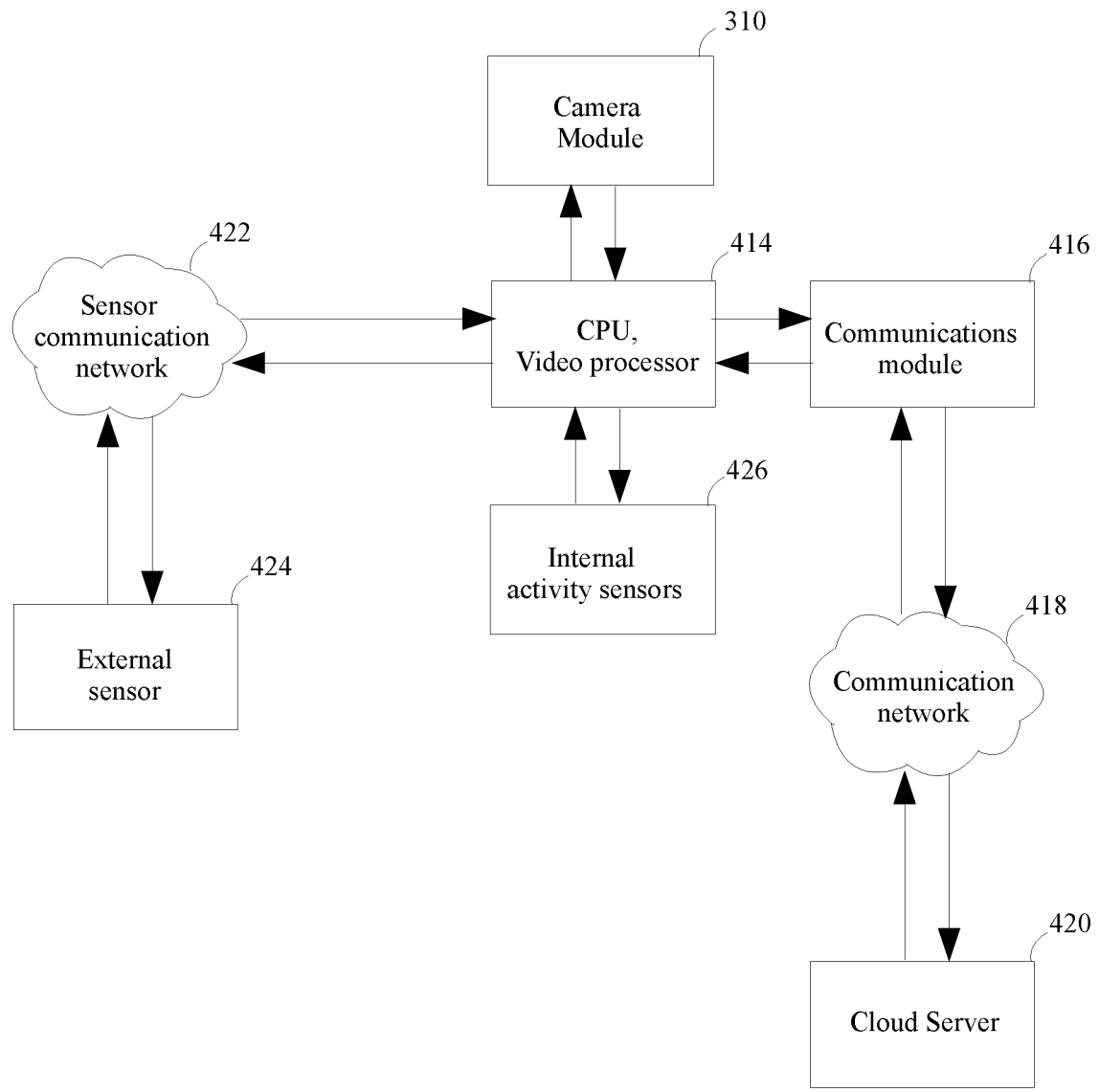

FIG. 4A shows an overview diagram of the system's data flow. The camera apparatus comprises CPU and video processor 414, camera module 310, internal activity sensors 426, and communications module 416. The CPU and video processor 414 control and read image data from camera module 310. Camera module 310 is shown as part of the camera apparatus in FIG. 3B and FIG. 4. The CPU and video processor 414 also transmit and receive data via communications module 416. Transmission and reception of data pass through communications network 418, and reaches an end-point at cloud server 420. Cloud server 420 may be a physical server on the internet, a local computer acting as a server on a local area network, or a virtual cloud platform such as Amazon AWS, Microsoft Azure, or Google Cloud Platform.

CPU 414 may also communicate with internal activity sensors 426. These sensors 426 may be mounted within camera apparatus 108. Sensors 426 may include inertial sensors such as gyroscope, accelerometer, magnetometer, or barometric sensor. The sensors 426 may also include a microphone or other type of vibration sensor. These sensors' output can be processed by CPU 414 to determine if some activity has occurred. For instance, the accelerometer, gyro, or magnetometer sensor may determine whether the door has rotated. The barometric sensor can report a change in barometric pressure which occurs when the door is opened. The accelerometer, vibration, or microphone sensor may be used to report if a door knock has been detected. The microphone sensor may also be used to determine whether human voices are detected outside of the door.

In this embodiment, the Communications module 416 transmits and receives data to the communication network 418 via 802.11 TCP/IP communication via WiFi. However, it should be noted that the method of communication can be any type of network protocol, wired or wireless. This includes WiFi, Bluetooth, Zibgee, Ethernet, RS485 and others.

The CPU and video processor 414 also may communicate with external sensor 424 via a sensor communication network 422. This sensor communication network 422 may be wired or wireless, and use one or more communication protocols such as WiFi, Bluetooth, Zigbee, Ant or other wireless protocols. Similarly, sensor communication network 422 may use a wired connection over Ethernet, RS485, I2C, SPI, UART, or other wired communication protocol. More than one external sensor may communicate with the CPU and video processor 414. A variety of types of external sensors may be used, including passive infrared proximity sensors, time-of-flight proximity sensors, microphones, LIDAR, other imaging sensors, accelerometers, gyroscopes, magnetometers, barometric pressure sensors, microphones, or other types of sensors. Later embodiments describe implementations of certain external sensors.

One internal activity sensor 426 shown in FIG. 2 is front proximity sensor 104. In this embodiment, sensor 104 is a time-of-flight proximity sensor which can measure the approximate distance of an object in its field of view. A nominal field of view for this sensor is 30 degrees. Any object detected at near the height of the proximity sensor 104 is likely a person approaching the door. Thus, CPU 414 can monitor proximity sensor 104. The CPU and video processor 414 is also connected to display 102. When the CPU determines that a person is detected by proximity sensor 104, it can turn on display 102 and show the current video stream from camera module 310. The CPU and video processor 414 may also perform face detection and face recognition on the images from camera module 310. In this case, it may show an overlay with face recognition metadata on display 102. Such metadata could include a name or secondary photo of the detected person.

Door bracket 210 is designed to be simple to install on the door 100. The back side of door bracket 210 may be covered in an adhesive tape. The adhesive tape can have a protective coating. When the coating is peeled off of the tape, the bracket 210 can be positioned over the peephole viewer 212 such that aperture 404 is centered on peephole viewer 212, and pressed against to the door 100. Once pressed against the door, it will be held firmly in place by the adhesive. One example adhesive tape is the 3M command strip. If the user wants to remove the bracket from the door, the user can peel back bracket 210 from the door. The removable adhesive tape will leave no residue on the door. If made of a flexible material, door bracket 210 can be made of a flexible, thin material to make it easier to peel back during removal. Using a thin, flexible material for bracket 210 also makes manufacturing more economical.

Figure 4B:
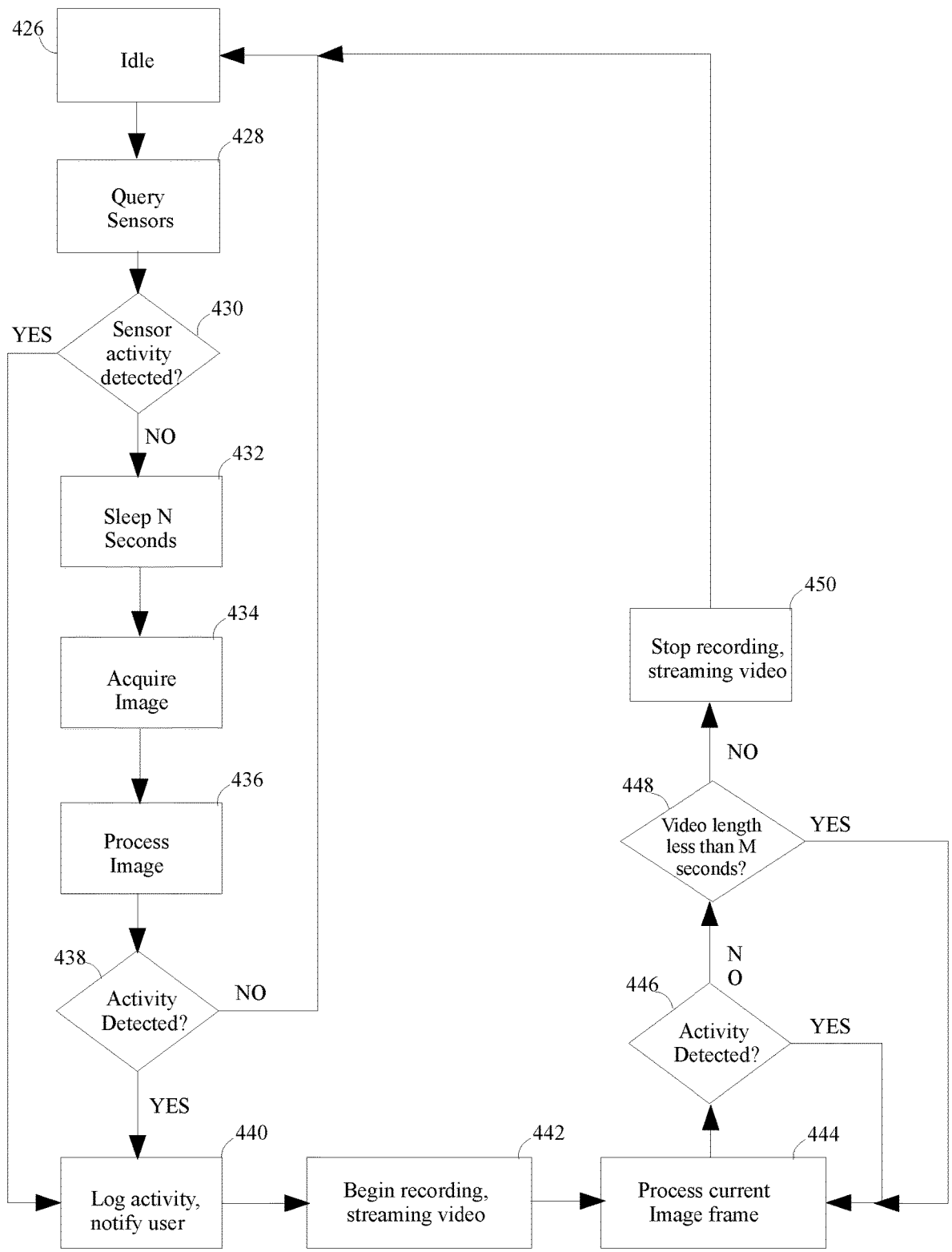

FIG. 4B is a flowchart showing the operating process for the peephole viewer camera apparatus 108 described in this embodiment. It begins at step 426, in which the device enters idle state. The device enacts a low power mode to conserve battery life. CPU 414, camera module 310, and communications module 416 all enter low power state.

In the next step 428, the CPU 414 queries any internal sensors 426 and external sensors 424 for activity. Such activity could be determined by an external proximity sensor indicating that an object is nearby. Similarly, an internal accelerometer, gyro, or magnetometer internal sensor may determine whether a door motion activity has occurred. An internal barometric sensor may report a change in barometric pressure which occurs when the door is opened. An internal accelerometer, vibration, or microphone sensor may be used to report activity if a door knock has been detected. The microphone sensor, if present, may be used to determine whether human voices are detected outside of the door. Any of these or other internal sensors 426 and external sensors 424 may be used to determine whether activity is detected. Note that any specific individual sensors 424 or 426 may be excluded from use in determining step transition in this flowchart.

In the next step 430, if activity is detected then transition to step 440. If internal sensors 426 and external sensors 424 report no activity detected, then transition to step 432 in which the system enters ultra low power mode and sleeps for N seconds.

The duration of sleep is configurable, but a nominal value of N is two seconds. In state 432 any external sensor 424 or internal sensor 426, if present, may alert the CPU 414 by interrupt request to wake it up. For example, if an external sensor such as a proximity sensor is used on the outer side of the door, it may wake up the CPU 414 early by an interrupt request. In this case, the duration N can be a much higher value, such as twenty seconds, to conserve battery life further.

When the CPU 414 wakes up from sleep in step 432, it transitions to step 434. Here it enables camera module 310 and acquires an image. Then it transitions to step 436 in which it processes the image. CPU and video processor 414 may include artificial intelligence acceleration hardware to allow for fast AI inference execution, such as facial detection and facial recognition. In this case, the CPU stores the results in memory, which may include whether a face is detected, and if so, the metadata attached to the detected face. This metadata may include the person's id, name and a secondary image of the person. Then, transition to the next step 438.

In step 438, the CPU 414 determines if activity was detected. If a person was detected or an external sensor detected activity, then transition to step 440. However, if no activity was detected then transition back to step 426 and enter idle state.

In step 440, log the detected activity to memory and nonvolatile storage. The logged data should include metadata of any detected person via face recognition, as well as a current timestamp. The logged data should also include any type of activity detected by the internal sensors 426 and external sensors 424. Then notify the user. This can include enabling display 102 and showing the current video stream from camera module 310. If face recognition metadata is available, an overlay with face recognition metadata may be shown on display 102. Such metadata could include a name or secondary photo of the detected person. This step may also send a push notification to show an alert on the user's phone or other connected device such as a smart screen device. Examples of such a device are Amazon Echo Show and Facebook Portal. This step 440 may also send a message to a server on the Internet as well. After step 440 is complete, transition to step 442.

In step 442, the CPU and video processor 414 begins recording the video stream from camera module 310. The CPU 414 may write the video stream to local nonvolatile storage. In addition, it may begin streaming the video stream to cloud server 420 via communications network 418. As described previously, this may be an internet server, or a local server on the local area network. Next, transition to step 444.

In step 444, process the current image frame from the camera module 320, running face detection on the image frame. Transition to step 446. Here, determine if activity is detected. If a person is detected or external sensors report activity detected, then transition back to step 444. However, if no activity is detected then transition to step 448.

In step 448, test if the duration of the current video recording is less than M seconds. A nominal value for M is ten seconds. If the duration is less than M seconds, then transition back to step 444 and process another frame. However, if the video duration is greater than or equal to M seconds, then transition to step 450.

In step 450, stop recording and stop streaming the video. If recording to local nonvolatile storage, then close the file. Transition to step 426 and enter idle, low power state.

Figure 4C:
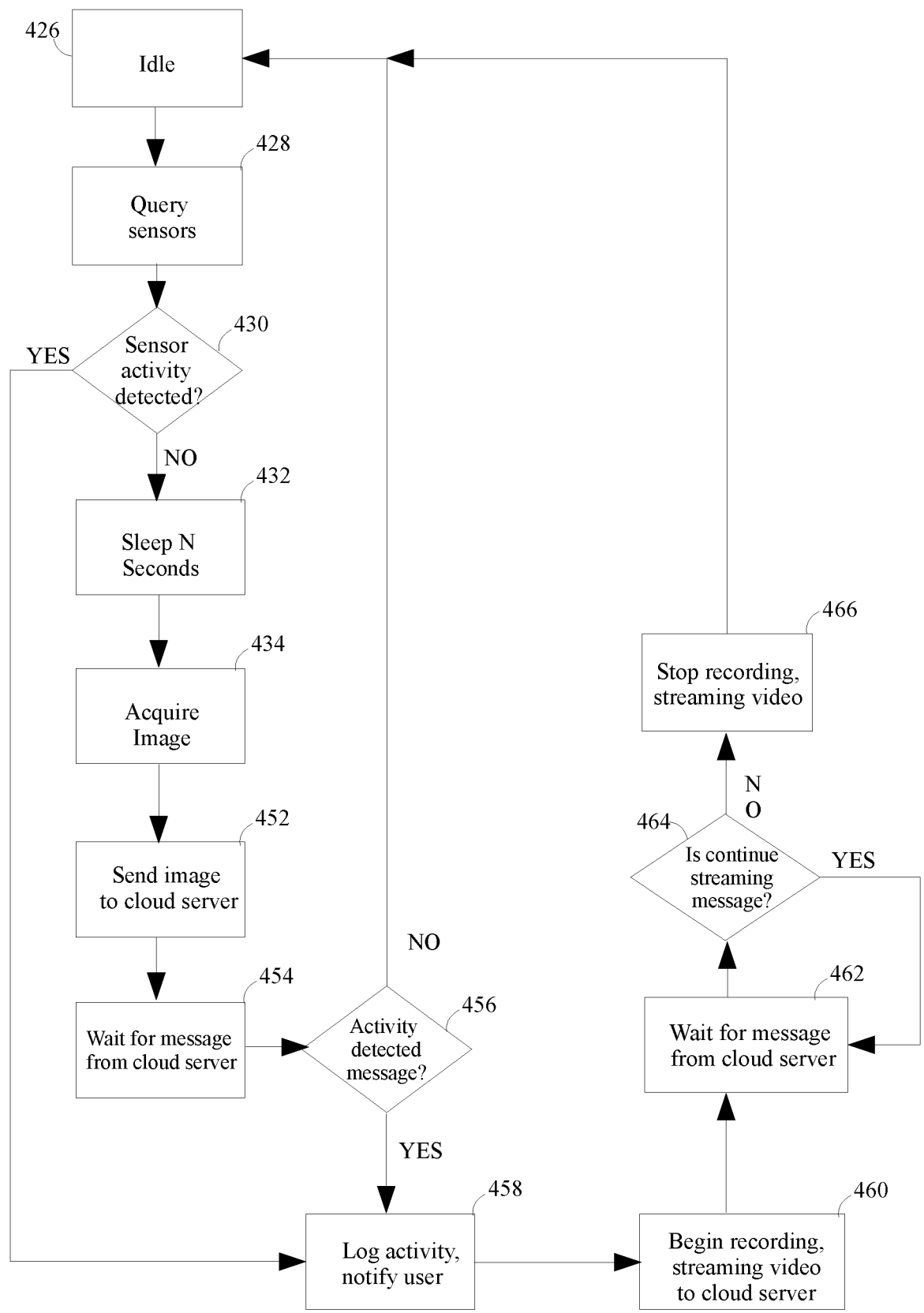

FIG. 4C is a flowchart showing an alternative operating process for the peephole viewer camera apparatus 108 described in this embodiment. In this operating process, the CPU 414 may not have any AI inference acceleration hardware, and thus face detection and face recognition are completed on the cloud server 420.

The process begins at step 426. Steps 426, 428, 430, 432, and 434 are the same as in FIG. 4B. After step 434, transition to step 452, where the acquired image is packaged into a message format and transmitted to cloud server 420 via communications network 418. Transition to step 454, in which the CPU 414 waits for communications module 416 to receive a message in reply from cloud server 420. Once a message is received, or if no message is received, transition to step 456.

In step 456, the CPU 414 parses the received message. The message will indicate whether activity was detected in the image. In no activity was detected, or if no message was received, transition back to step 426 and enter idle mode. However, if the received message indicates that activity was detected, transition to step 458. In step 458, the CPU 414 may log the detected activity to memory and nonvolatile storage and notifies the user. Similar secondary actions as step 440 from FIG. 4B can be performed. Then transition to step 460.

In step 460, the CPU and video processor 414 begins recording the video stream from camera module 310. The CPU 414 may write the video stream to local nonvolatile storage. In addition, it begins streaming the video stream to cloud server 420 via communications network 418. Next, transition to step 462.

In step 462, the video streaming to cloud server 420 continues. Simultaneously, the CPU 414 waits to receive a message from cloud server 420 via communications network 418. In step 464, a message is received from cloud server 420. If the message includes command to continue streaming video, then transition back to step 462 and await another message. However, if the received message does not indicate to continue streaming, transition to step 466.

In step 466, stop recording and stop streaming the video. If recording to local nonvolatile storage, then close the file. Transition to step 426 and enter idle, low power state.

Figure 4D:
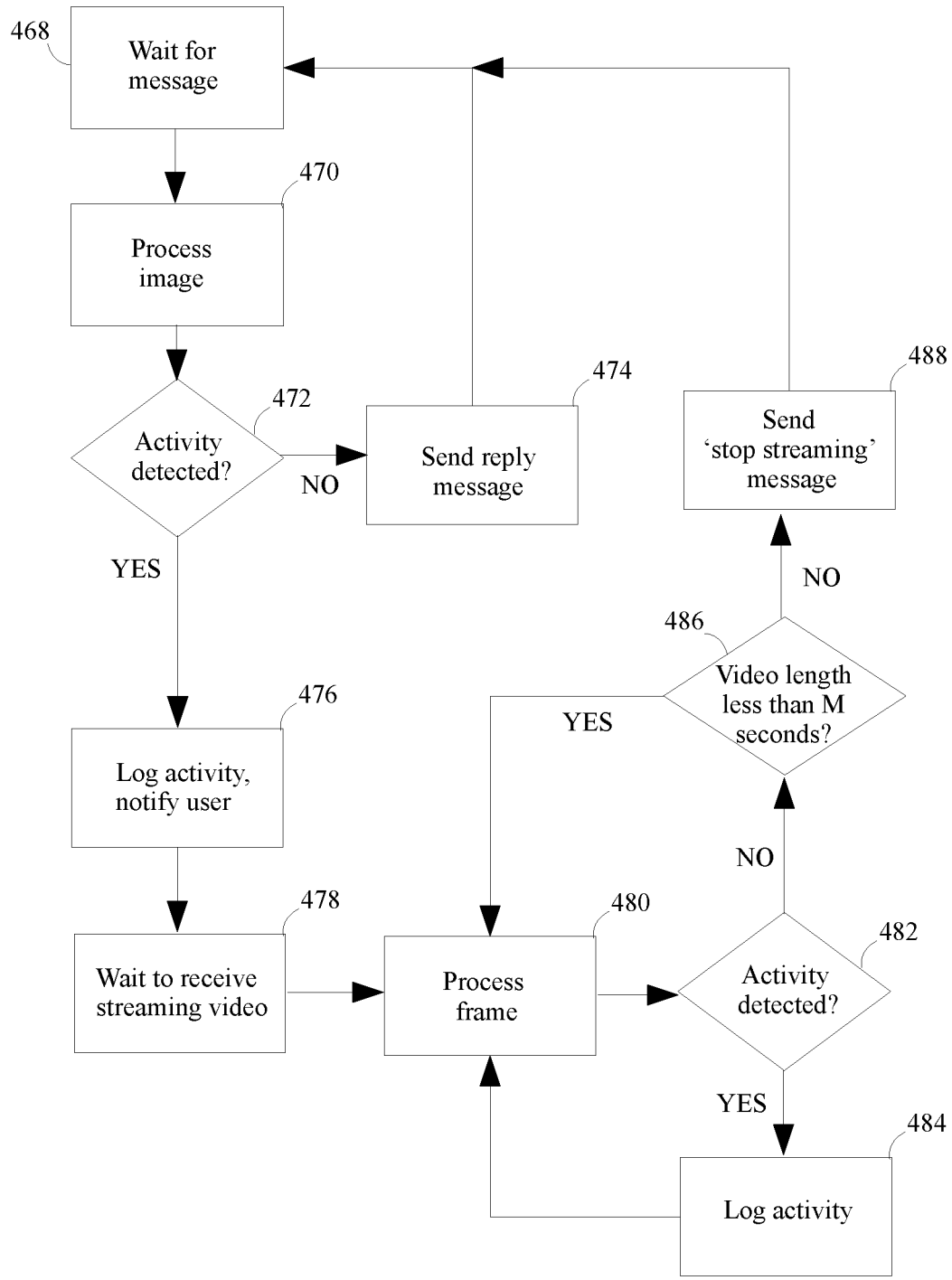

FIG. 4D is a flowchart showing how the cloud server operates and communicates with the peephole viewer camera apparatus 108 whose process is described in FIG. 4C. The process begins at step 468, in which the cloud server 420 waits for a message from the peephole viewer camera apparatus' communication module 416. Transition to step 470, where a message was received and the cloud server 420 processes the image. Processing the image may use facial detection and facial recognition algorithms. In this case, the cloud server 420 stores the results in memory, which may include whether a face is detected, and if so, the metadata attached to the detected face. This metadata may include the person's id, name and a secondary image of the person. Then, transition to the next step 472.

In step 472, the cloud server 420 determines if activity was detected. If a person or other activity was detected, then transition to step 476. However, if no activity was detected then transition back to step 474, send a reply message to peephole viewer camera apparatus' communication module 416 indicating that there is no activity detected. Then transition back to step 468 and wait for another message.

In step 476, log the detected activity to memory and nonvolatile storage. The logged data should include metadata of any detected person via face recognition, as well as a current timestamp. Then notify the user. This step may send a push notification to show an alert on the user's phone or other connected device such as a smart screen device. Examples of such a device are Amazon Echo Show and Facebook Portal. This step 476 may also send a message to a server on the Internet as well. After step 476 is complete, transition to step 478.

In step 478, cloud server 420 waits to receive streaming video from peephole viewer camera apparatus' communication module 416. Once video streaming has begun, transition to step 480.

In step 480, the video streaming from communication module 416 continues. Cloud server 420 may write the video stream to local nonvolatile storage. Simultaneously, the cloud server 420 processes the current image frame. Processing the image frame may use facial detection and facial recognition algorithms. In this case, the cloud server 420 stores the results in memory, which may include whether a face is detected, and if so, the metadata attached to the detected face. This metadata may include the person's id, name and a secondary image of the person. Then, transition to the next step 482.

In step 482, the cloud server 420 determines if activity was detected in the processed image frame. If a person or other activity was detected, then transition to step 484. However, if no activity was detected then transition to step 486. In step 486, test if the video duration is less than M seconds. A nominal value for M is ten seconds. If the duration is less than M seconds, then transition back to step 480 and process another frame. However, if the video duration is greater than or equal to M seconds, then transition to step 488.

In step 484, cloud server 420 logs any activity detected, and transitions back to step 480.

In step 488, if recording the streaming video to local nonvolatile storage, then close the file. Send a message to peephole viewer camera apparatus' communication module 416 indicating to stop streaming video. Then transition back to step 468 and wait for another message.

Figure 4E:
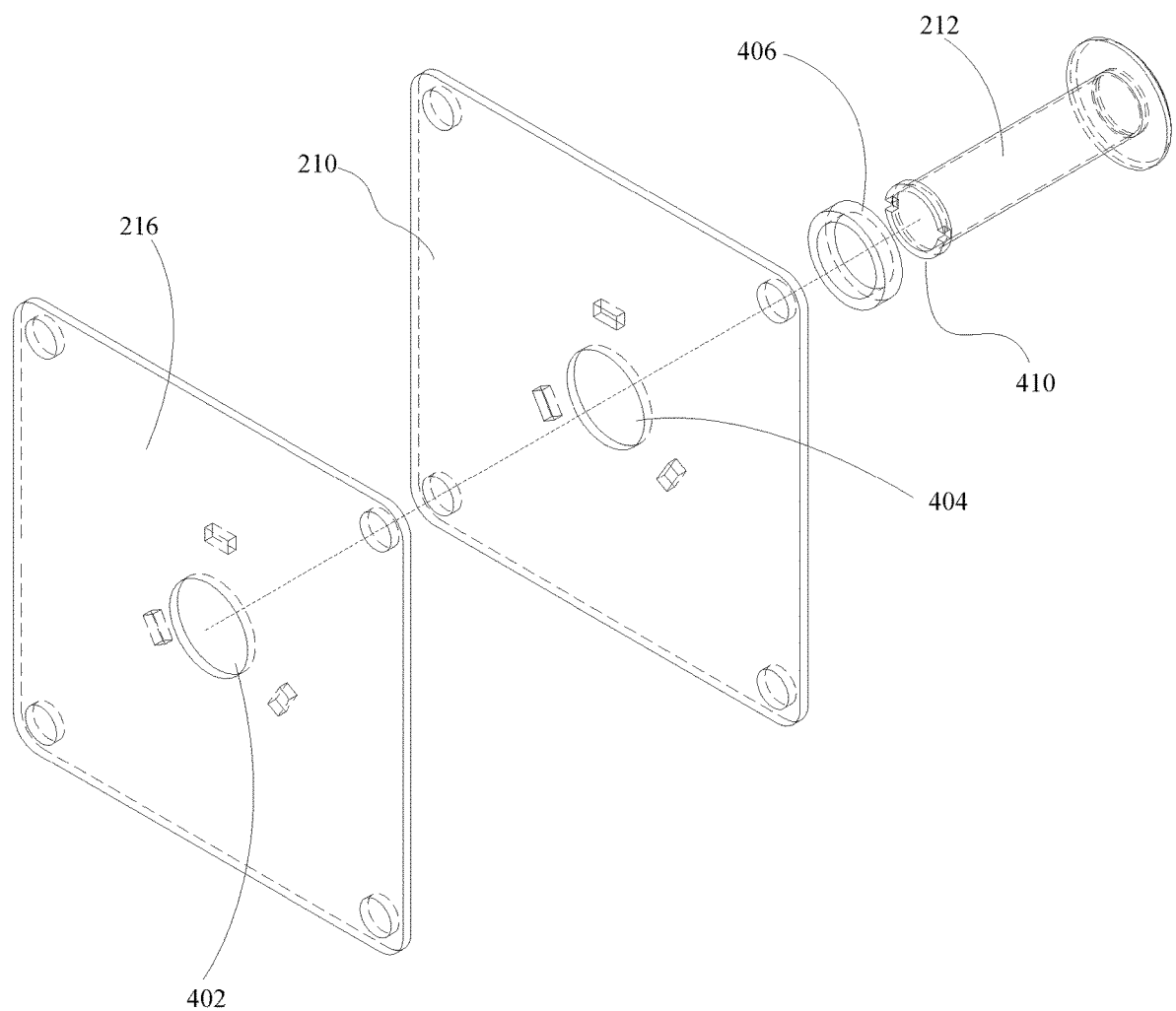
Figure 4F:
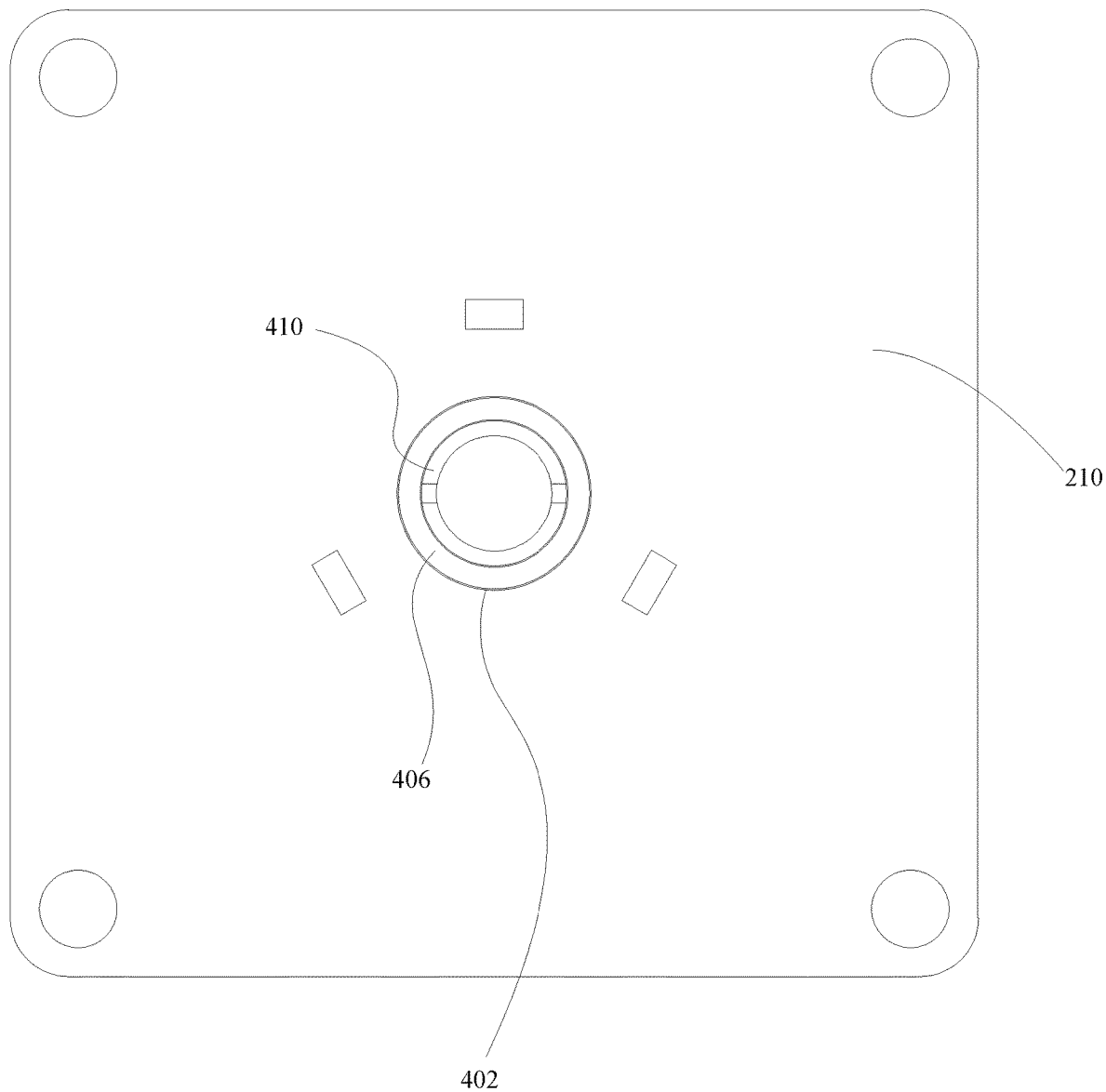
Figure 4G:
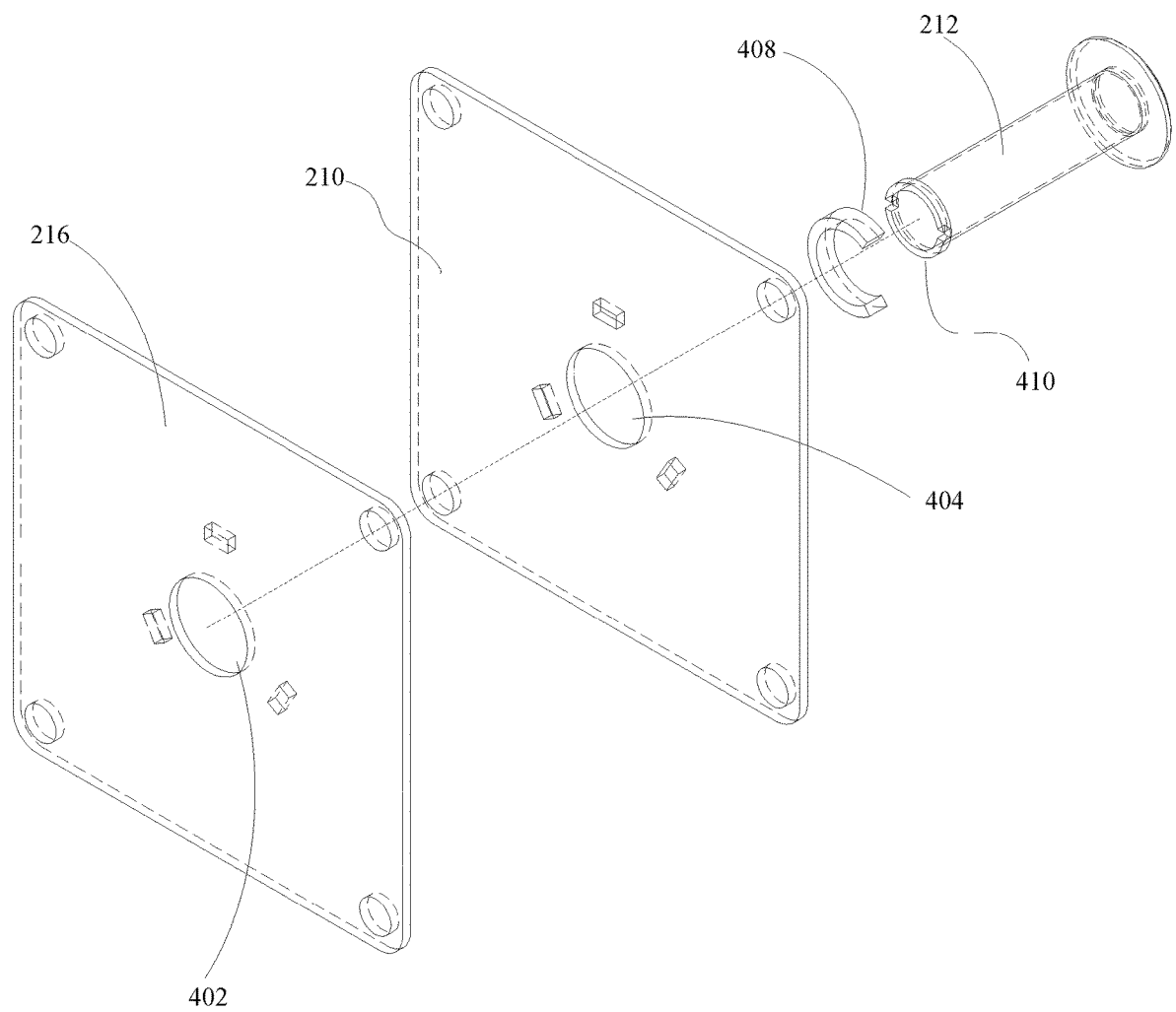

Detailed Description—FIGS. 4E, 4F, 4G—Embodiment A1

Embodiment A1 is a variation on embodiment A. FIG. 4E shows an exploded isometric view of door bracket 210 and housing lid 216 with added door bracket support ring 406. Support ring 406 has an inner diameter which matches the outer diameter of door peephole viewer front ring 410. Support ring 406 has an outer diameter which matches both the diameter of door bracket viewing aperture 404 and also matches the diameter of housing lid viewing aperture 402.

FIG. 4F shows a front view of door bracket 210 with added door bracket support ring 406. Support ring 406 has an inner diameter which matches the outer diameter of door peephole viewer front ring 410. Support ring 406 has an outer diameter which matches the diameter of door bracket viewing aperture 404. When mounted on the door, the door peephole viewer front ring 410 provides support for the door bracket 210 against gravity, to aid in preventing the bracket 210 from sliding along the surface of the door.

Support ring 406, if long enough, may extend through both aperture 404 and aperture 402, thus providing support for both the door bracket 210 and removable camera apparatus assembly 218. Alternatively, the ring 406 may be designed to extend only as far as bracket 210.

FIG. 4G shows an alternative design for support ring 406. It is replaced by support ring 408, which has a notch cut such that it forms a "C" shape. It serves the same purpose as ring 406. However, ring 408 has a gap which allows certain types of peephole viewers with privacy covers to allow placement of the ring 408 which would not be possible with ring 406.

It should be noted that the support ring 406 and 408 may have an adhesive backing to aid in preventing any sliding motion after installation.

Operation—FIGS. 4E, 4F, 4G—Embodiment A1

Embodiment A1 adds a support ring 406. During installation, the user takes support ring 406 and places it onto the door such that it fits snugly around peephole viewer front ring 410. Then the user places the door bracket 210 onto the door with removable adhesive tape, such that door bracket viewing aperture 404 fits snugly against the outer circumference of ring 406. When mounted on the door, the door peephole viewer front ring 410 provides support for the door bracket 210 against gravity, to aid in preventing the bracket 210 from sliding along the surface of the door.

Ring 406 can be replaced with ring 408, which has a cutout to make a "C" shape, but offers the same functionality. This allows installation on doors which have a pivoting privacy cover attached to the peephole viewer front ring 410.

Note that ring 406 and ring 408 of this embodiment may be added as a feature in other embodiments described herein.

Figure 5:
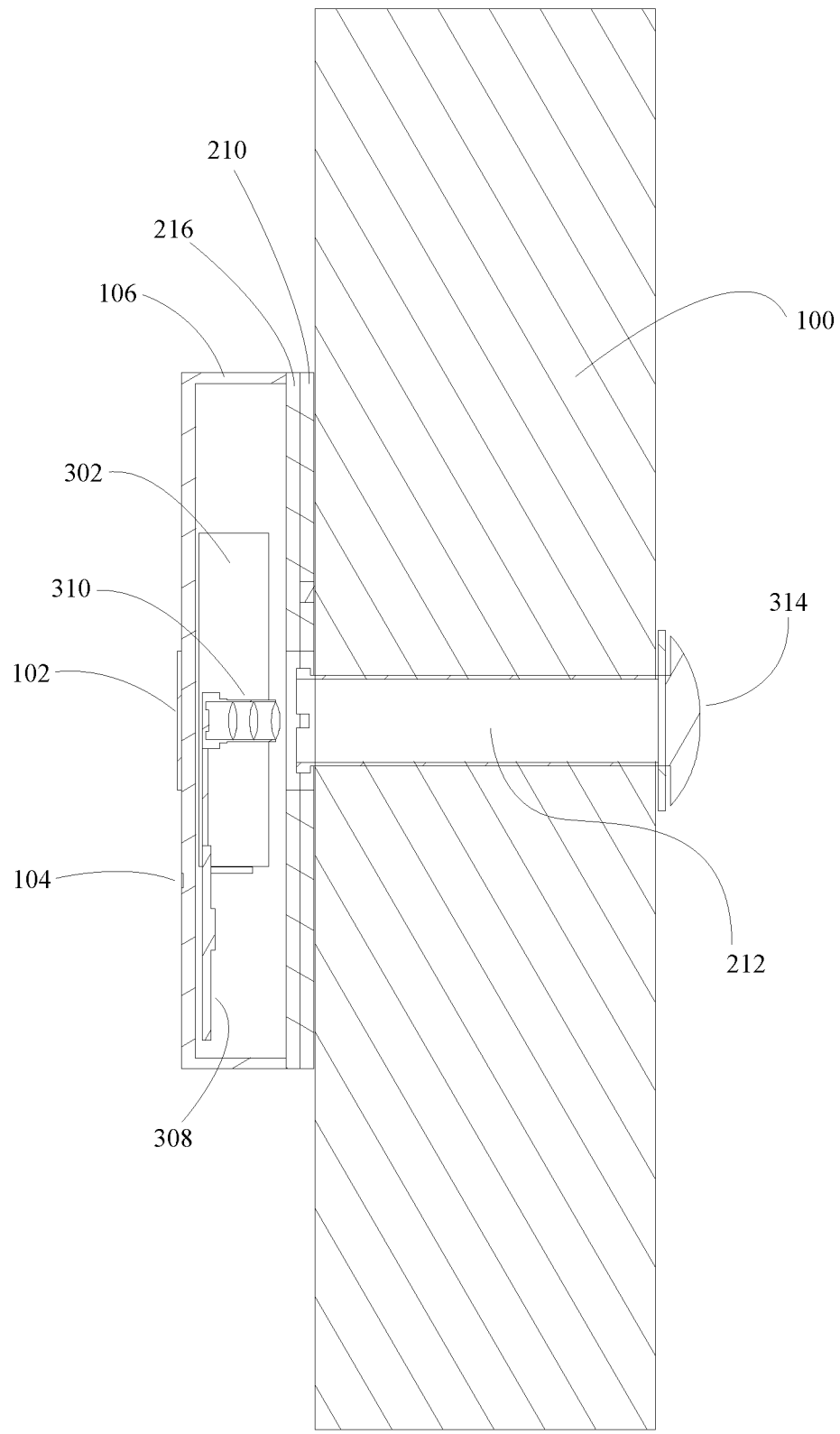
Figure 6:
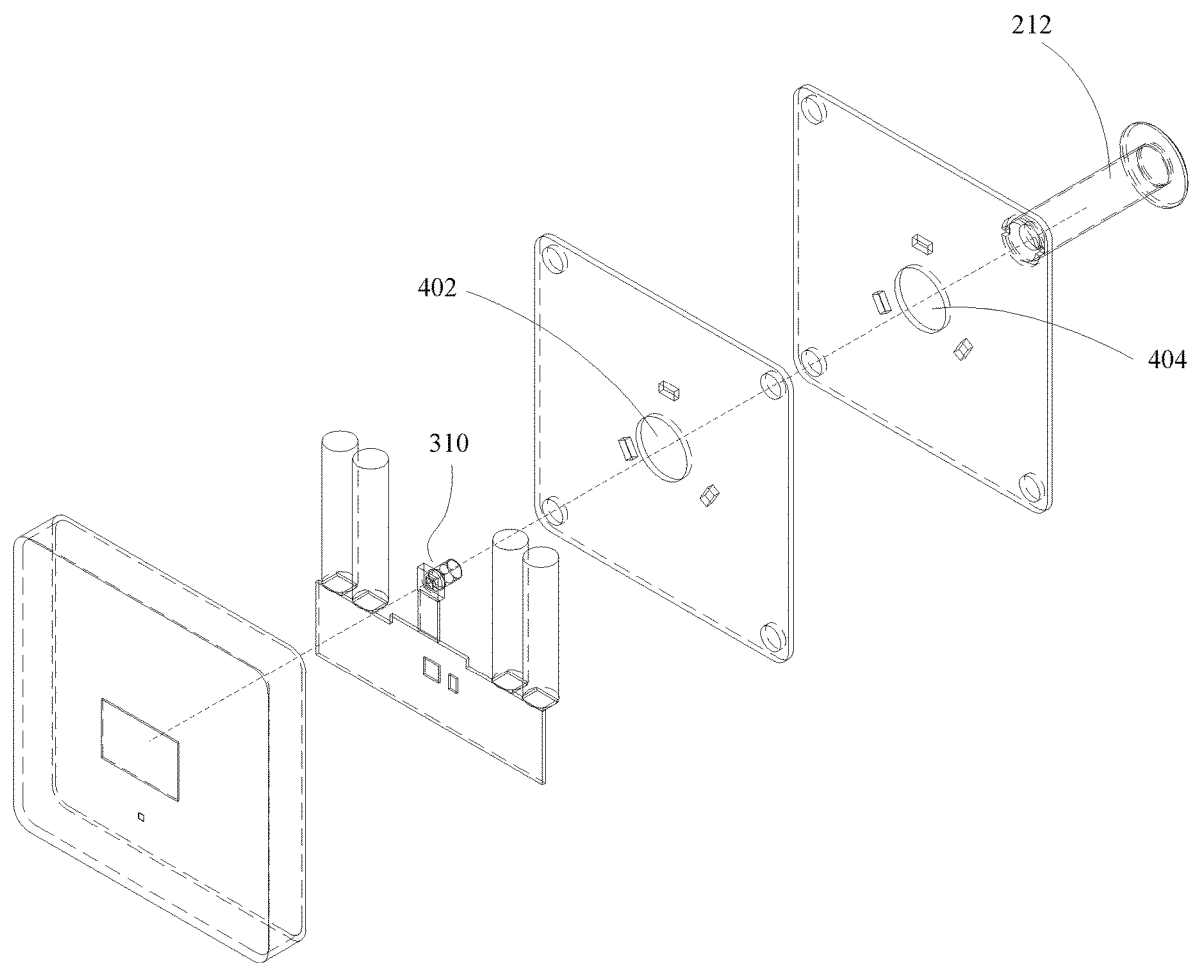

Detailed Description—FIGS. 5, 6—Embodiment B

Embodiment B is very similar to embodiment A. However, in this embodiment the peephole viewer camera apparatus has camera module 310 mounted such that it is aligned with the primary optical axis of the door peephole viewer 212. FIG. 5. depicts a side cross-section view of peephole viewer camera apparatus installed on the door in this embodiment.

Door bracket 210 is attached to door 100 by means of removable adhesive tape. In the same way as in embodiment A, magnets 202 and 204 and optional alignment features 206 and 208 align and pull bracket 210 and lid 216 tightly face to face. Housing 106 is rigidly attached to lid 216. Peephole viewer 212 with peephole viewer primary lens 314 are mounted on door 100. Camera module 310 is attached to housing 106 such that its optical axis is aligned with the optical axis of peephole viewer 212. Main processing board 308 and battery 302 are also attached to housing 106. Display 102 and front proximity sensor 104 are shown on the front face of housing 106.

Display 102 and front proximity sensor 104 are optional features.

FIG. 6 shows an exploded isometric view of peephole viewer camera apparatus in this embodiment. Camera module 310 is aligned with the primary optical axis of door peephole viewer 212. Door peephole viewer 212 defines an optical axis which is aligned with door bracket viewing aperture 404, housing lid viewing aperture 402, and camera module 310.

Note that the mounting of the camera module 310 as described in this embodiment may be applied to later embodiments as well.

Operation—FIGS. 5, 6—Embodiment B

The operation of this embodiment is very similar to embodiment A. The primary difference is that camera module 310 is aligned with the optical axis of door peephole viewer 212, rather than offset by 90 degrees. Therefore the mirror and mirror bracket are not needed. The view seen through the peephole viewer 212 passes through lenses 316 and resolves the image on image sensor 320.

Figure 7:
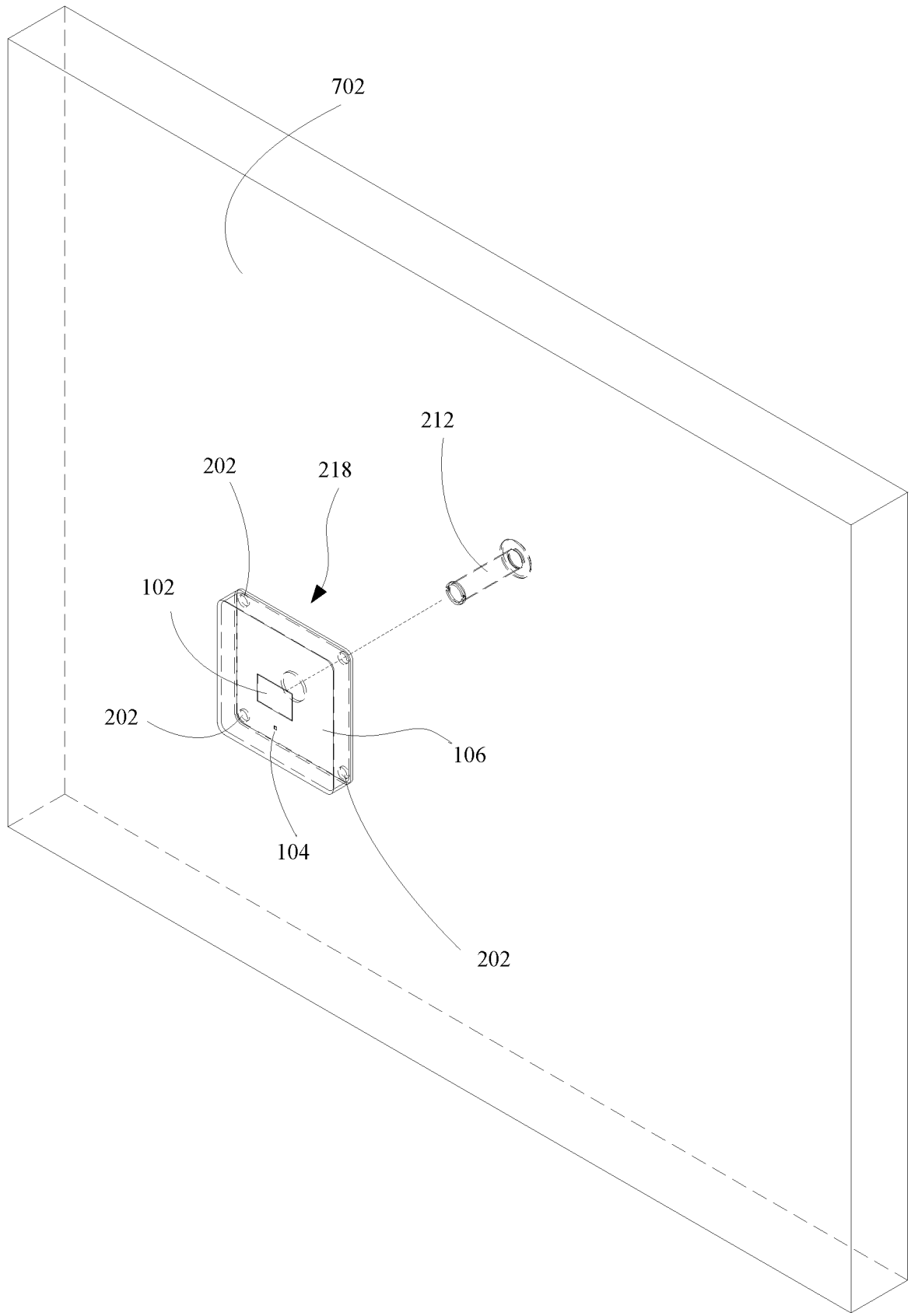
Figure 8:
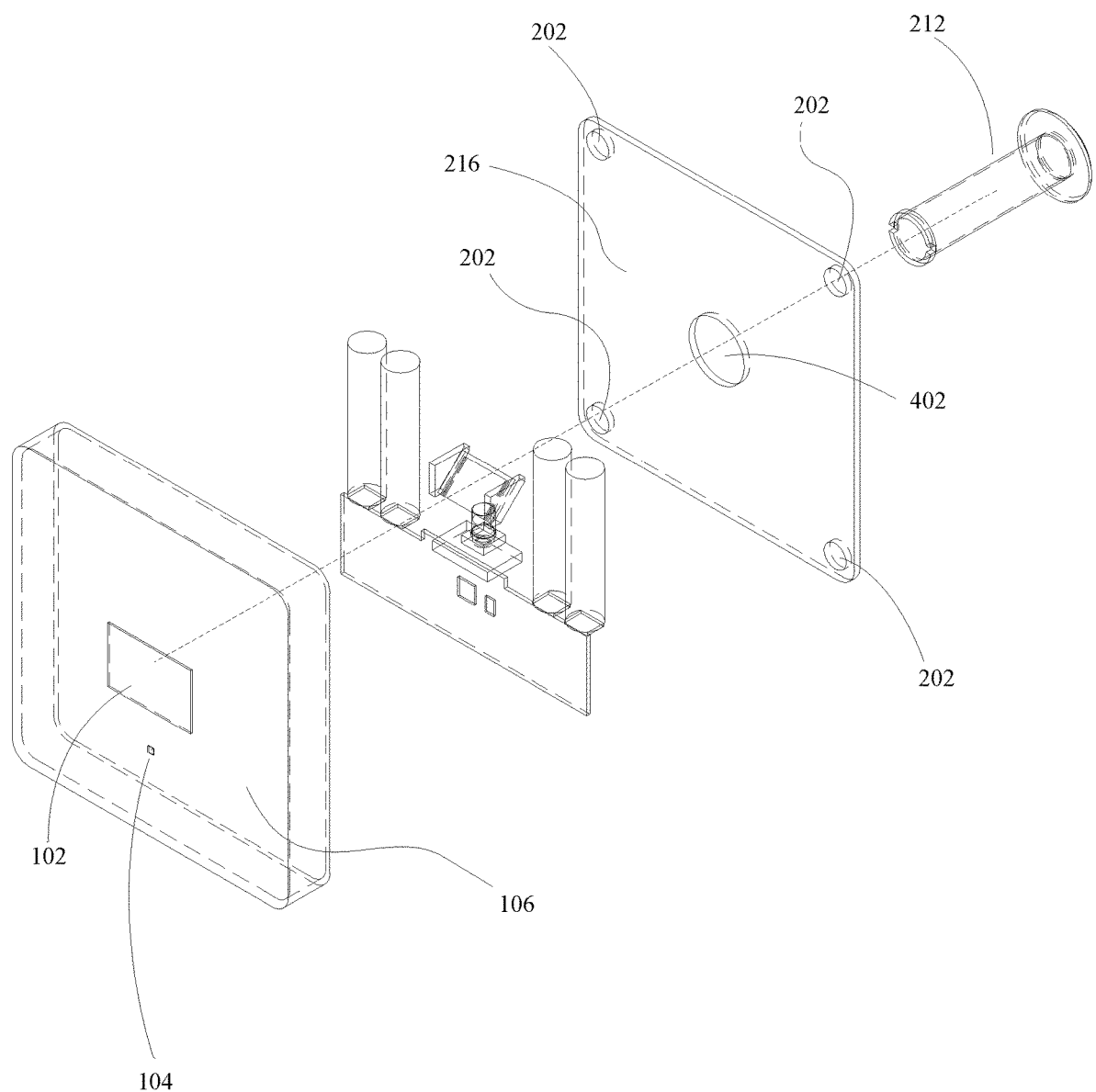
Figure 9:
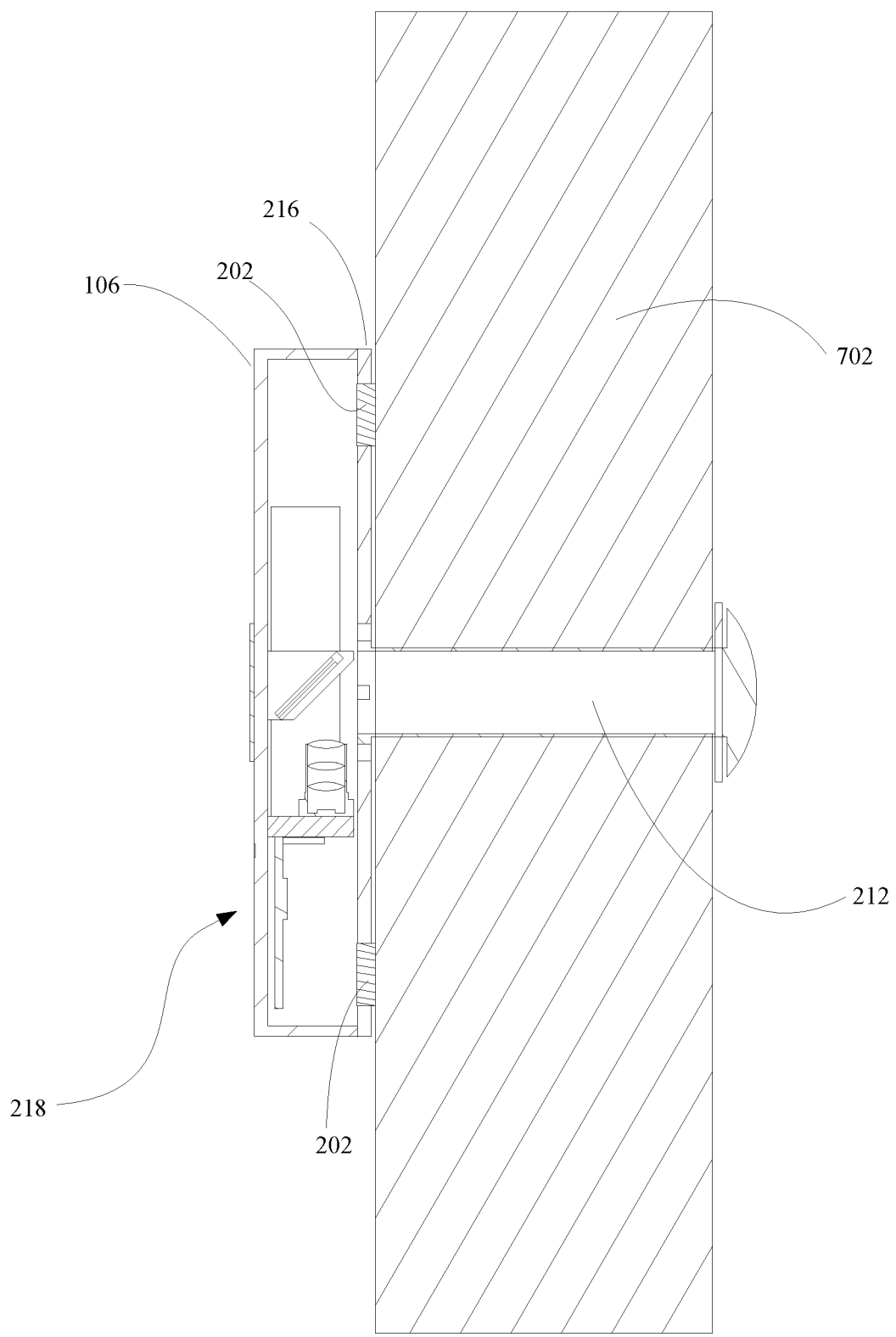

Detailed Description—FIGS. 7, 8, 9—Embodiment C

FIG. 7 shows an overview of embodiment C. In this embodiment, removable camera apparatus assembly 218 is mounted on steel door 702. No door mounting bracket is necessary, as magnets 202 firmly attaches assembly 218 to the steel door 702. Display 102 and front proximity sensor 104 are on the front face of camera apparatus front housing 106, but both are optional features.

FIG. 8 shows an exploded view of removable camera apparatus assembly 218 in this embodiment. It includes camera apparatus front housing 106, which is rigidly attached to housing lid 216. Housing lid 216 has a housing lid viewing aperture 402, which is centered on door peephole viewer 212. A housing alignment magnet 202 is placed in each corner of the lid 216. Display 102 and front proximity sensor 104 are shown on the front face of housing 106.

FIG. 9 is a side cross-section view of removable camera apparatus assembly 218 installed on the steel door 702. Housing 106 is rigidly attached to housing lid 216, which has embedded magnets 202. The magnets hold the assembly 218 firmly against the steel door 702 such that the assembly 218 is centered on door peephole viewer 212.

Operation—FIGS. 7, 8, 9—Embodiment C

The operation of this embodiment is very similar to embodiment A. One difference is that this embodiment lacks a door bracket. The housing lid 216 has magnets 202 which come directly in contact with the door. Removable camera apparatus assembly 218 be easily removed from the steel door 702 by pulling it away from the door to disengage the magnets 202.

For added support, the support ring 406 from embodiment A1 may be added. In addition, removable adhesive tape may be added to the back of housing lid 216 to provide more stability when mounted on the door.

The user may quickly and easily remove the entire apparatus 108 from the steel door 702 with very little effort.

Detailed Description—FIGS. 10, 11, 12, 14—Embodiment D

Figure 10:
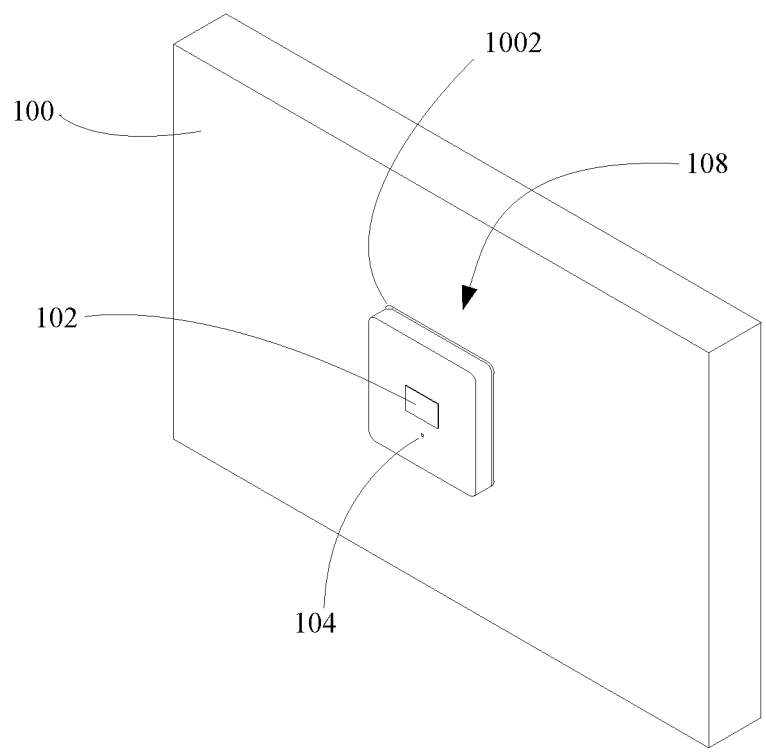

FIG. 10 shows an isometric view of embodiment D. Peephole viewer camera apparatus 108 is mounted on door 100. Display 102 and front proximity sensor 104 are on the front face of camera apparatus front housing 106. In this embodiment, a housing hinge 1002 is present.

Figure 11:
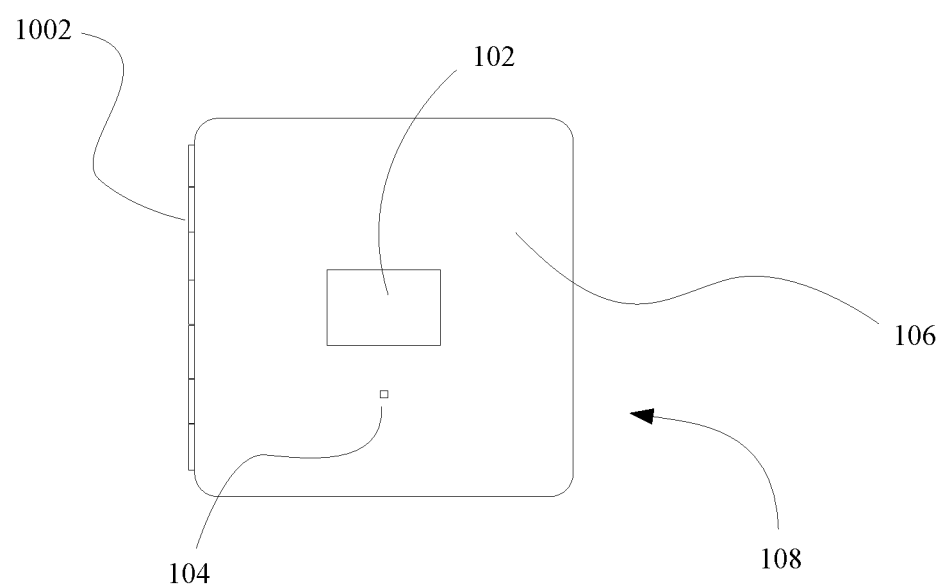

FIG. 11 shows a front view of the camera apparatus 108 with housing hinge 1002.

Figure 12:
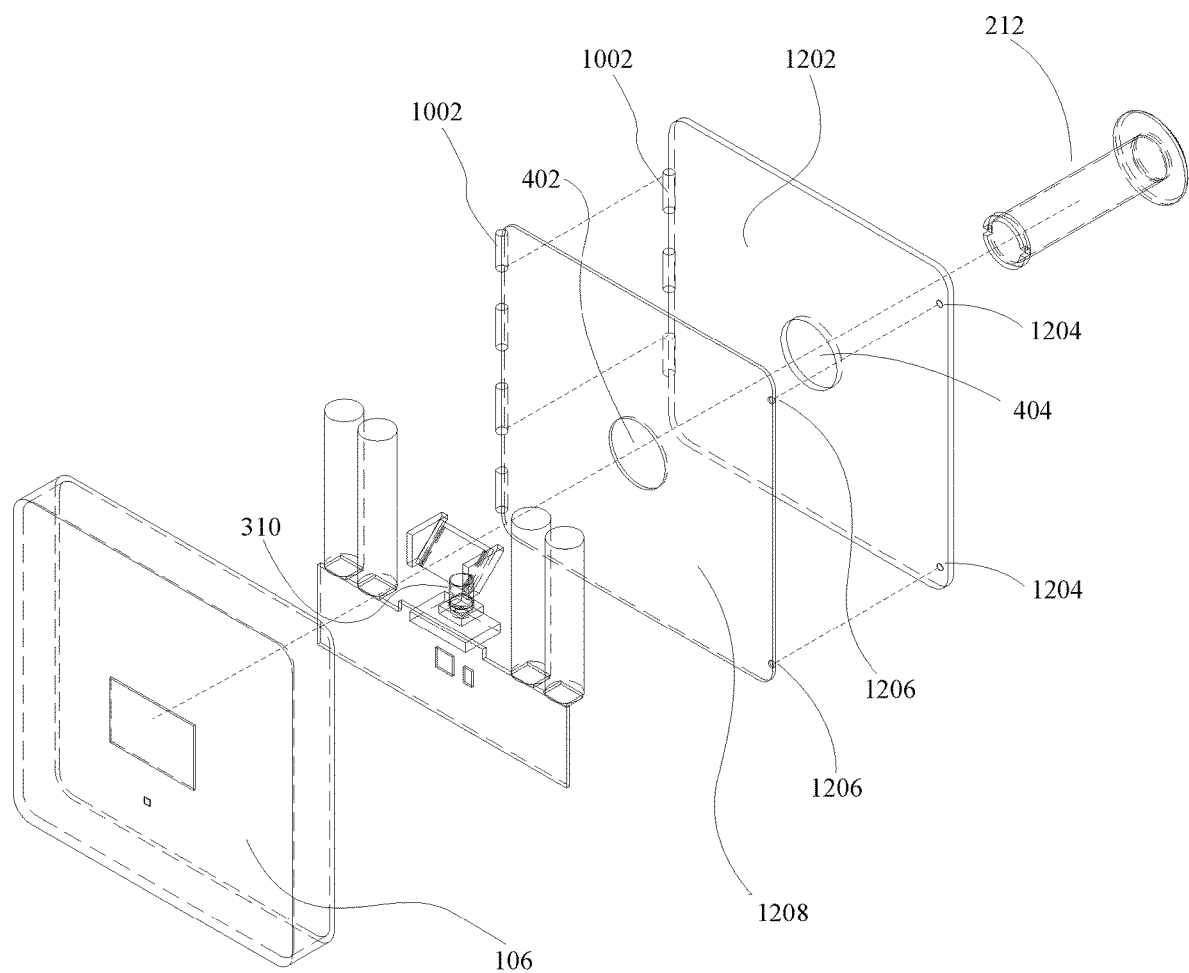

FIG. 12 shows an exploded view of the camera apparatus 108 in this embodiment. The front housing 106 is rigidly attached to hinged housing lid 1208, which has a housing lid viewing aperture 402. Lid 1208 is attached to hinged door bracket 1202 by housing hinge 1002. Door bracket 1202 includes door bracket viewing aperture 404. Lid 1208 has a fixed housing lid closure magnets 1206, while bracket 1202 has a fixed door bracket closure magnets 1204. Lid 1208 and bracket 1202 are pressed face to face, attached by hinge 1002. In this way, magnets 1206 and 1204 come into contact with each other. Similarly, aperture 402 and aperture 404 are co-linear with the optical axis of door peephole viewer 212 when lid 1208 and bracket 1202 are pressed face to face. Camera module 310 is also shown here, which is as described in other embodiments.

It should be noted that either magnet 1206 or magnet 1204 could be replaced by a ferromagnetic feature, but not both.

Operation—FIGS. 10, 11, 12, 14—Embodiment D

Figure 14:
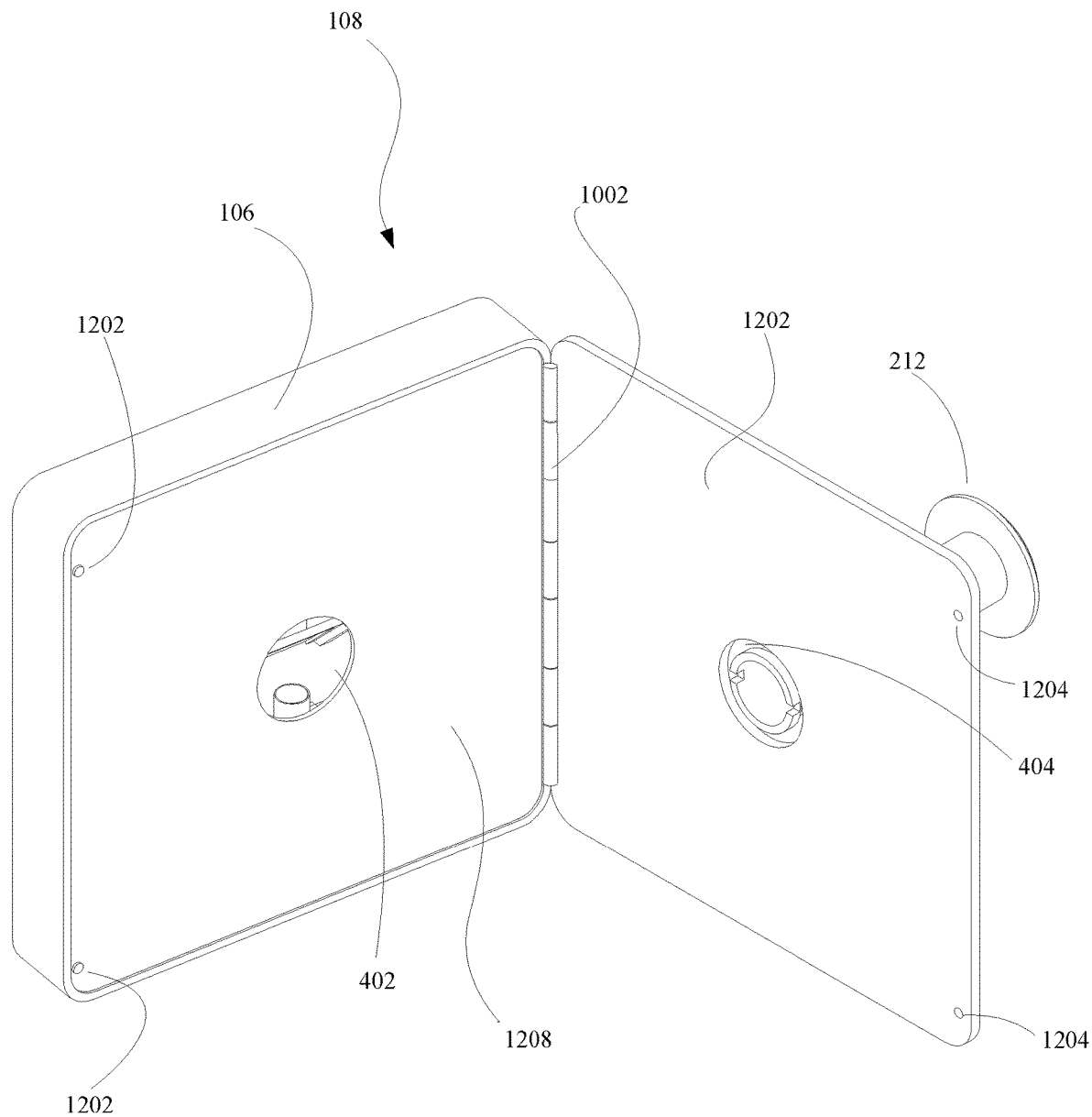

FIG. 14 shows an isometric view of the camera apparatus 108 in this embodiment, opened to show hinge operation. Hinged door bracket 1202 is affixed to the door by removable adhesive tape such that aperture 404 is centered on the optical axis of peephole viewer 212. Bracket 1202 is attached to lid 1208 by hinge 1002. As housing 106 is rigidly attached to lid 1208, the housing 106 therefore can be rotated to the side, as it pivots around the hinge 1002. Opening it as shown in FIG. 14 allows the person to look through the peephole viewer 212 unimpeded.

Once done looking through the peephole viewer 212, the person can rotate the front housing 106 toward bracket 1202 until the bracket 1202 and lid 1208 surfaces are flush with each other. Magnets 1206 and 1204 will engage to ensure that the housing 106 stays in place relative to bracket 1202. This ensures that the optical path from the peephole viewer 212 will pass through apertures 404 and 402 such the camera module 310 again has a clear view through the peephole viewer 212.

Figure 15:
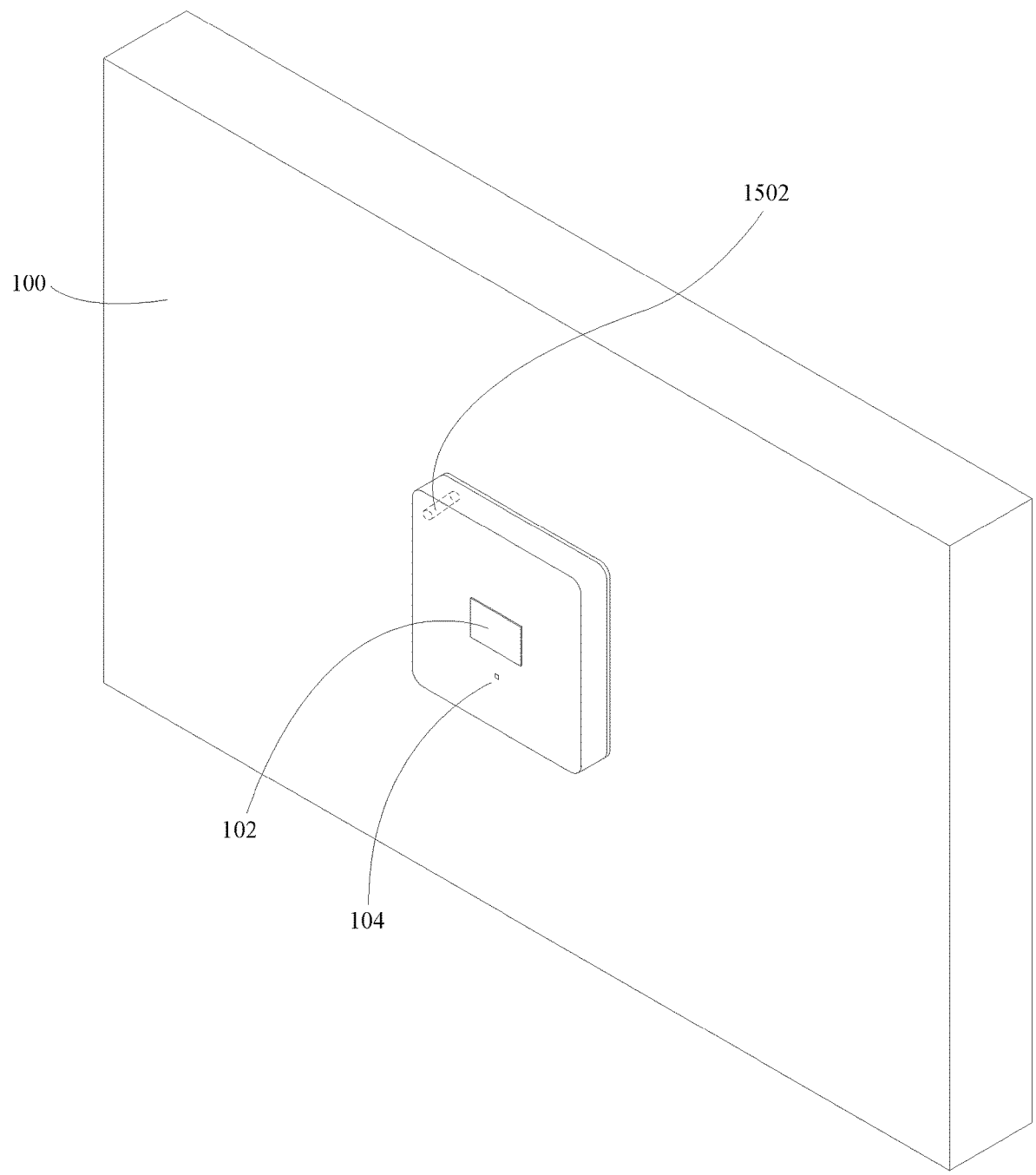
Figure 16:
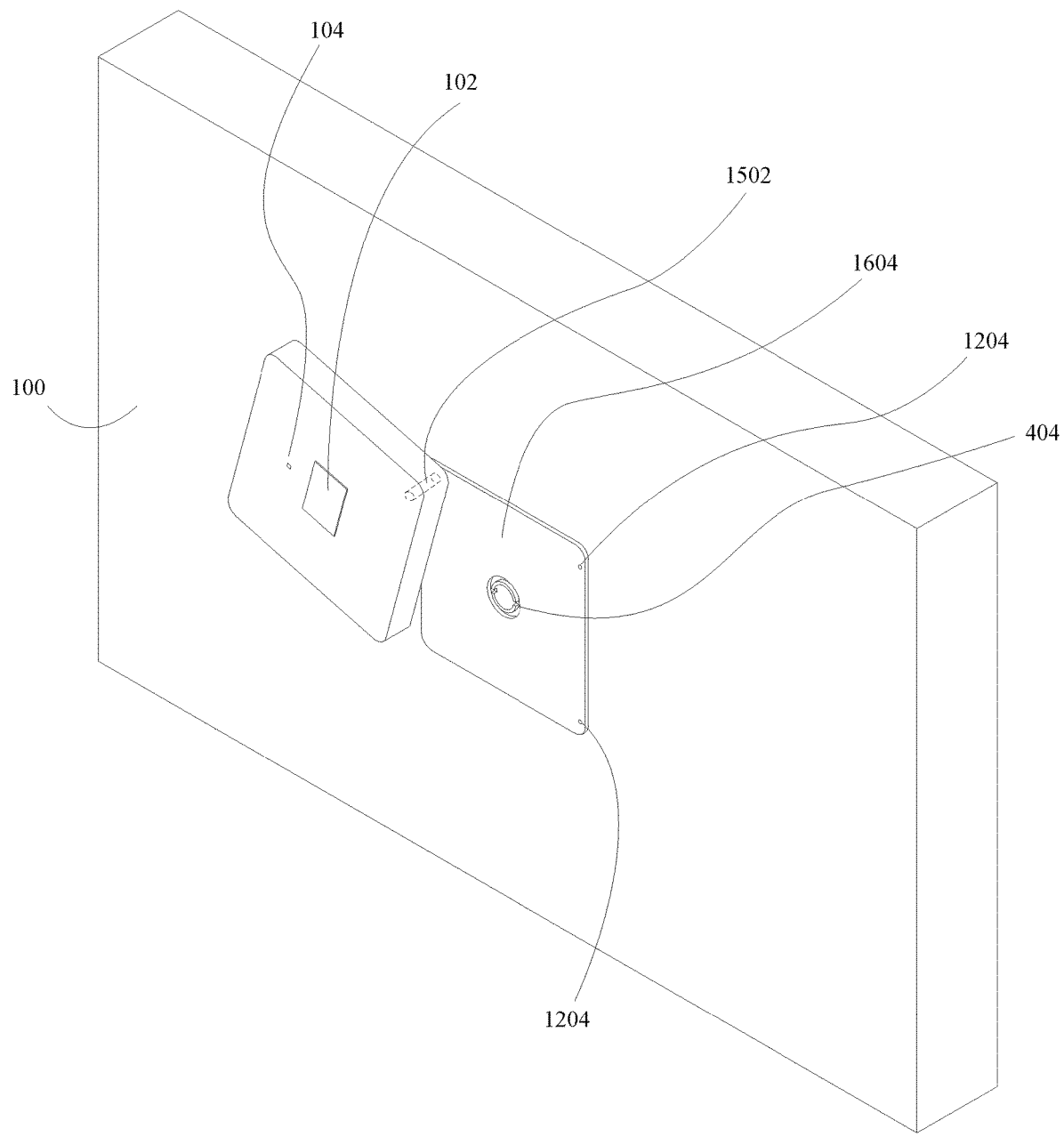
Figure 17:
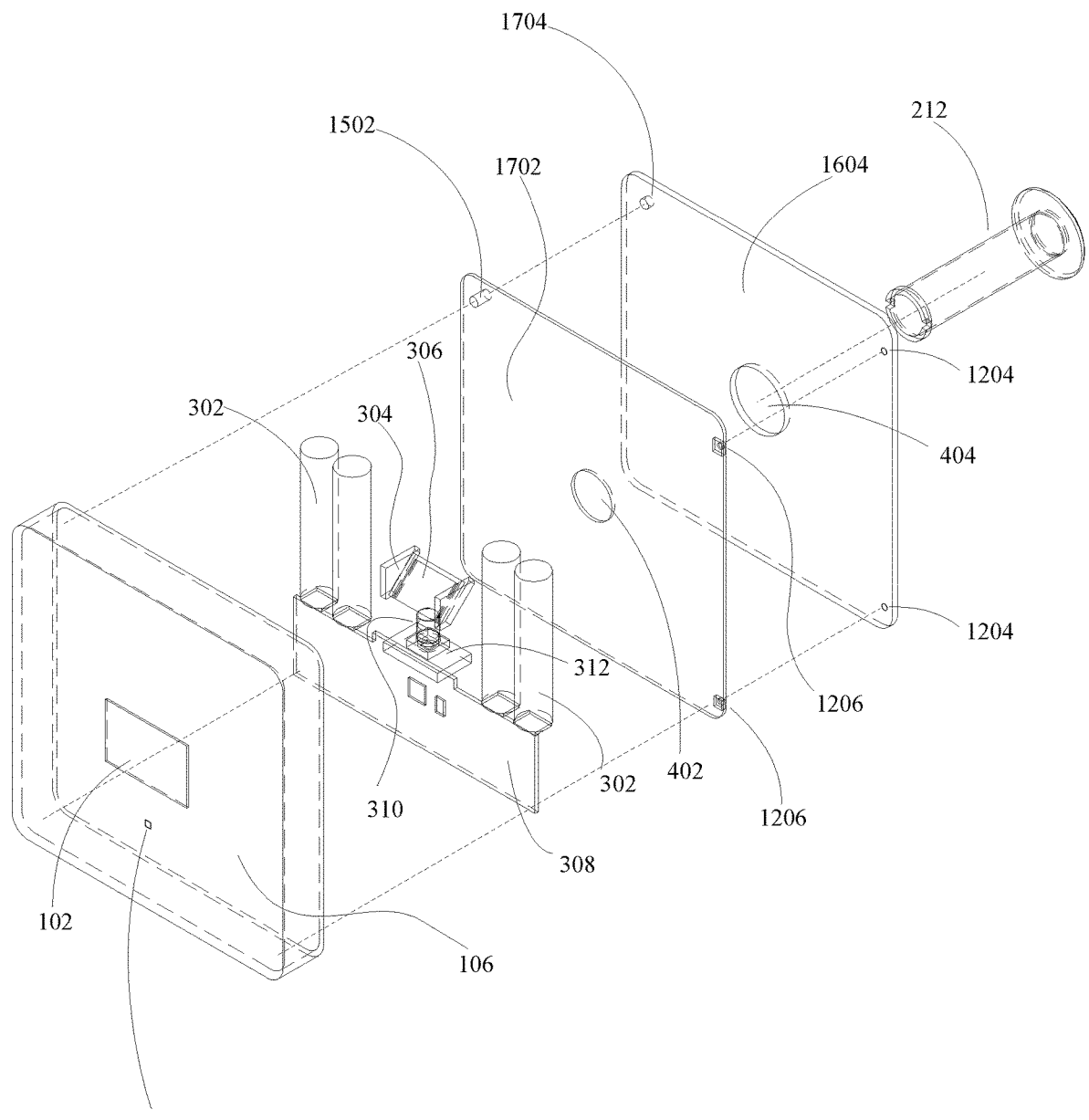

Detailed Description—FIGS. 15, 16, 17—Embodiment E

Embodiment E is similar to embodiment D, but uses a different type of hinge. FIG. 15 shows an isometric view of the camera apparatus 108 in this embodiment, installed on the door 100. Display 102 and front proximity sensor 104 are on the front face of camera apparatus front housing 106. In this embodiment, a housing pivot-hinge 1502 is present.

FIG. 17 shows an exploded view of the camera apparatus 108 in this embodiment. The front housing 106 is rigidly attached to pivot-hinged housing lid 1502, which has a housing lid viewing aperture 402. Lid 1702 is attached to pivot-hinged door bracket 1604 by hinge 1502. Door bracket 1604 includes door bracket viewing aperture 404. Lid 1502 has affixed housing lid closure magnets 1206, while bracket 1604 has affixed door bracket closure magnets 1204. Lid 1702 and bracket 1604 are pressed face to face, attached by pivot-hinge 1502. In this way, magnets 1206 and 1204 come into contact with each other. Similarly, aperture 402 and aperture 404 are co-linear with the optical axis of door peephole viewer 212 when lid 1702 and bracket 1604 are pressed face to face. Camera module 310 is also shown here, which is as described in other embodiments.

Operation—FIGS. 15, 16, 17—Embodiment E

FIG. 16 shows an isometric view of the camera apparatus 108 in this embodiment, opened to show hinge operation.

Pivot-hinged door bracket 1604 is affixed to the door by removable adhesive tape such that aperture 404 is centered on the optical axis of peephole viewer 212. Bracket 1604 is attached to lid 1702 by pivot-hinge 1502. As housing 106 is rigidly attached to lid 1702, the housing 106 therefore can be rotated to the side, as it pivots around the pivot-hinge 1502. Opening it as shown in FIG. 16 allows the person to look through the peephole viewer 212 unimpeded.

Once done looking through the peephole viewer 212, the person can rotate the front housing 106 toward peephole viewer 212 until the bracket 1604 and lid 1702 surfaces are flush with each other. Magnets 1206 and 1204 will engage to ensure that the housing 106 stays in place relative to bracket 1604. This ensures that the optical path from the peephole viewer 212 will pass through apertures 404 and 402 such the camera module 310 again has a clear view through the peephole viewer 212.

Detailed Description—FIGS. 18, 19, 20, 21, 22—Embodiment F

Embodiment F is similar to embodiment A, however, instead of a rigidly mounted mirror, embodiment F employs an actuator which can flip the mirror up by ninety degrees.

Figure 18:
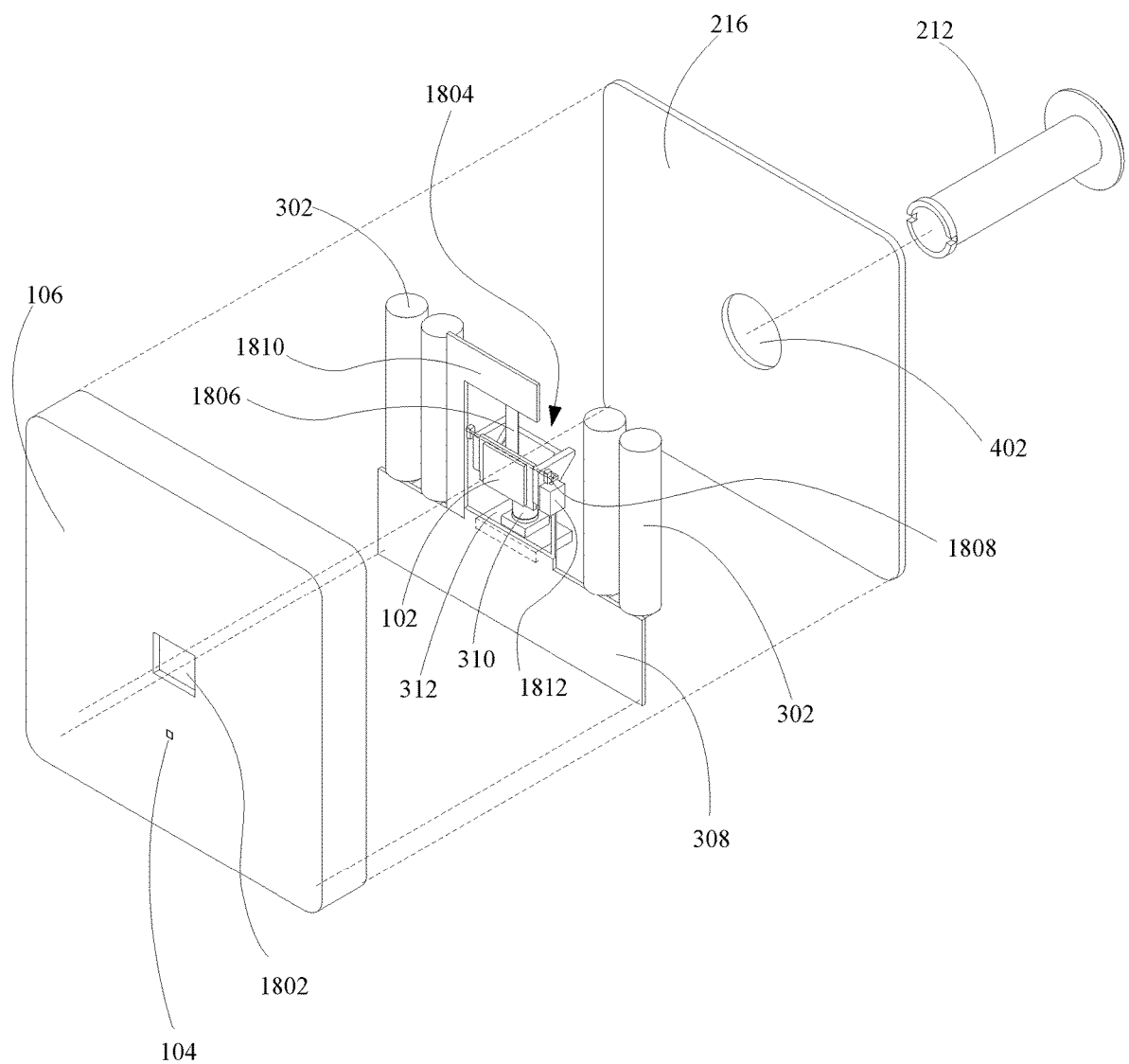

FIG. 18 shows an exploded isometric view of the peephole viewer camera apparatus 108 in this embodiment. Front housing 106 is rigidly attached to housing lid 216. Front housing 106 has a front housing viewer aperture 1802, which is along the optical path of peephole viewer 212 and housing lid aperture 402. Mirror actuator apparatus 1804 is attached to front housing 106 by mirror hinge pin 1808. Main processing board 308, batteries 302, mirror assembly actuator 1812, camera attachment bracket 312, and display mainboard bracket 1810 are all rigidly attached to the front housing 106. Display 102 is attached to the mirror actuator apparatus 1804 such that it is covers aperture 1802. A display FFC (flat flexible cable) 1806 connects display 102 to display mainboard bracket 1810, providing power and data. Front housing 106 also has a front proximity sensor 104 on its face.

Figure 19:
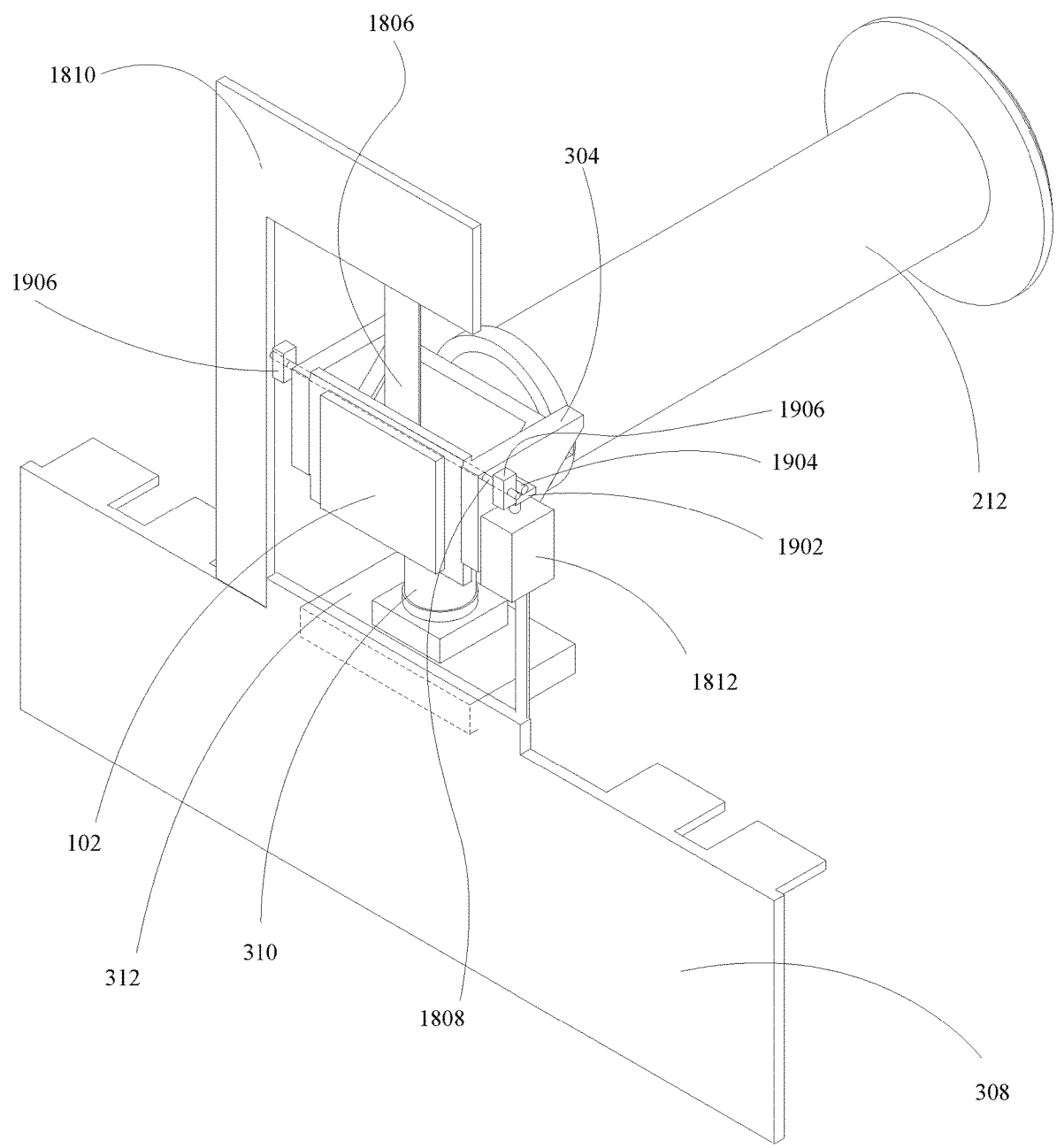

FIG. 19 shows an isometric view of the mirror actuator apparatus 1804. Mirror bracket 304, plunger receiving feature 1904, and display 102 are all rigidly attached together. Mirror hinge pin 1808 passes through mirror bracket 304, allowing the bracket 304 to rotate freely around the long axis of pin 1808. Pin 1808 also passes through hinge pin brackets 1906. Brackets 1906 are rigidly attached to front housing 106 (not shown here). Mirror assembly actuator 1812 has an actuator plunger 1902, which it drives up and down when electrical current is applied. Actuator 1812 is rigidly attached to housing 106.

Figure 20:
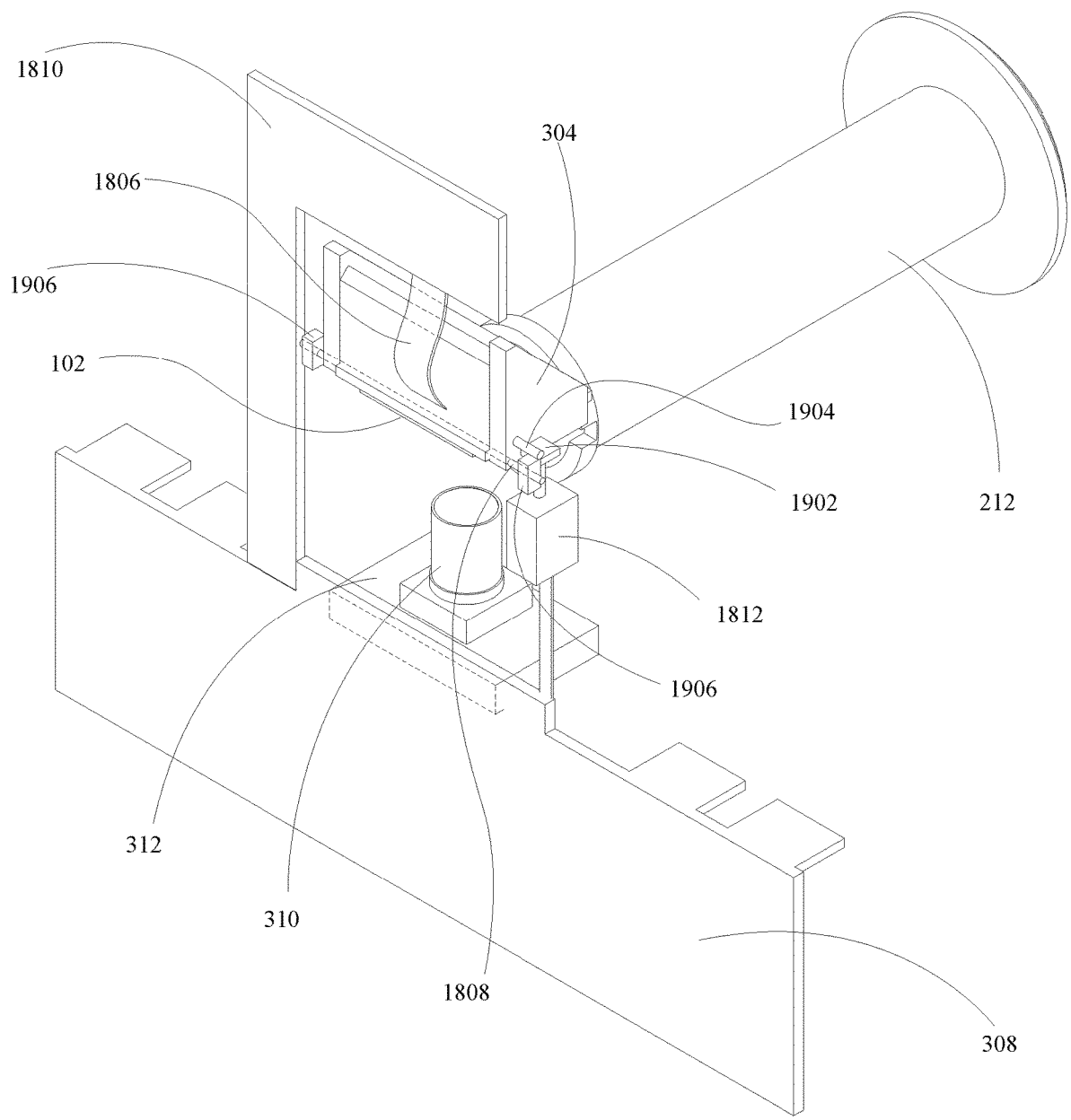

FIG. 20 shows an isometric view of the mirror actuator apparatus 1804, with the mirror flipped up by ninety degrees. Mirror bracket 304, plunger receiving feature 1904, and display 102 are all rigidly attached together. Mirror hinge pin 1808 passes through mirror bracket 304, allowing the bracket 304 to rotate freely around the long axis of pin 1808. Pin 1808 also passes through hinge pin brackets 1906. Brackets 1906 are rigidly attached to front housing 106 (not shown here). Mirror assembly actuator 1812 is also rigidly attached to housing 106. In this figure, the actuator 1812 is engaged, and actuator plunger 1902 is fully extended. Camera module 310 is attached to camera attachment bracket 312, which in turn is rigidly attached to main processing board 308. Peephole viewer 212 is shown as well.

Figure 21:
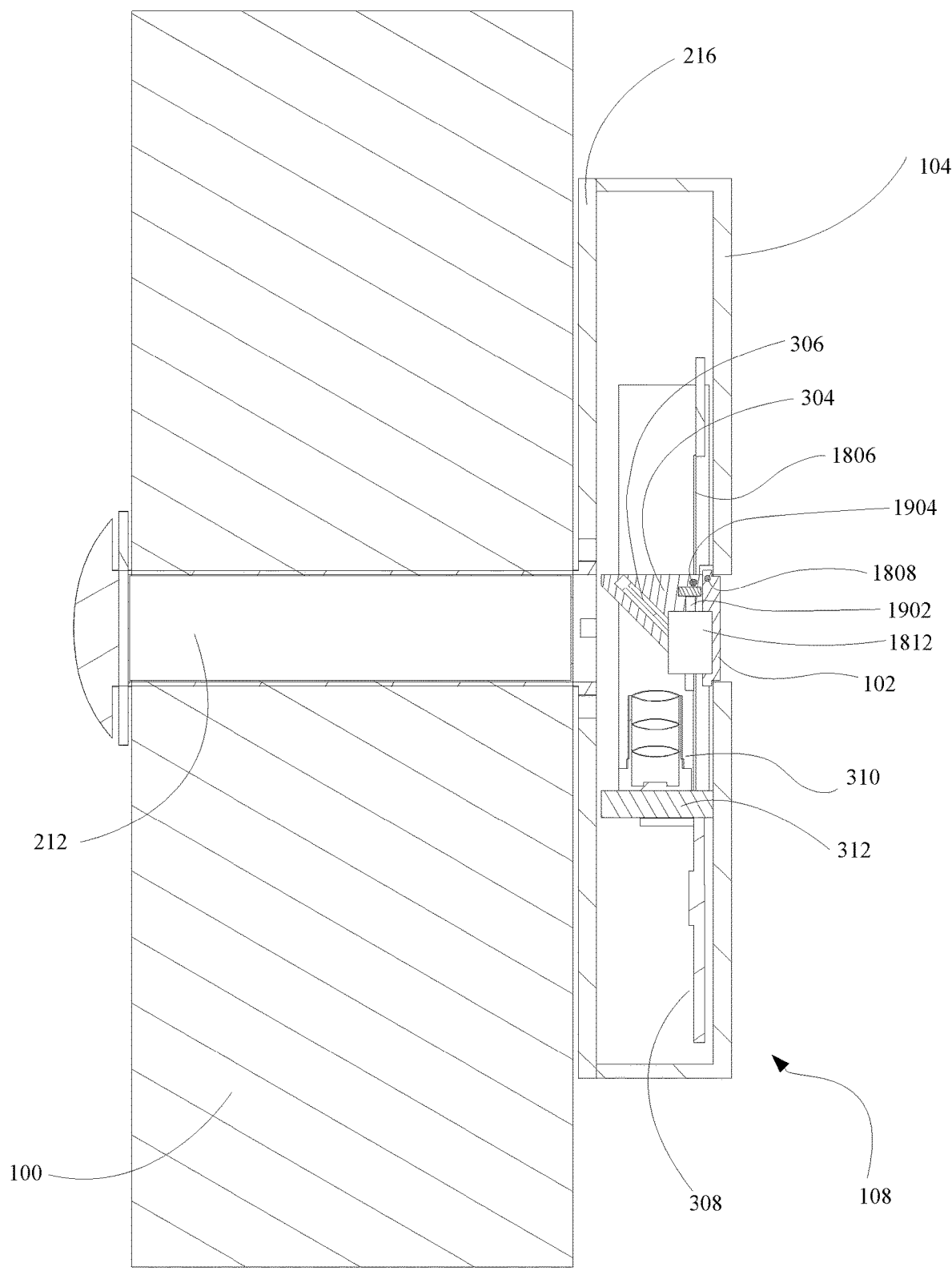

FIG. 21 shows a side cross-section view of the peephole viewer camera apparatus 108 in this embodiment, as it is mounted on the door 100. Housing lid 216 is rigidly attached to front housing 106. Lid 216 is attached to the door 100 by removable adhesive tape. Camera module 310 is attached to camera attachment bracket 312. Bracket 312 and main processing board 308 are rigidly attached to front housing 106. Mirror 306 is attached to mirror bracket 304 such that the mirror 306 is oriented at a forty-five degree angle relative to the optical axis of peephole viewer 212. Mirror 306 is also oriented at a forty-five degree angle relative to the optical axis of camera module 310. Mirror bracket 304 has plunger receiving feature 1904, which rests on top of actuator plunger 1902. The plunger 1902 is an integral part of mirror actuator 1812. Also shown is display FFC 1806, which is connected to display mainboard bracket 1810

Figure 22:
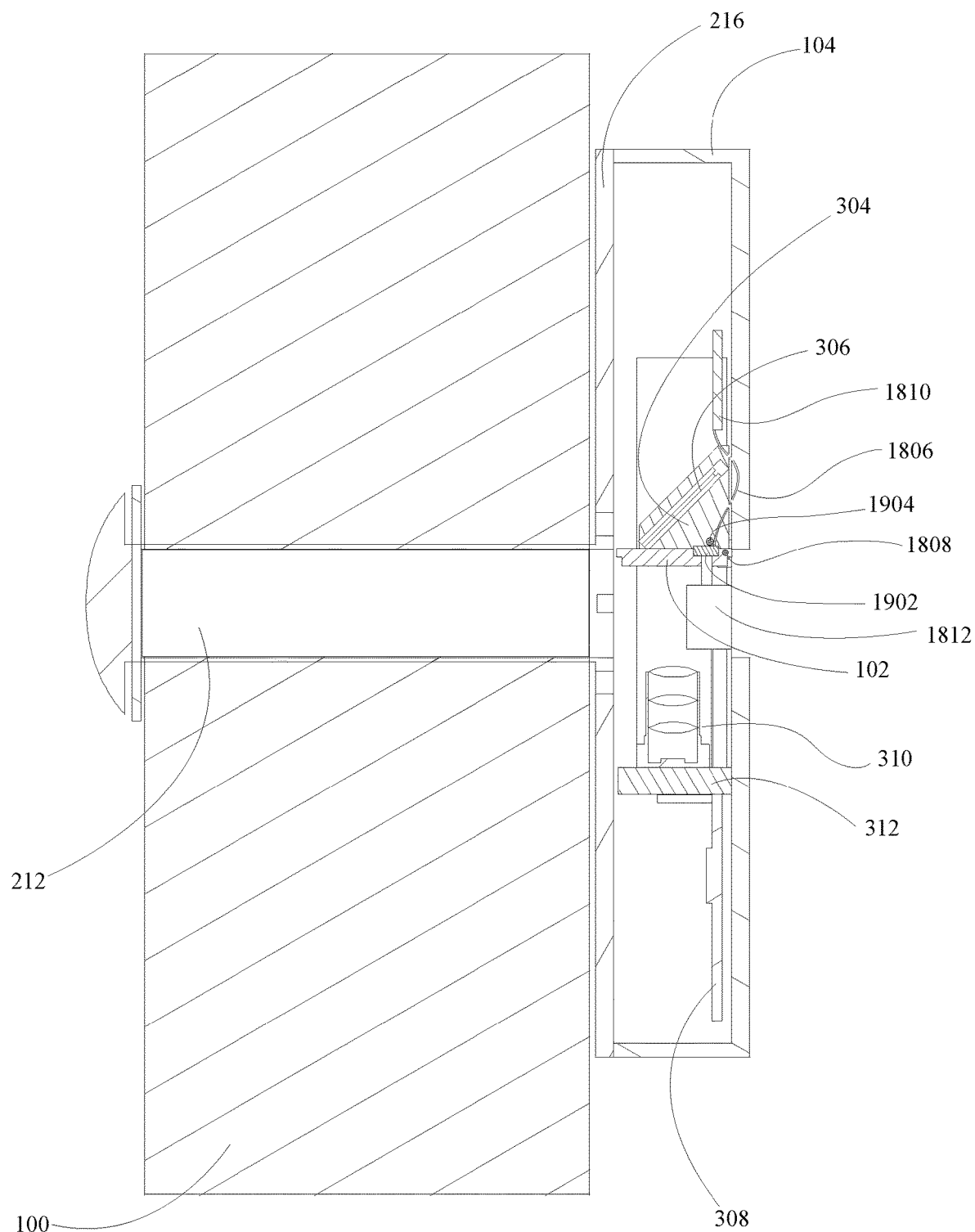

FIG. 22 shows a side cross-section view of the peephole viewer camera apparatus 108 in this embodiment, with the mirror flipped up by ninety degrees. Housing lid 216 is rigidly attached to front housing 106. Lid 216 is attached to the door 100 by removable adhesive tape. Camera module 310 is attached to camera attachment bracket 312. Bracket 312 and main processing board 308 are rigidly attached to front housing 106. Mirror 306 is attached to mirror bracket 304. Mirror bracket 304 has plunger receiving feature 1904, which rests on top of actuator plunger 1902. Here, the plunger 1902 is full extended, and mirror actuator 1812 is engaged. Also shown is display FFC 1806, which is connected to display mainboard bracket 1810.

Operation—FIGS. 18, 19, 20, 21, 22—Embodiment F

The peephole viewer camera apparatus 108 in this embodiment includes a mirror actuator apparatus 1804, which allows the mirror 306 to be flipped up by ninety degrees. In doing so, a person can look directly through front housing viewer aperture 1802 and have a clear view of peephole viewer 212. When the mirror 306 is flipped back down, the mirror 306 is oriented at a forty-five degree angle relative to the optical axis of peephole viewer 212. Mirror 306 is also oriented at a forty-five degree angle relative to the optical axis of camera module 310. Thus, the view through peephole viewer 212 is reflected such that its optical axis aligns with the camera module 310.

The mechanical motion of flipping up the mirror 306 is enabled by use of the mirror actuator 1812. The actuator 1812 can be a linear actuator or any other type of actuator apparatus which can convert electrical energy to linear motion. Plunger receiving feature 1904 rests on the actuator plunger 1902. When the actuator 1812 is engaged, it drives the plunger 1902 upwards, pushing up the plunger receiving feature 1904, which is rigidly attached to mirror bracket 304 and mirror 306. Mirror bracket 304 is constrained to rotate around mirror hinge pin 1808. Thus, when the plunger 1902 moves upwards, it rotates the mirror bracket and mirror up by ninety degrees.

When the actuator is disengaged, the plunger 1902 will return to its original position. Thus, the mirror bracket and mirror will rotate back down to their original position aided by gravity. Alternatively, a spring could be added to push the mirror back to its original rotation.

The front housing 106 has proximity sensor 104, which can sense when a person is within a threshold distance. This proximity sensor can be configured to engage the actuator 1812 when a person comes close enough to the peephole viewer camera apparatus 108. Thus, when a person approaches the apparatus 108 to look through the peephole viewer, the mirror bracket 304, mirror 306, and display 102 will flip up and allow the person a clear view through the peephole viewer 212. When the person moves away, the mirror bracket 304, mirror 306, and display 102 will flip back down to cover the front housing viewer aperture 1802. In this configuration, the display 102 will be visible on the front housing 106.

The display 102 can be turned on based on any type of logic provided from the mainboard. It may also be turned on or off by a threshold distance as reported by the proximity sensor 104. Alternatively, the display 102 can be eliminated, replaced by an opaque material such as plastic or metal.

It should be noted that although the actuator 1812 is described as a linear actuator, it could be replaced by a rotational actuator or any other type of actuator apparatus which can convert electrical energy to rotational motion.

Detailed Description—FIGS. 23, 24, 25, 26—Embodiment G

Embodiment G is similar to embodiment F, but includes an external lever instead of a motorized actuator to flip the mirror.

Figure 23:
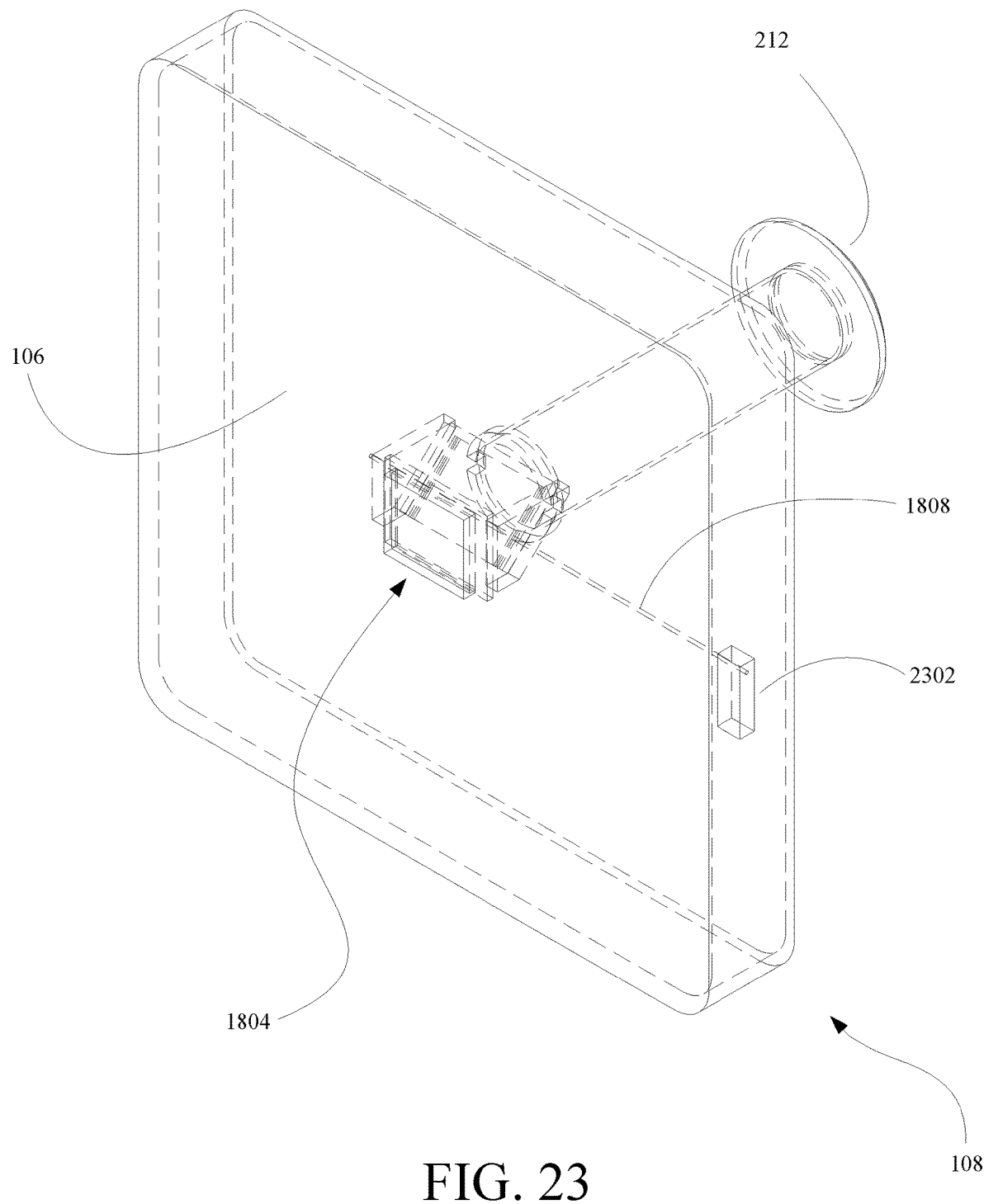

FIG. 23 shows an isometric view of the peephole viewer camera apparatus 108 in this embodiment. Mirror actuator apparatus 1804 is attached to front housing 106 by mirror hinge pin 1808. Hinge pin 1808 is extended to the side face of housing 106, where it attaches to mirror actuator lever 2302.

Figure 24:
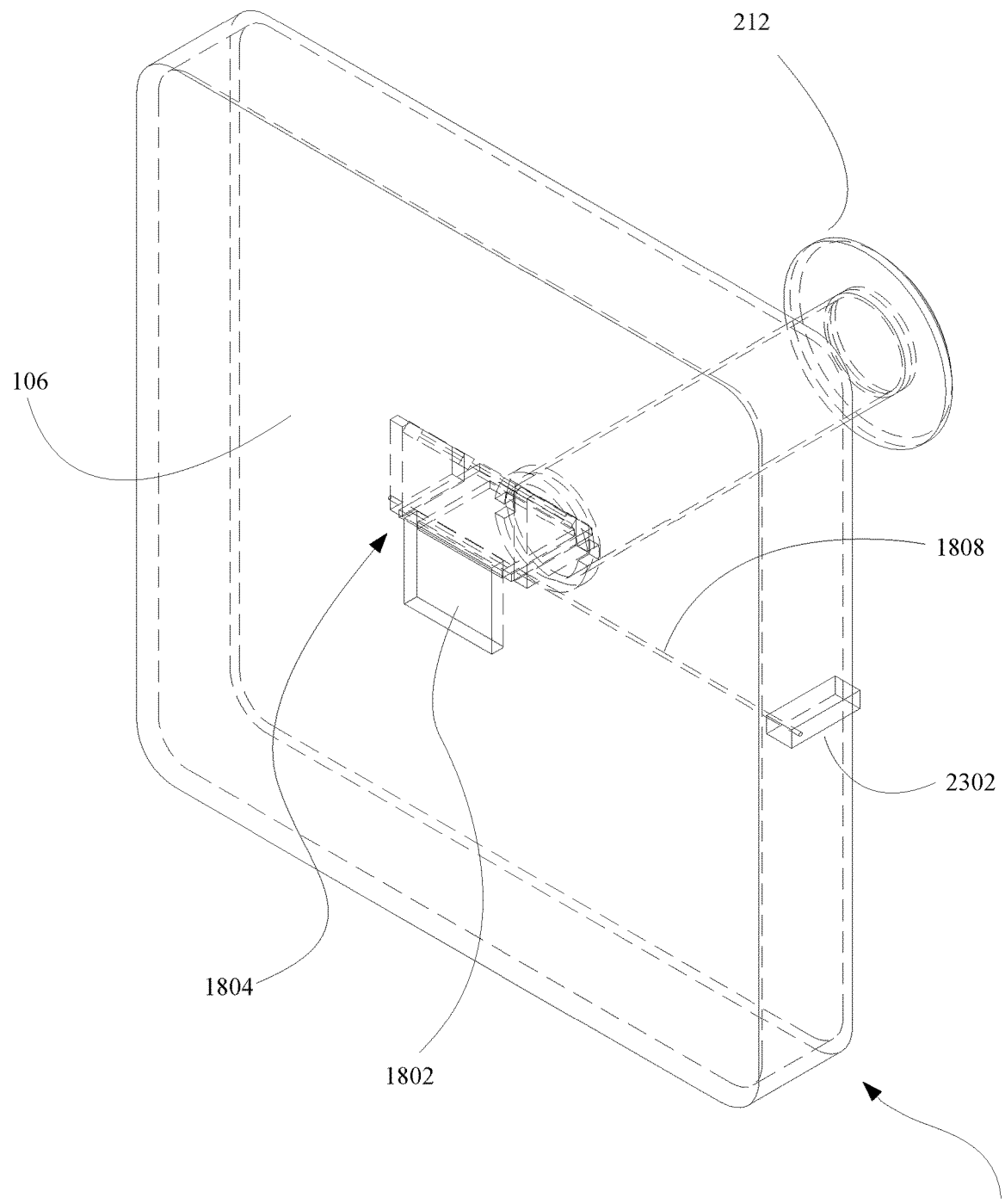

FIG. 24 shows an isometric view of the peephole viewer camera apparatus 108 in this embodiment, with the mirror flipped up. Mirror actuator apparatus 1804 is attached to front housing 106 by mirror hinge pin 1808. Hinge pin 1808 is extended to the side face of housing 106, where it attaches to mirror actuator lever 2302. With the mirror flipped up, a person can look through front housing viewer aperture 1802, and have an unobstructed view through peephole viewer 212.

Figure 25:
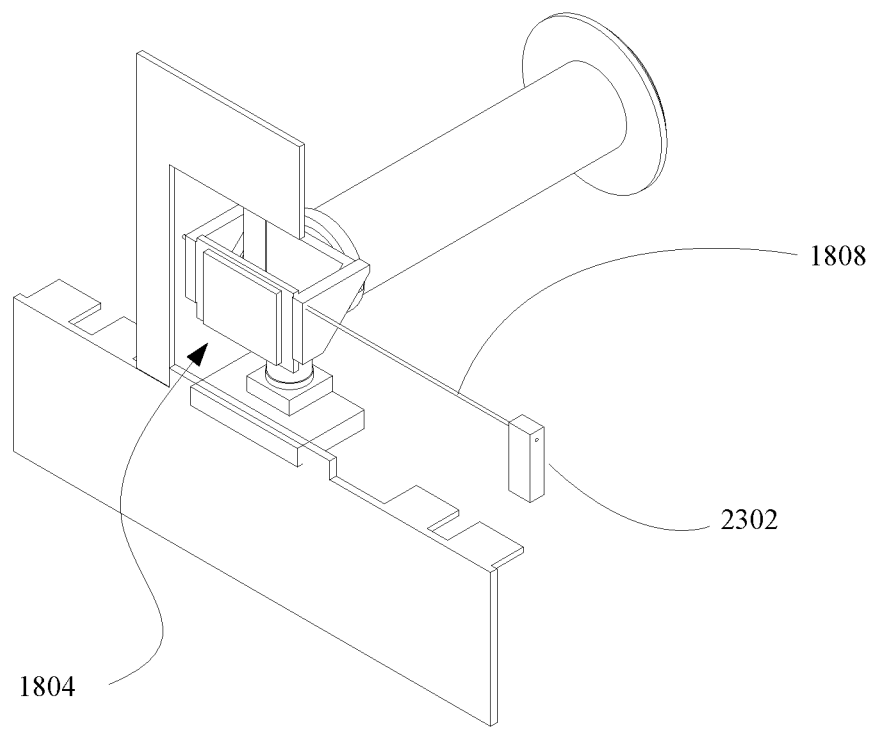

FIG. 25 shows an isometric internal view of the mirror actuator apparatus 1804. Hinge pin 1808 attaches to mirror actuator lever 2302.

Figure 26:
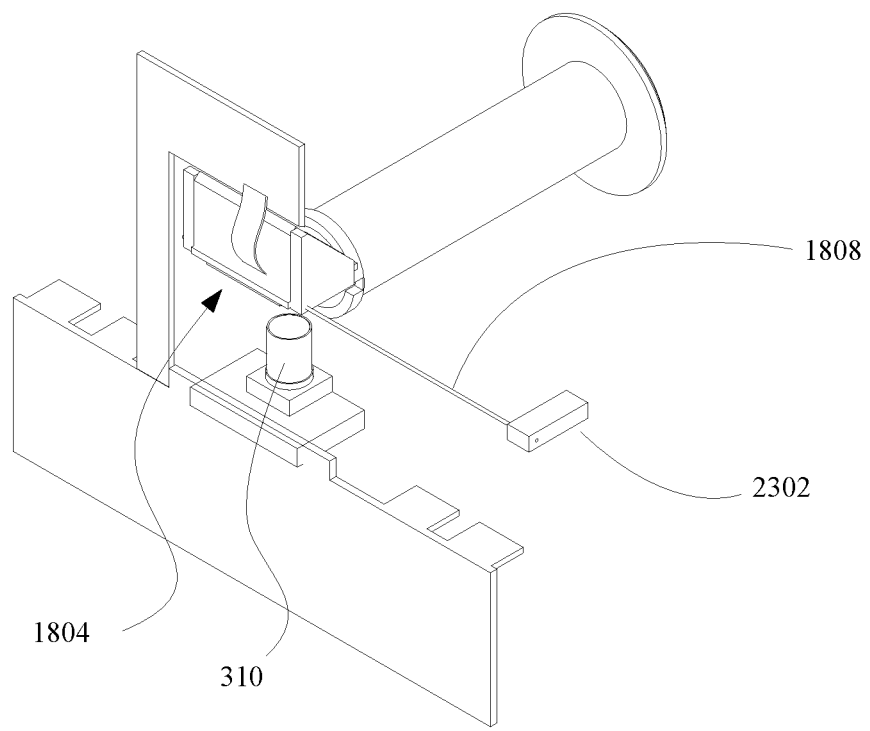

FIG. 26 shows an isometric internal view of the mirror actuator apparatus 1804, which is flipped up by lever 2302. Hinge pin 1808 attaches to mirror actuator lever 2302.

Operation—FIGS. 23, 24, 25, 26—Embodiment G

The operation of this embodiment is very similar to embodiment F. However, the person who wishes to look through the peephole viewer 212 must rotate the lever 2302 up by ninety degrees. Once rotated up by ninety degrees, the person can look through front housing viewer aperture 1802 and have an unobstructed view through peephole viewer 212. This is illustrated in FIG. 26. When the person releases the lever 2302, gravity will pull the mirror actuator apparatus 1804 down, as shown in FIG. 25. Alternatively, a spring may be added to apply downward force on apparatus 1804. Thus, the mirror is situated such that it reflects the view from peephole viewer 212 onto camera module 310, as described in the previous embodiment F.

Although not shown, a feature may be added to housing 106 in order to stop the mirror actuator apparatus 1804 from rotating too far in either direction.

Detailed Description—FIGS. 27, 28, 29, 30—Embodiment H

Embodiment H is similar to embodiment G, but uses a different type of lever actuator to flip up the mirror.

Figure 27:
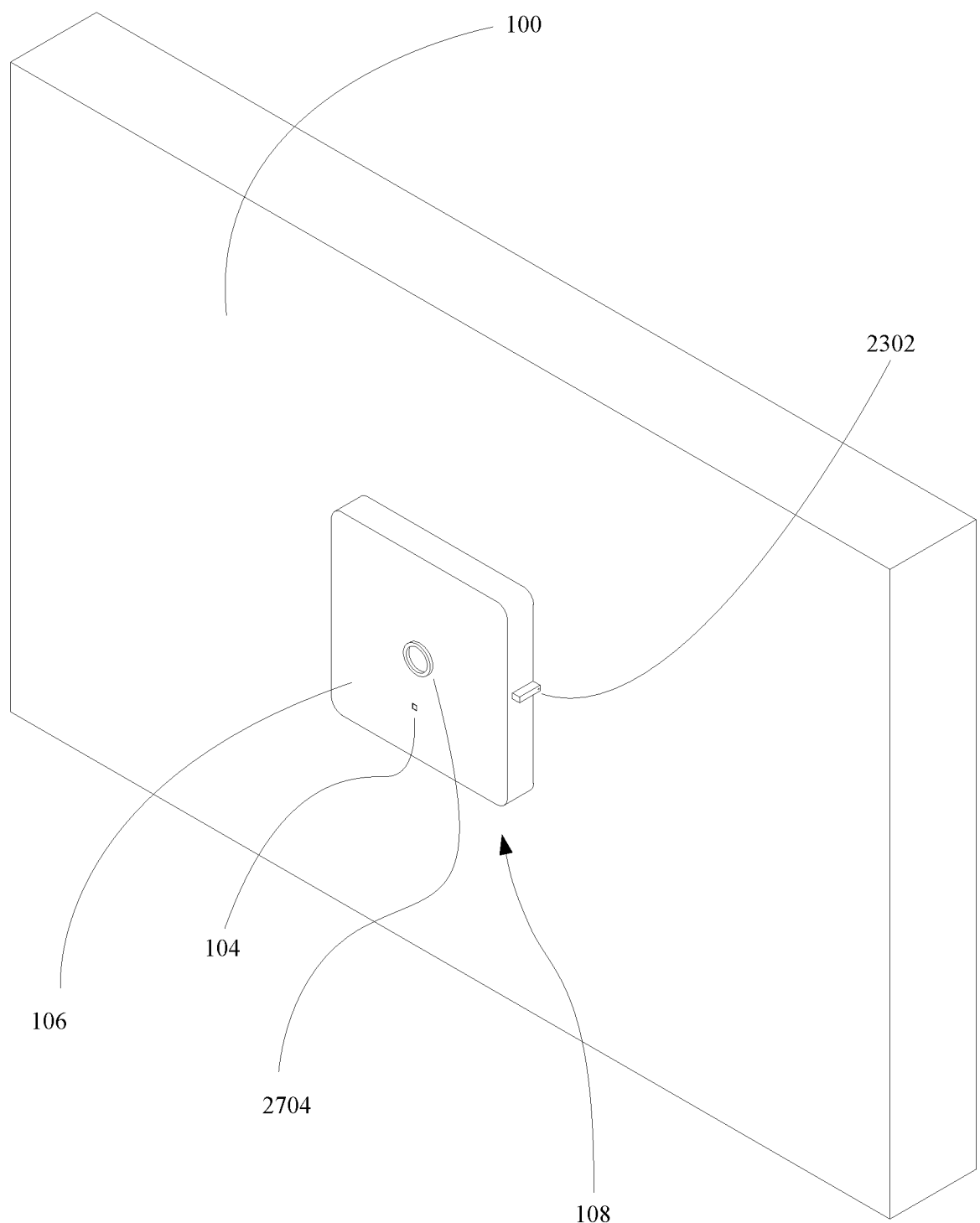

FIG. 27 shows an isometric view of the peephole viewer camera apparatus 108 in this embodiment, mounted on the door 100. Apparatus 108 includes a front housing 106, front proximity sensor 104, fixed front housing viewer aperture 2704, and mirror actuator lever 2302.

Figure 28:
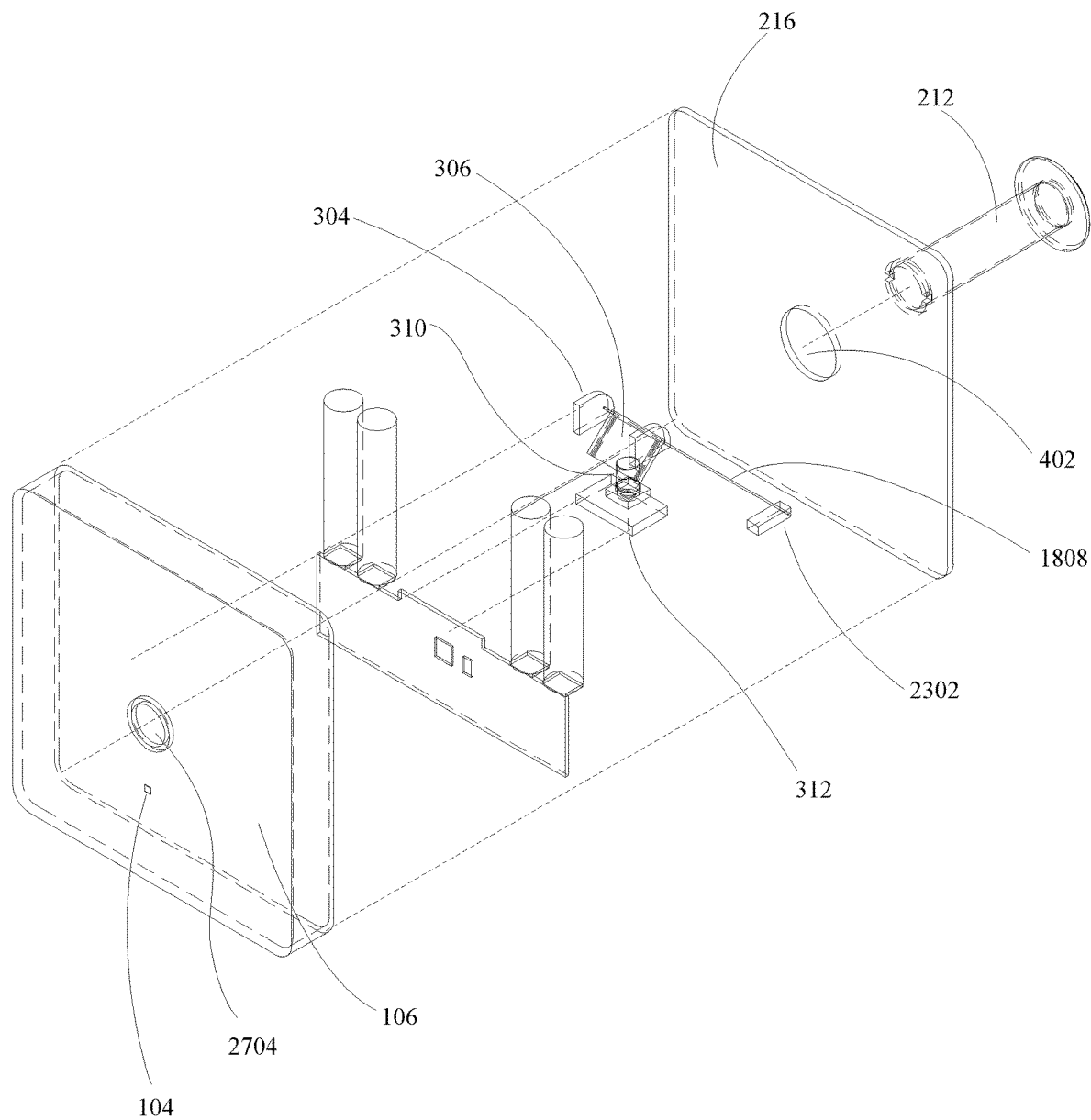

FIG. 28 shows an exploded isometric view of the peephole viewer camera apparatus 108 in this embodiment. Housing 106 is rigidly attached to lid 216. Door peephole viewer 212 defines an optical axis which is aligned with housing lid viewing aperture 402, mirror 306, and aperture 2704. Below mirror 306 is camera module 310, which is attached to bracket 312 such that its the camera module 310 optical axis is 90 degrees offset from optical axis of peephole viewer 212. Mirror bracket 304 is rigidly attached to front housing 106. Hinge pin 1808 is rigidly attached to mirror 306 and mirror actuator lever 2302 such that the angle between mirror 306 and lever 2302 is forty-five degrees. Hinge pin 1808 passes through bracket 304 such that it can rotate freely relative to the bracket 304.

Figure 29:
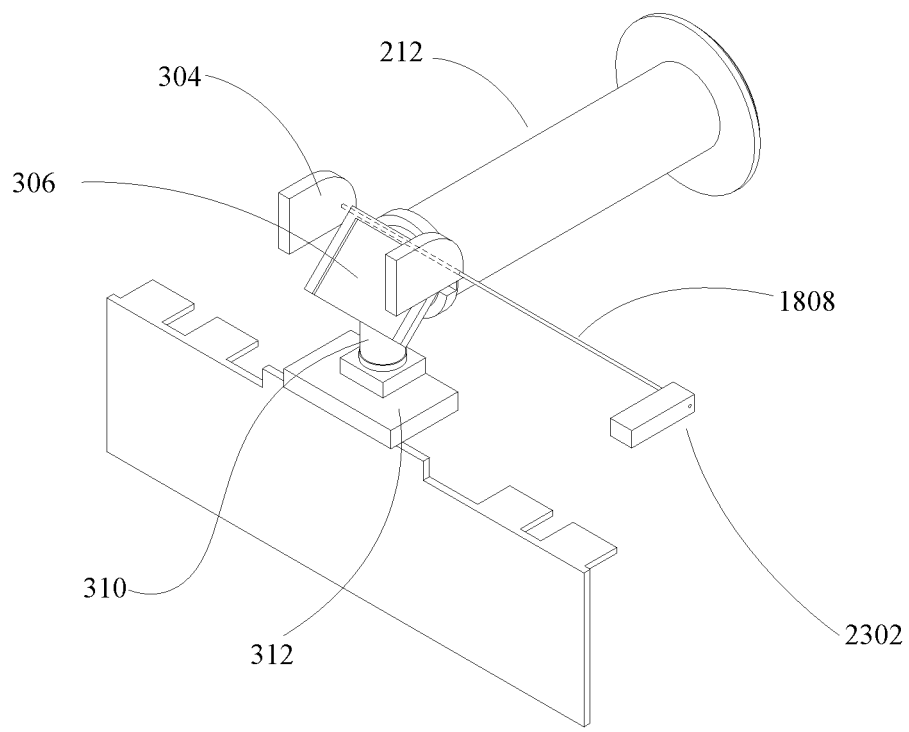

FIG. 29. shows an internal isometric view of the apparatus 108 in this embodiment. Hinge pin 1808 is rigidly attached to mirror 306 and mirror actuator lever 2302 such that the angle between mirror 306 and lever 2302 is forty-five degrees. Hinge pin 1808 passes through bracket 304 such that it can rotate freely relative to the bracket 304. Below mirror 306 is camera module 310, which is attached to bracket 312.

Figure 30:
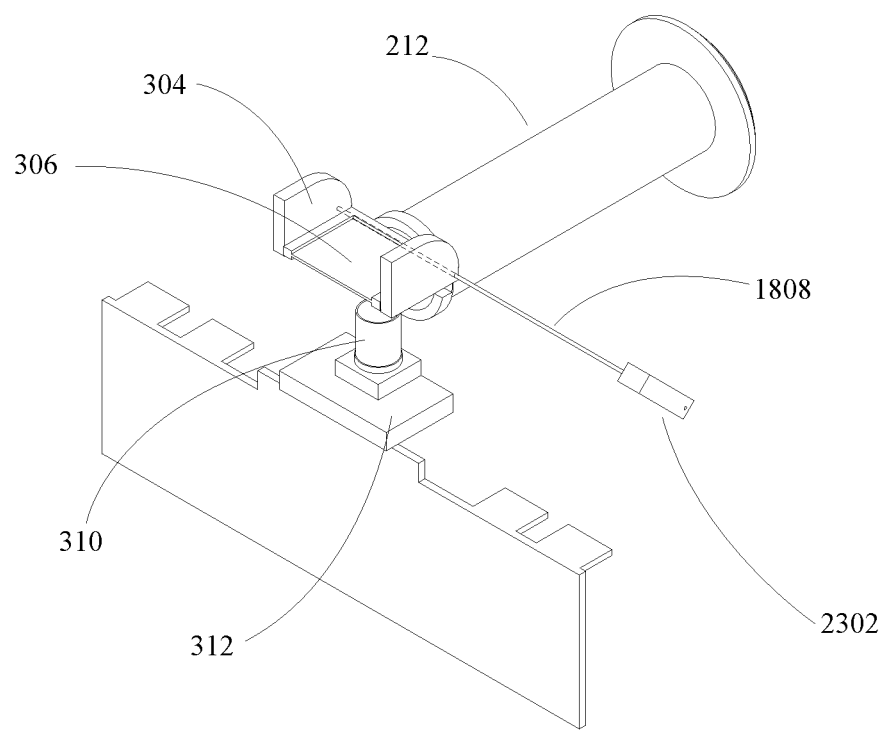

FIG. 30. shows an internal isometric view of the apparatus 108 in this embodiment, with the mirror 306 and lever 2302 flipped up by forty-five degrees. Hinge pin 1808 is rigidly attached to mirror 306 and mirror actuator lever 2302 such that the angle between mirror 306 and lever 2302 is forty-five degrees. Hinge pin 1808 passes through bracket 304 such that it can rotate freely relative to the bracket 304. Below mirror 306 is camera module 310, which is attached to bracket 312.

Operation—FIGS. 27, 28, 29, 30—Embodiment H

The operation of this embodiment is very similar to embodiment H, but differs in how the lever 2302 actuates the rotation of the mirror 306. The person who wishes to look through the peephole viewer 212 must rotate the lever 2302 up by forty-five degrees. As the mirror 306, hinge pin 1808, and lever 2302 are all rigidly connected, the act of rotating the lever 2302 up will create the same rotation in the mirror 306. With the mirror 306 rotated up by forty-five degrees, the person can look through the fixed front housing viewer aperture 2704 and have an unobstructed view through peephole viewer 212. This is illustrated in FIG. 30. When the person releases the lever 2302, gravity will pull the mirror 306 and lever 2302 back down, as shown in FIG. 29. Alternatively, a spring may be added to apply downward force on lever 2302. Thus, the mirror is situated such that it reflects the view from peephole viewer 212 onto camera module 310, as described in the previous embodiment H.

Although not shown, a feature may be added to housing 106 in order to stop the lever 2302 and mirror 306 from rotating too far in either direction.

Detailed Description—FIGS. 31, 32, 33, 34, 35, 36, 37—Embodiment J

This embodiment describes a peephole viewer apparatus with integrated sensors. This apparatus is similar to the wide-angle optical door viewer apparatus described in U.S. Pat. No. 4,269,474. However, the embodiment described herein adds an integrated proximity sensor.

Figure 31:
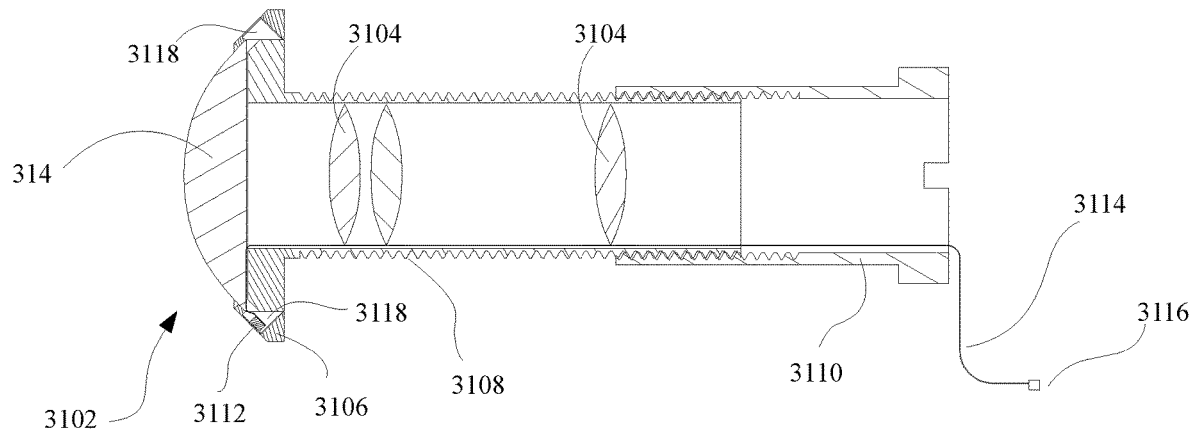

FIG. 31 shows a side cross-section view of peephole viewer apparatus with integrated sensors 3102. Peephole front housing tube 3108 is threaded such that it can be screwed into rear housing tube 3110, which is also threaded. Front housing tube 3108 includes one or more peephole lens elements 3104. Primary lens 314 is aligned with the optical axis of lenses 3104. This optical axis is also aligned with housing tube 3108 and 3110. Peephole front flange ring 3106 is threaded, and fits over primary lens 314. Front flange ring 3106 has one or more flange ring sensor recesses 3118. Sensor 3112 is placed inside of sensor recess 3118. Sensor 3112 is connected to sensor FFC 3114 (flat flexible cable), which is terminated by FFC connector 3116.

In this embodiment, the sensor 3112 is a time-of-flight (ToF) sensor, which can report proximity of an object. It requires only two small apertures to emit and collect infrared light. An example sensor is about three millimeters in length, and two millimeters wide. The required sensor apertures may be as small as one millimeter in diameter.

Note that the sensor may be of any variety including but not limited to time-of-flight, passive infrared, image or camera-based, microphone, LIDAR, ultrasonic, or other type of proximity sensor.

Figure 32:
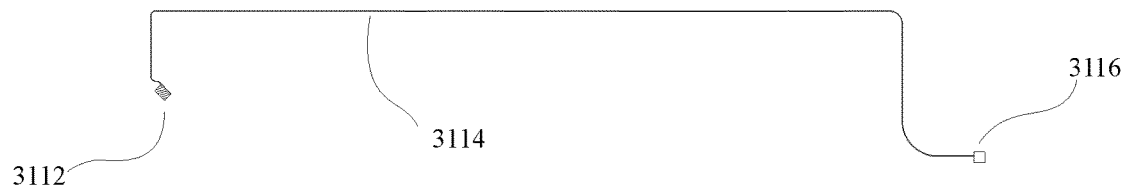

FIG. 32 shows a side cross-section view of the sensor 3112, sensor FFC 3114, and FFC connector 3116.

Figure 33:
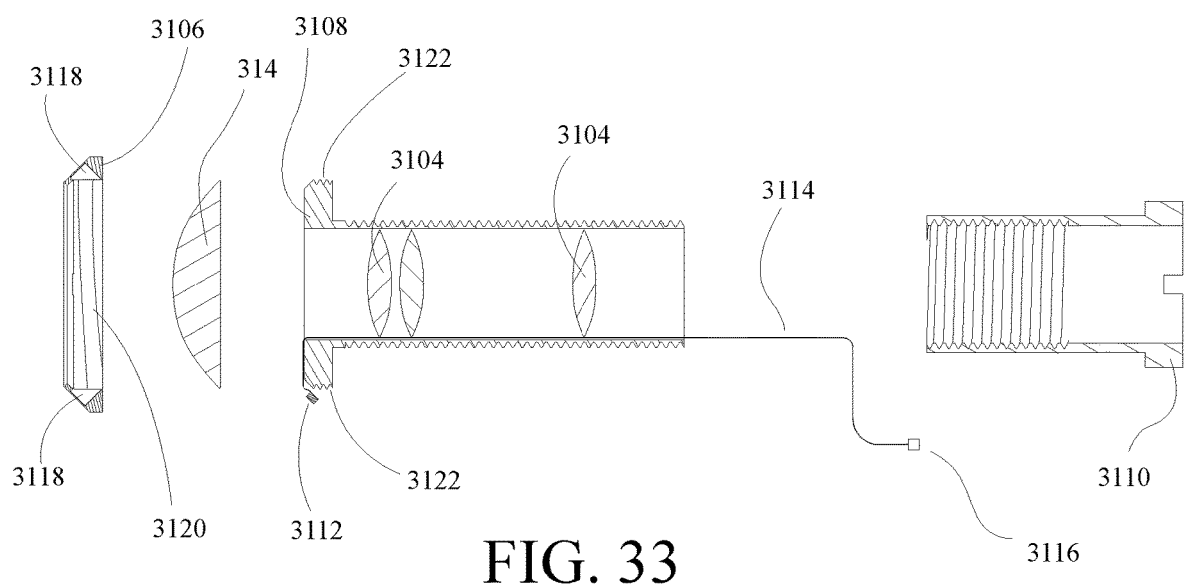

FIG. 33 shows a side cross-section exploded view of the peephole viewer apparatus 3102. This view shows the same labeled components as FIG. 31. It also shows flange ring threads 3120, and flange receiving threads 3122. These threads allow the front flange ring 3106 to be screwed onto the front housing tube 3108.

Figure 34:
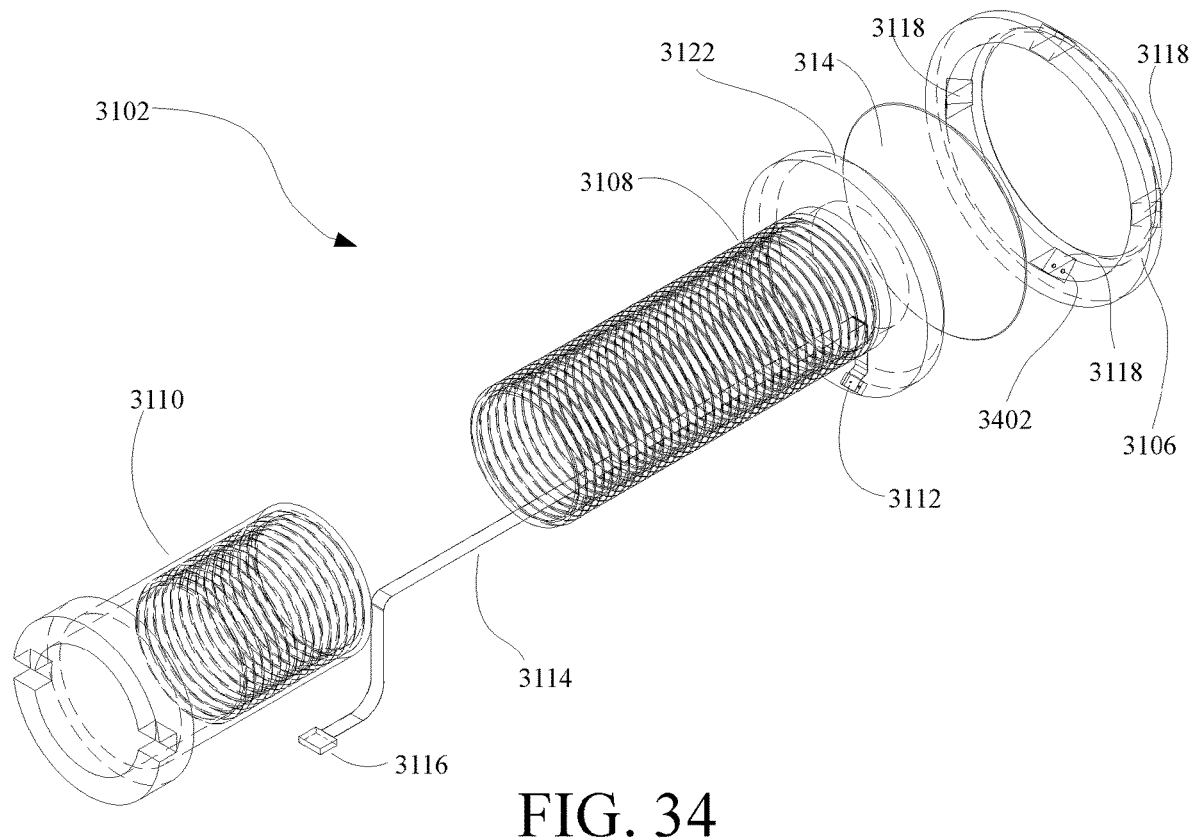

FIG. 34 shows an isometric exploded view of the peephole viewer apparatus with integrated sensors 3102. This view shows the same labeled components as FIG. 31. and FIG. 33. It shows a clearer view of the recess 3118, which has flange ring sensor apertures 3402 to allow the sensor to see or hear through the flange ring 3106.

Figure 35:
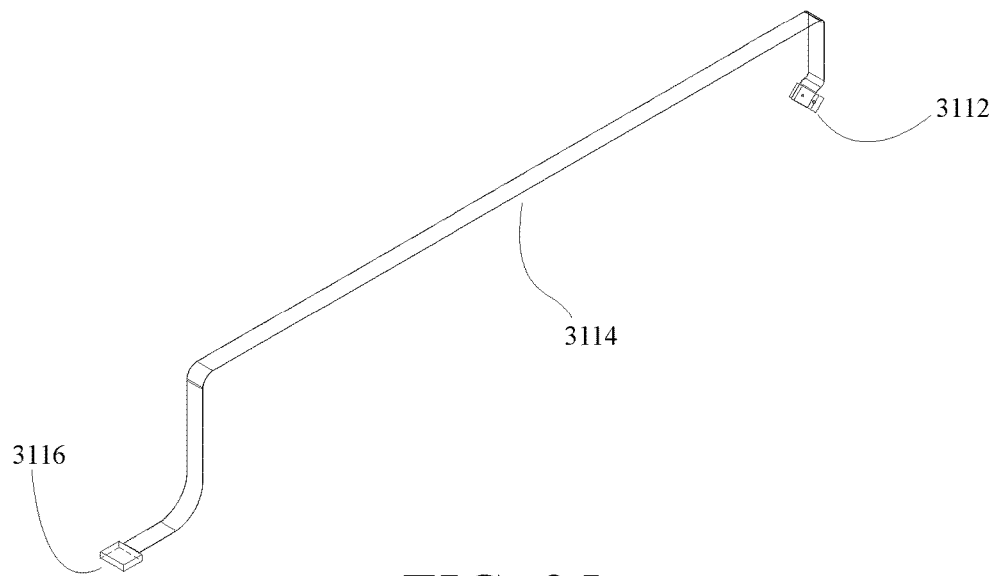

FIG. 35 shows an isometric view of the sensor 3112, sensor FFC 3114, and FFC connector 3116.

Figure 36:
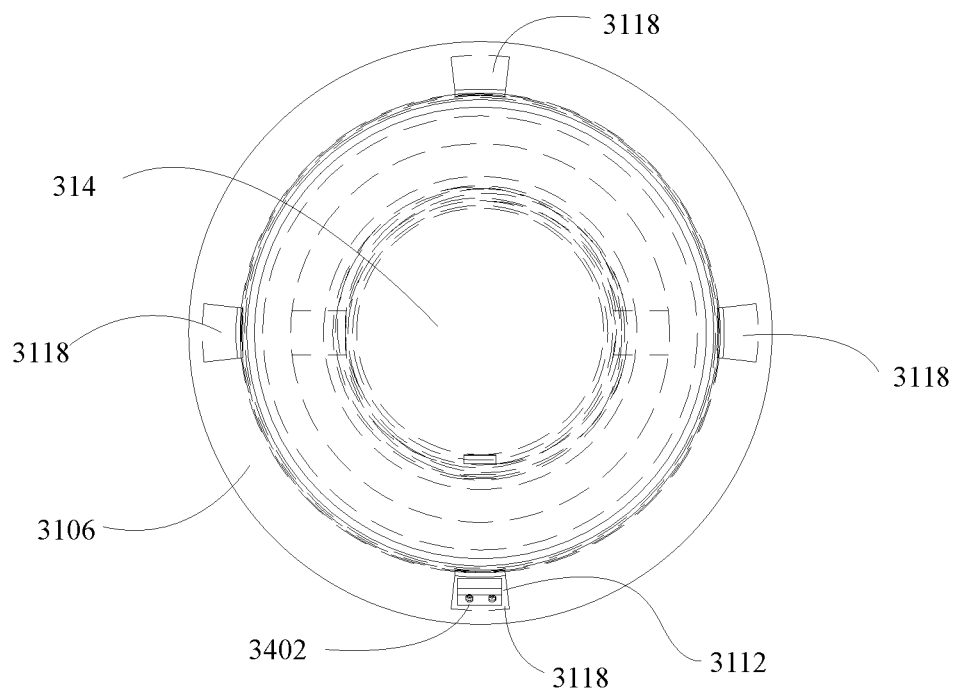

FIG. 36 shows a front view of the peephole viewer apparatus 3102. Front flange ring 3106 has one or more flange ring sensor recesses 3118. Sensor 3112 is placed inside of sensor recess 3118, which has flange ring sensor apertures 3402 to allow the sensor to see or hear through the flange ring 3106.

Figure 37:
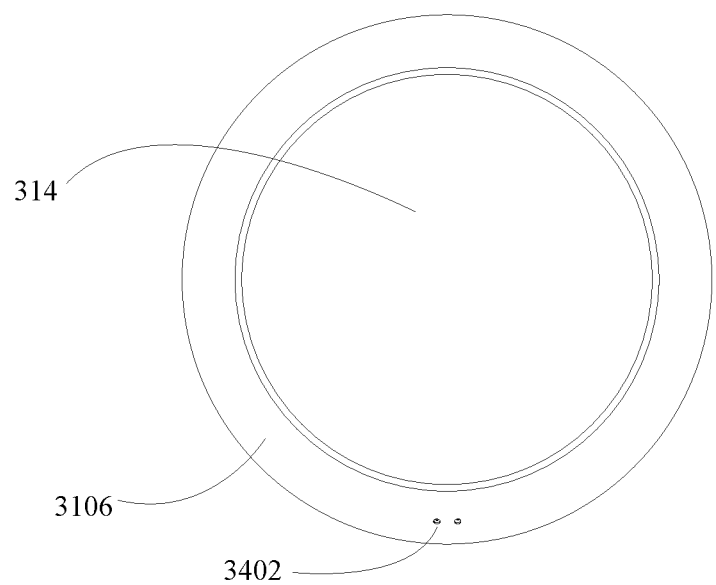

FIG. 37 shows a front view of the peephole viewer apparatus 3102. This is the same view as FIG. 36, but it is an opaque view to show front surface details. Front flange ring 3106 holds primary lens 314 in place. Flange ring sensor apertures 3402 allow sound or light to pass through flange ring 3106 to reach the sensor 3112 inside.

Note that although the figures show four sensor recesses 3118, there may be more or fewer in a practical implementation, depending on need. The sensor recesses 3118 may be placed anywhere around the flange ring 3106. Also note that only one sensor 3112 is shown in the figures. More sensors may be added to make use of any sensor recesses 3118 available.

Operation—FIGS. 31, 32, 33, 34, 35, 36, 37—Embodiment J

The peephole viewer apparatus with integrated sensors 3102 is meant to be installed on a door, such that the person on the indoor side of the door may look through the peephole viewer and see what is on the other side of the door. The peephole viewer's lenses are arranged such that the viewer provides a wide-angle field of view through the door.

The peephole viewer apparatus 3102 described in this embodiment includes one or more integrated sensors 3112 which are placed within the flange ring 3106. When installed on the door, this flange ring 3106 is on the outside surface of the door. Thus any sensors 3112 in the flange ring 3106 can see or hear through flange ring sensor apertures 3402 to the space on the outdoors side of the door. Each sensor 3112 has a sensor FFC 3114, which passes data and power through the housing tubes 3108 and 3110. This allows the sensor to connect to a host microcontroller or CPU on the indoors side of the door. Such a microcontroller or CPU may then access the sensor 3112 data. If the sensor 3112 is a proximity sensor, the CPU or microcontroller may process the proximity data and determine whether there is activity on the other side of the door.

Such a CPU or microcontroller is described in a previous embodiment A. In FIG. 4A, CPU 414 connects via sensor communication network 422 to an external sensor 424. Any integrated sensor 3112 in the current embodiment may be used as external sensor 424 in FIG. 4A of embodiment A.

Detailed Description—FIGS. 41, 42, 43, 44—Embodiment L

Figure 41:
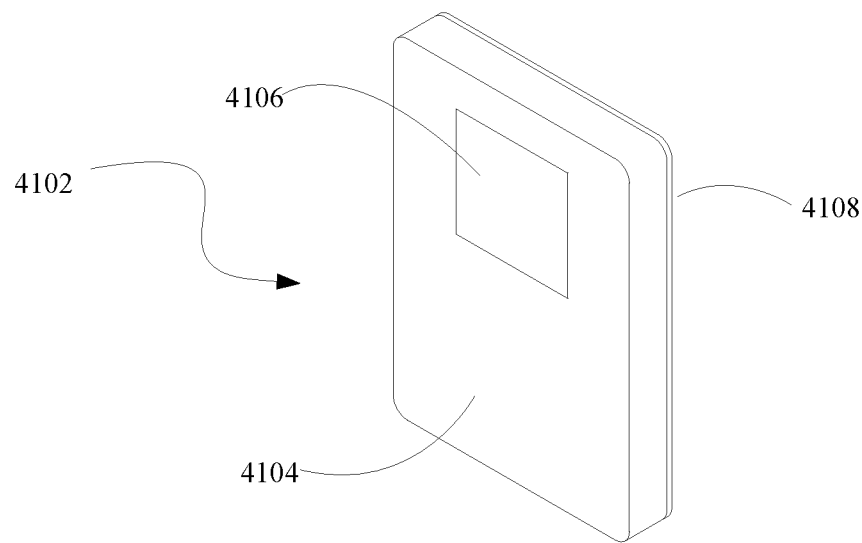

FIG. 41 shows an isometric view of wireless passive infrared sensor module 4102. Sensor module front housing 4104 has a lens 4106 on its surface, and rear housing 4108. Lens 4106 may be a Fresnel variety of lens, which is able to pass through light in the infrared range as required by a passive infrared sensor.

Figure 42:
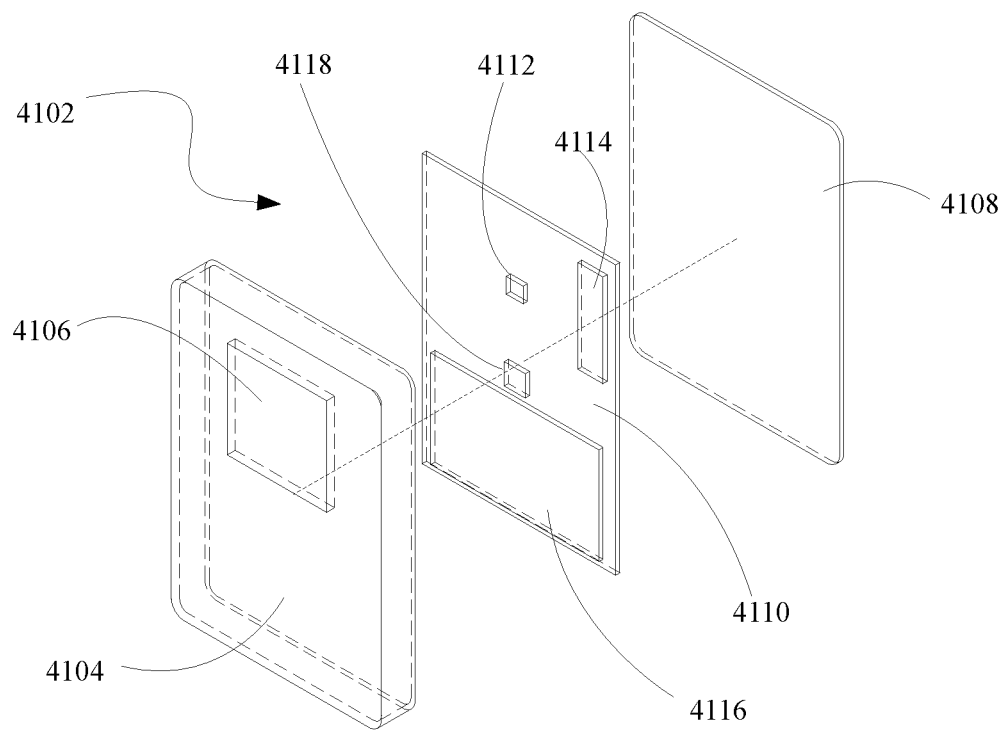

FIG. 42 shows an exploded isometric view of wireless passive infrared sensor module 4102. Sensor circuit board 4110 has a passive infrared sensor 4112, antenna 4114, battery 4116, and processor with rf transceiver 4118. The circuit board 4110 is held between front housing 4104 and rear housing 4108. Housing 4104 and 4108 are rigidly attached together, for example, by mechanical means or ultrasonic welding. Front housing 4104 has lens 4106 positioned over passive infrared sensor 4112. An example Fresnel lens which is 2 cm by 3 cm in width and height is placed 8 millimeters above sensor 4112 for the best performance in infrared light collection.

Figure 43:
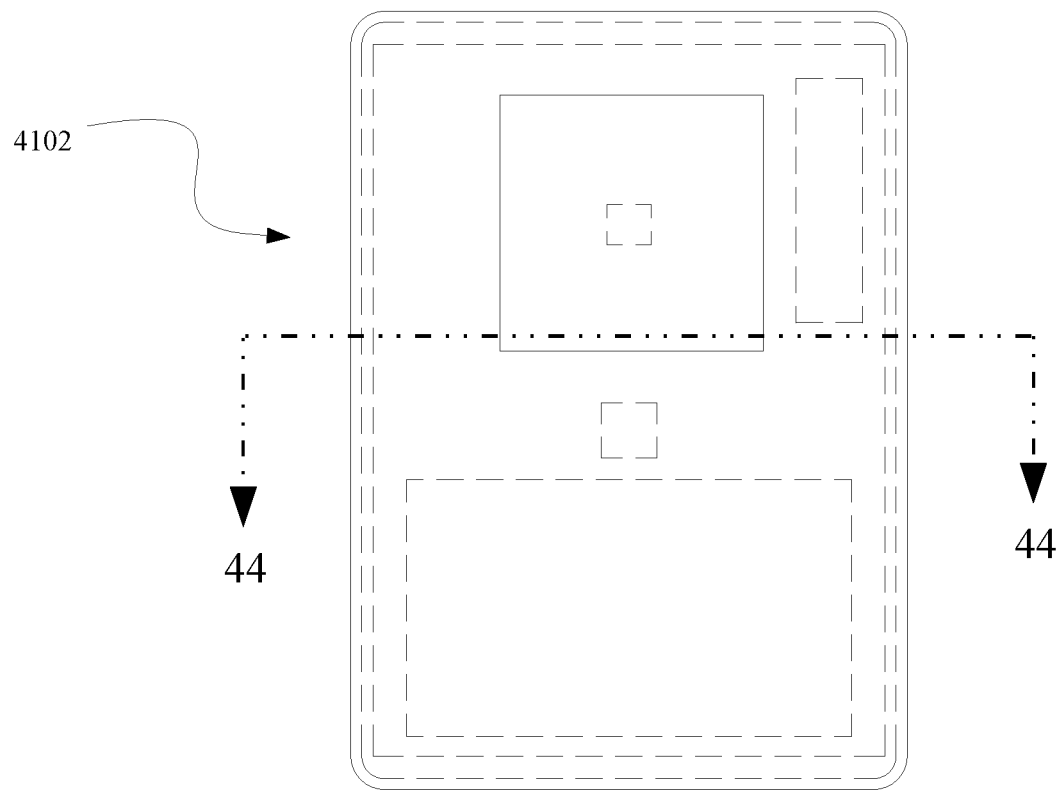
Figure 44:
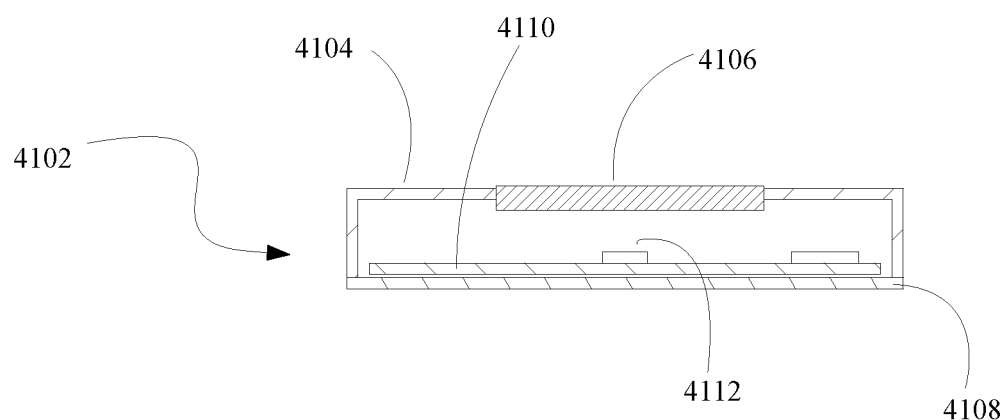

FIG. 43 shows a top view of sensor module 4102. FIG. 44 shows a side cross-section view of sensor module 4102.

Operation—FIGS. 41, 42, 43, 44—Embodiment L

Wireless passive infrared sensor module 4102 may be used to remotely detect proximity of a person or animal. Overall, the module 4102 may be very small. In one design, the nominal size of module 4102 is 4 cm wide, 3 cm long, and 8 mm thick. This makes the module 4102 very inconspicuous, and easy to place anywhere in the area outside of the door for remote proximity detection. The bottom side of the module 4102 may be backed with adhesive tape to mount on the door frame, the door, or a wall.

The lens 4106 focuses infrared light from a very wide field of view onto passive infrared sensor 4112. The processor with rf transceiver 4118 on the circuit board 4110 processes the sensor 4112 output and determines whether a person is present. When a person is determined to be present, the processor 4118 transmits a message using antenna 4114 indicating that activity is detected.

Battery 4116 provides power to the circuit board and all components. This type of system requires very little power, and can generally run for up to ten years on a single CR2032 lithium coin cell battery (see https://www.ti.com/tool/TIDA-01398)

The processor with rf transceiver 4118 may use any low power radio frequency protocol to transmit the "activity present" message. Some examples are Bluetooth, Zigbee, ANT, or other proprietary radio frequency communication protocols. Alternatively, a different type of transceiver could be used, replacing radio frequency transmission. Other types of transceivers could be used including infrared, sound, or other types of light-based communication. Alternatively, a wired method of communication could be used such as RS485, UART, Ethernet, I2C, or SPI.

Sensor module 4102 may thereby act as external sensor 424 in FIG. 4A of embodiment A. In FIG. 4A, CPU 414 connects via sensor communication network 422 to an external sensor 424.

Figure 38:
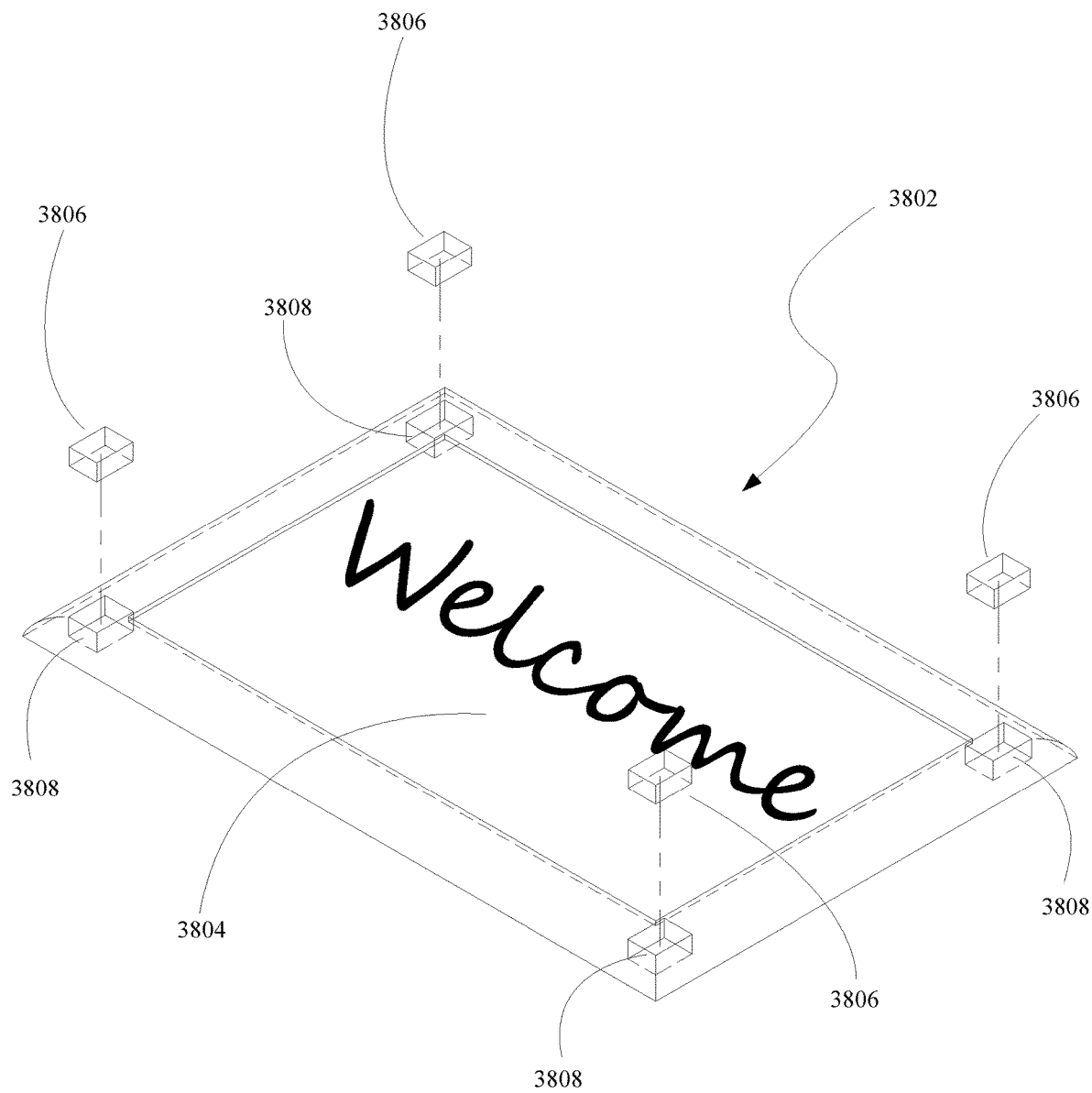
Figure 39:
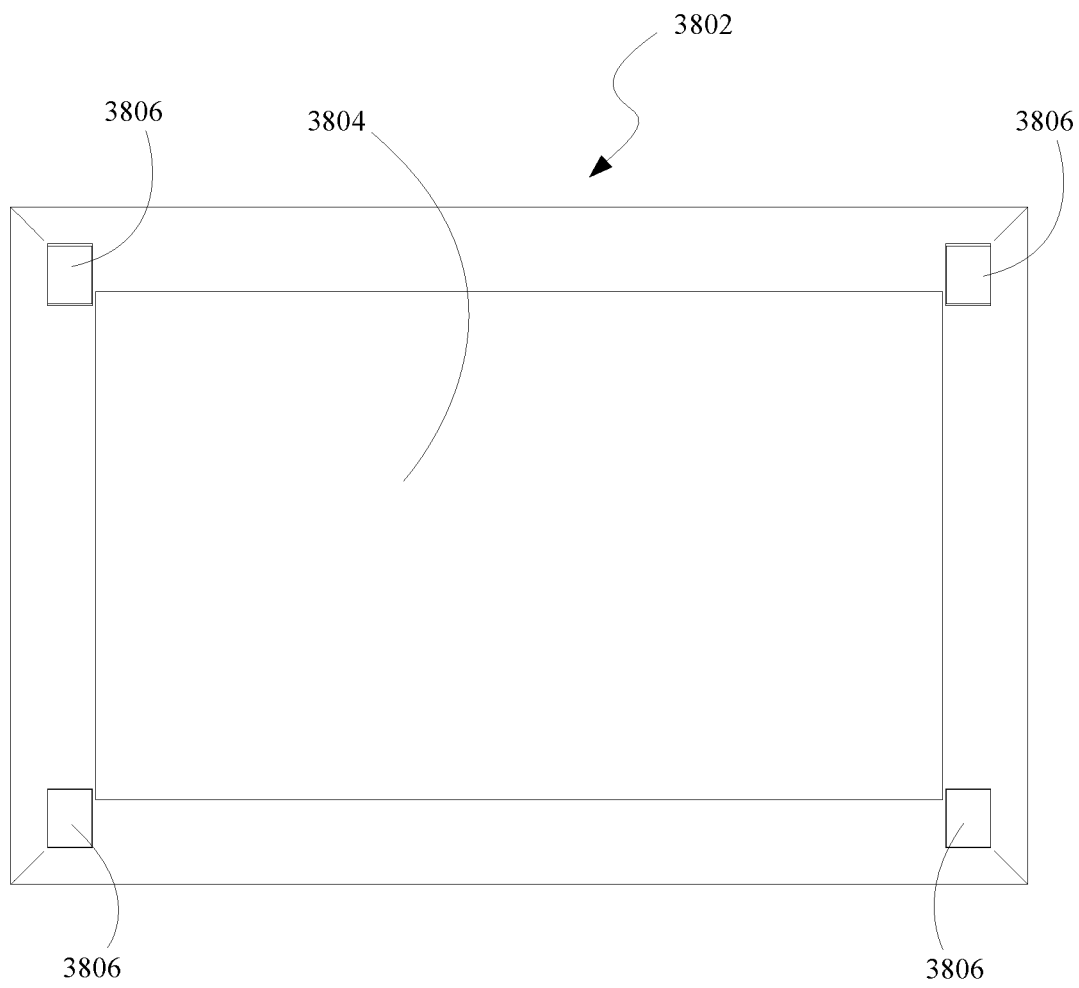
Figure 40:
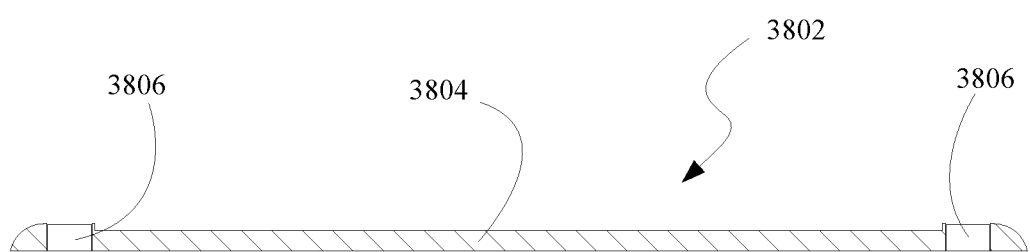

Detailed Description—FIGS. 38, 39, 40—Embodiment K

FIG. 38 shows an exploded isometric view of welcome mat with integrated sensors 3802. Mat 3804 is a typical rectangular piece of material, such as one might place in front of one's entry door to a home. Around the border edge of mat 3804 are a number of sensor module recesses 3808. Within each recess 3808 is a sensor module 3806. This sensor module 3806 may be, for instance, a wireless passive infrared sensor module as described in embodiment L. As shown in FIG. 42, the wireless passive infrared sensor module 4102 has a lens 4106, which in this case is a Fresnel lens. In general, Fresnel lenses designed for passive infrared usage are either translucent white material, or black, with a smooth or matte texture. The border around the mat 3804 may be composed of a similar material to match the appearance of the Fresnel lens. This makes it blend in with the appearance of mat 3804 such that a person looking at the mat will not notice it.

FIG. 39 shows a top view of welcome mat 3802. A sensor module 3806 is found in each corner of the mat 3804. FIG. 40 shows a side view of the welcome mat 3802.

In this embodiment, the sensor modules 3806 preferably use passive infrared such as the wireless passive infrared sensor module 4102 in embodiment L. Alternatively, other types of sensors could be used.

Note that four sensor modules 3808 are shown, but there may be more or as few as one sensor module 3808. The modules 3808 are shown in the corners of mat 3804, but they may be located anywhere on the mat.

An alternative in this welcome mat embodiment is using the same concept in the form of a welcome sign. Instead of placing it on the floor, it may be hung on the door. In this case, the sensor modules 3808 may be placed anywhere on the surface of the sign. One or more sensor modules 3808 may be placed under the background of the sign, or under the text. This is optimal if a large, thick black font is used. In this case, a black Fresnel lens may be used inside of one or more of the letters in the welcome message on the sign. The black material used for the letters can be chosen to match the Fresnel lens such that the lens is not noticeable.

Any number of ornamental designs may be used for this type of sign, and the same for the welcome mat.

Operation—FIGS. 38, 39, 40—Embodiment K

The user places the welcome mat 3802 outside of the entry door, such as on a porch or main doorway to an apartment, condo, or house. Once in place, the sensor modules 3808 may monitor the area in front of the doorway or porch.

Preferably, sensor modules 3808 are implemented as the wireless passive infrared sensor module 4102 in embodiment L. In this case, each sensor module 3808 may thereby act as external sensor 424 in FIG. 4A of embodiment A. In FIG. 4A, CPU 414 connects via sensor communication network 422 to an external sensor 424.

As few as one sensor module 3808 may be used in mat 3802. The welcome mat is intended to be stepped upon, and people may wipe their dirty shoes on it upon entering the home. Adding more sensors may be beneficial, in case one or more of the sensor module 3808 on the mat 3802 becomes occluded by dirt or grime from shoes as they tread upon the mat 3802.

Note that although the sensor module 4102 is described as similar to embodiment L, any type of proximity sensor module could be used. Another example of a proximity sensor is in embodiment M and embodiment N.

Figure 45:
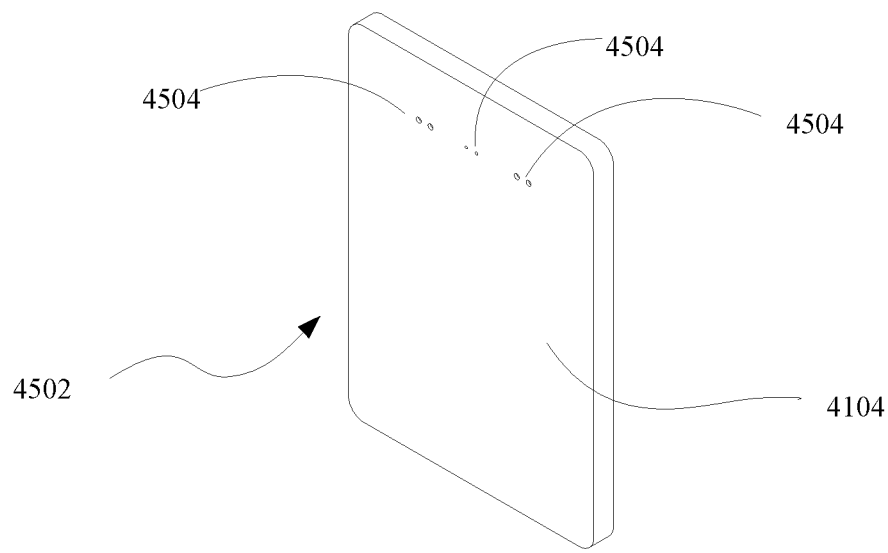
Figure 46:
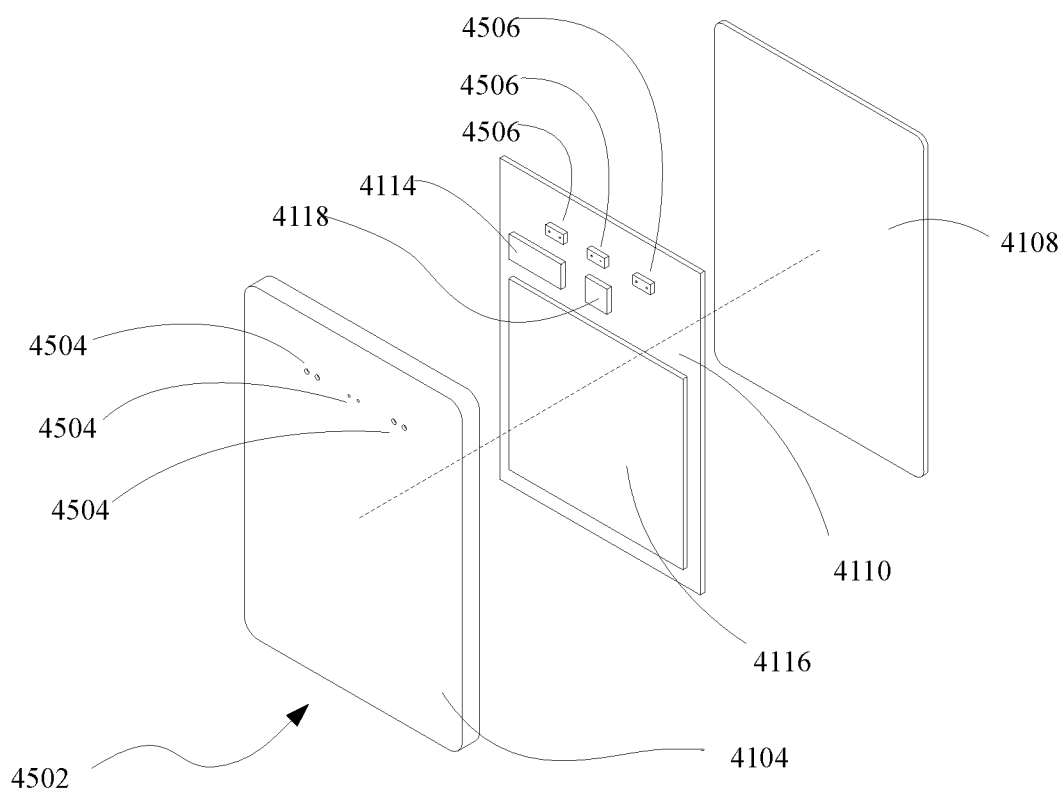

Detailed Description—FIGS. 45, 46—Embodiment M

FIG. 45 an isometric view of wireless proximity sensor module 4502. Sensor module front housing 4104 has a plurality of proximity sensor housing apertures 4504 on its surface.

FIG. 46 is an exploded isometric view of wireless proximity sensor module 4502. Sensor module front housing 4104 is shown with a plurality of proximity sensor housing apertures 4504 on its surface. Sensor circuit board 4110 has a one or more proximity sensors 4506, antenna 4114, battery 4116, and processor with rf transceiver 4118. The circuit board 4110 is held between front housing 4104 and rear housing 4108. Housing 4104 and 4108 are rigidly attached together, for example, by mechanical means or ultrasonic welding.

Note that the sensors 4506 may be of any variety including but not limited to time-of-flight, passive infrared, image or camera-based, microphone, LIDAR, ultrasonic, or other type of proximity sensor.

Operation—FIGS. 45, 46—Embodiment M

This embodiment is similar to embodiment L, but instead of using passive infrared sensors it uses active proximity sensors. In this embodiment, the wireless proximity sensor module 4502 uses one or more proximity sensors 4506. These proximity sensors are preferably time-of-flight sensors, which can report proximity of an object. In this case, each sensor 4506 requires only two small apertures 4504 to emit and collect infrared light. An example sensor is about three millimeters in length, and two millimeters wide. The required sensor apertures may be as small as one millimeter in diameter.

In general, a time-of-flight sensor has a field of view of about thirty degrees. Thus, multiple sensors may be added with overlapping fields of view to cover a larger, virtual field of view.

Wireless proximity sensor module 4502 may be used to remotely detect proximity of a person. The processor with rf transceiver 4118 on the circuit board 4110 processes the proximity sensors 4506 outputs and determines whether a person is present. When a person is determined to be present, the processor 4118 transmits a message using antenna 4114 indicating that activity is detected.

Battery 4116 provides power to the circuit board and all components. An external port may be added to recharge the battery 4116.

The processor with rf transceiver 4118 may use any low power radio frequency protocol to transmit the "activity present" message. Some examples are Bluetooth, Zigbee, ANT, or other proprietary radio frequency communication protocols. Alternatively, a different type of transceiver could be used, replacing radio frequency transmission. Other types of transceivers could be used including infrared, sound, or other types of light-based communication. Alternatively, a wired method of communication could be used such as RS485, UART, Ethernet, I2C, or SPI.

In this embodiment, the "activity present" message may include extra information such as estimated proximity distance.

Wireless proximity sensor module 4502 may thereby act as external sensor 424 in FIG. 4A of embodiment A. In FIG. 4A, CPU 414 connects via sensor communication network 422 to an external sensor 424. In this type of a setup, the user would mount the sensor somewhere on the outside area of the doorway. For instance, the user could use adhesive tape to attach the module 4502 to the door frame, wall, or outside surface of the door.

Sensors 4506 are preferably time-of-flight sensors, which are extremely small. Therefore, the sensor module 4502 can be made very thin and low profile. It is possible to make the module less than a few millimeters in thickness. In addition, the top surface of the module 4502 may be customized with any type of material or finish. Thus, it can be customized to match the surface on which it is mounted. This makes the module 4502 difficult to notice by an observer.

In one design, the nominal size of module 4502 is 4 cm wide, 3 cm long, and 3 mm thick. This makes the module 4102 very inconspicuous, and easy to place anywhere in the area outside of the door for remote proximity detection. Module 4502 may be backed with adhesive tape for easy mounting on the door, door frame, wall, or any surface in the area outside of the door.

Detailed Description—FIGS. 47, 48, 49, 50—Embodiment N

Embodiment N is a variation of the embodiment M. In this embodiment, a plurality of proximity sensors are mounted at varying angles to allow a wide virtual field of view.

Figure 47:
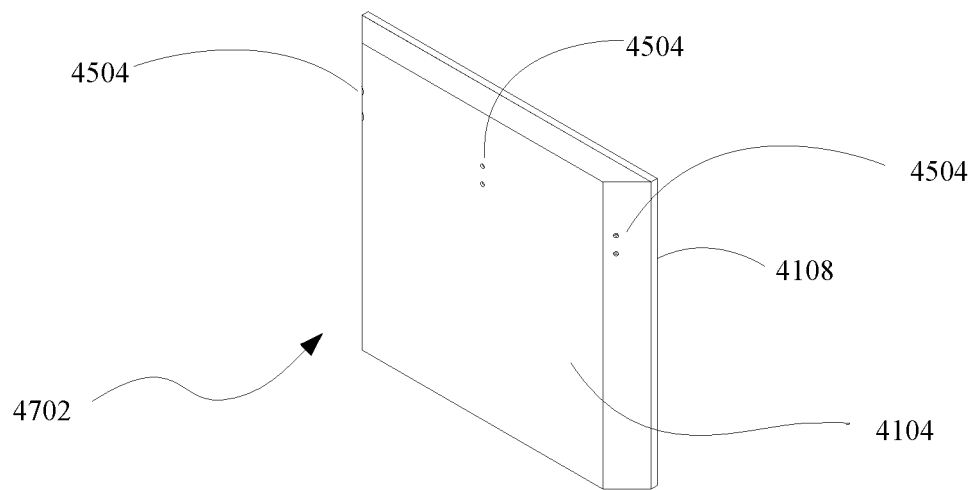

FIG. 47 shows an isometric view of wireless proximity sensor module A 4702. Sensor module front housing 4104 has a plurality of proximity sensor housing apertures 4504 on its surface. Rear housing 4108 is attached to front housing 4104.

Figure 48:
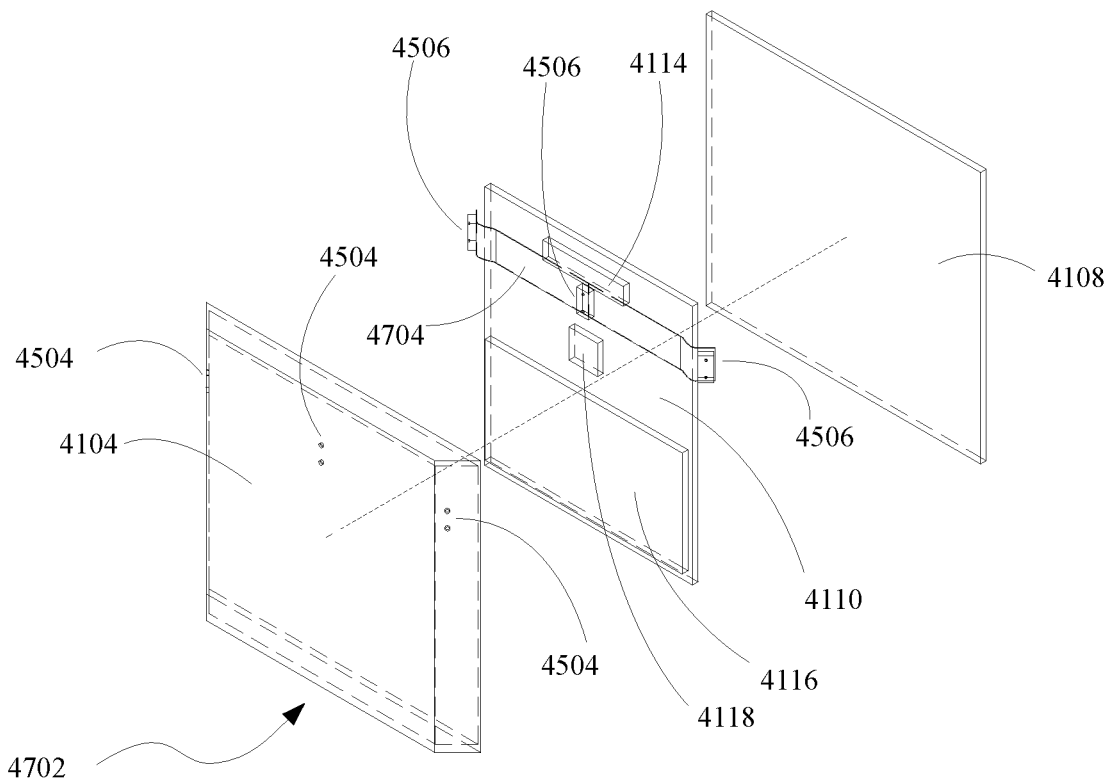

FIG. 48 shows an exploded isometric view of wireless proximity sensor module A 4702. Sensor module front housing 4104 is shown with a plurality of proximity sensor housing apertures 4504 on its surface. Sensor circuit board 4110 has a one or more proximity sensors 4506 mounted on sensor flexible printed circuit 4704, antenna 4114, battery 4116, and processor with rf transceiver 4118. The circuit board 4110 is held between front housing 4104 and rear housing 4108. Housing 4104 and 4108 are rigidly attached together, for example, by mechanical means or ultrasonic welding. In this embodiment, sensors 4506 are mounted on a flexible printed circuit 4704, which is connected to circuit board 4110. This allows the sensors 4506 to be mounted at varying angles by bending the flexible printed circuit 4704 where needed.

Note that the sensors 4506 may be of any variety including but not limited to time-of-flight, passive infrared, image or camera-based, microphone, LIDAR, ultrasonic, or other type of proximity sensor.

Figure 49:
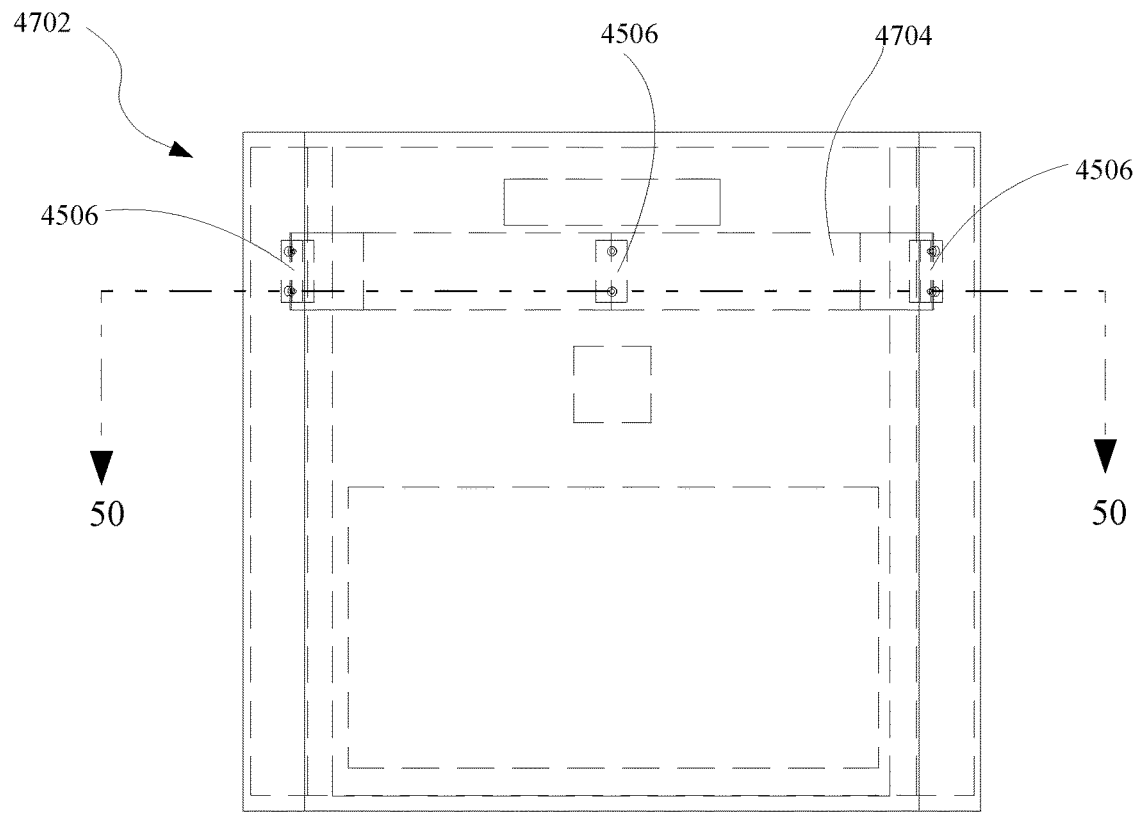

FIG. 49 shows a top view of wireless proximity sensor module A 4702.

Figure 50:
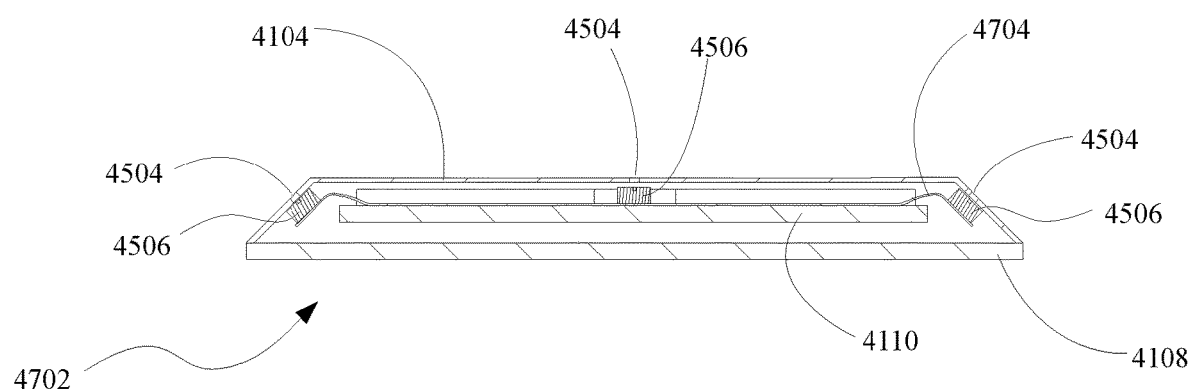

FIG. 50 shows a side cross-section view of wireless proximity sensor module A 4702.

Operation—FIGS. 47, 48, 49, 50—Embodiment N

The operation of this embodiment is virtually the same as the previous embodiment M. The primary difference is that the sensors 4506 are mounted on a flexible printed circuit 4704 at varying angles, to increase the overall virtual field of view. Otherwise, please refer to the operation description for embodiment M.

In one design, the nominal size of module 4702 is 4 cm wide, 3 cm long, and 3 mm thick. This makes the module 4702 very inconspicuous, and easy to place anywhere in the area outside of the door for remote proximity detection. Module 4702 may be backed with adhesive tape for easy mounting on the door, door frame, wall, or any surface in the area outside of the door.

Figure 51:
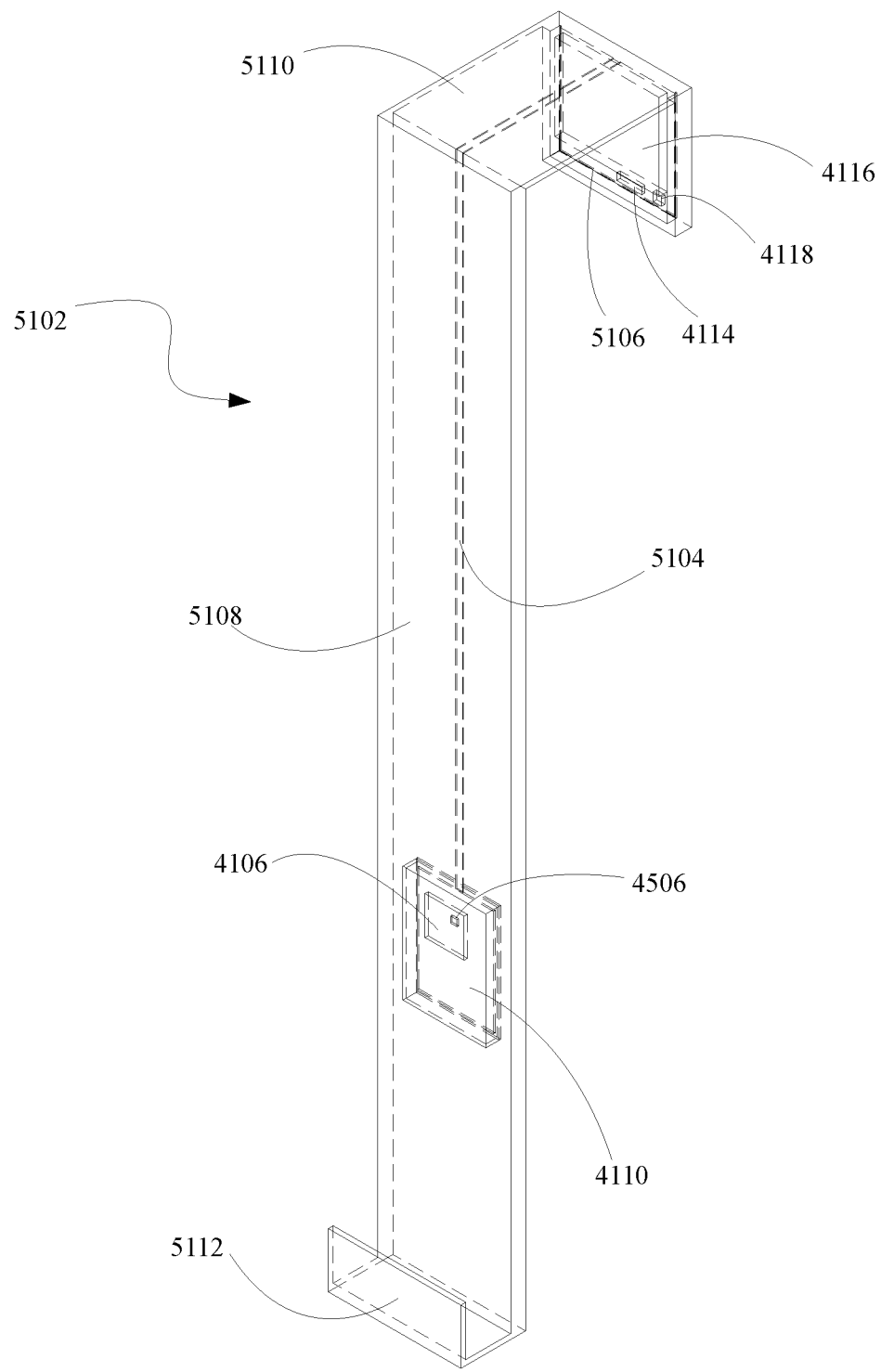

Detailed Description—FIG. 51—Embodiment P

This embodiment is door hanger which has an embedded proximity sensor.

FIG. 51 shows an isometric view of the door hanger sensor apparatus 5102. Door hanger 5108 is an elongated "S" shaped hanger designed to hang on a door. Door hanger top hook 5110 hooks over the top of the door, and it is thin enough to fit between the top of the door and the door frame. Hanger outside hook 5112 is allows the user to hang a sign, wreath, or other festive decoration on the outer side of the door. The length between the top hook 5110 and outside hook 5112 can be varied depending on the desired height of outside hook 5112 above the floor.

Embedded inside of hanger 5108 is proximity sensor 4506, which is facing the outside surface of the hanger 5108. In this embodiment sensor 4506 is a passive infrared sensor. Flush with the outside facing surface of hanger 5108 is a lens 4106. Lens 4106 is mounted such that it focuses a wide field of view of infrared light onto sensor 4506. The surface material of hanger 5108 can match the color and surface finish of the lens 4106, such that a person looking at the hanger apparatus 5102 cannot notice the lens 4106.

Sensor 4506 is mounted on sensor circuit board 4110. A sensor power and data cable 5104 connects to circuit board 4110 and travels along the hanger 5108 upwards, past the top hook 5110. It there connects to processor circuit board 5106, which is mounted inside a cavity on the hanger 5108. When the hanger apparatus 5102 is hung on the door, this cavity with circuit board 5106 will be on the inside facing side of the door.

Circuit board 5106 has a processor with rf transceiver 4118, antenna 4114, and battery 4116. Cable 5104 connects the processor 4118 to proximity sensor 4506. Cable 5104 also provides power to the sensor 4506.

In this embodiment, the sensor 4506 preferably use passive infrared in a similar fashion as the wireless passive infrared sensor module 4102 in embodiment L. Alternatively, sensor 4506 could use a time-of-flight sensor as described in embodiment M. If a time-of-flight sensor is used, then lens 4106 would be eliminated, and replaced with sensor apertures 4504 as shown in FIG. 46.

Note that while only one sensor 4506 is shown, there may be more added if desired. They may be placed anywhere on the outer surface of hanger 5108.

Also note that while sensor 4506 is described as a passive infrared sensor or time-of-flight sensor, a variety of types of external sensors may be used. Such types of sensors include but are not limited to microphones, LIDAR, ultrasonic, FLIR, or imaging sensors.

Operation—FIG. 51—Embodiment P

Door hangers are common, and allow the user to hang a sign, ornament, or festive decoration on the outside surface of the door, without permanent modification of the door. The door hanger sensor apparatus 5102 works in the same way, but adds a proximity sensor to detect when there is activity outside of the door.

The apparatus 5102 works in the same way as the wireless passive infrared sensor module described in embodiment L. However, the sensor circuit board 4110 is separated from the processor circuit board 5106, connected by sensor power and data cable 5104. This cable 5104 may be a standard multi-conductor cable, a flat flexible cable (FFC), or a flat printed circuit (FPC).

The bulkier components are the circuit board 5106 with battery 4116, and these are mounted on the indoors side of the door. This allows the hanger 5108 section with the sensor 4506 to be very thin.

Functionally, the operation of the sensor 4506 is very close to embodiment L. Refer to embodiment L operation description for more details.

The processor with rf transceiver 4118 may use any low power radio frequency protocol to transmit the "activity present" message. Some examples are Bluetooth, Zigbee, ANT, or other proprietary radio frequency communication protocols. Alternatively, a different type of transceiver could be used, replacing radio frequency transmission. Other types of transceivers could be used including infrared, sound, or other types of light-based communication.

The door hanger sensor apparatus 5102 may thereby act as external sensor 424 in FIG. 4A of embodiment A. In FIG. 4A, CPU 414 connects via sensor communication network 422 to an external sensor 424. In the current embodiment the communication method is described as a low power radio frequency method.

Alternatively, a wired connection could be used to connect processor circuit board 5106 from the current embodiment to CPU 414 from embodiment A, as shown in FIG. 4A. This would involve adding a cable from the circuit board 5106 and connecting it to the peephole viewer camera apparatus 108 in embodiment A. Doing so would make it possible to eliminate battery 4116, as the apparatus 5102 could consume power from apparatus 108 via the added cable.

Figure 52:
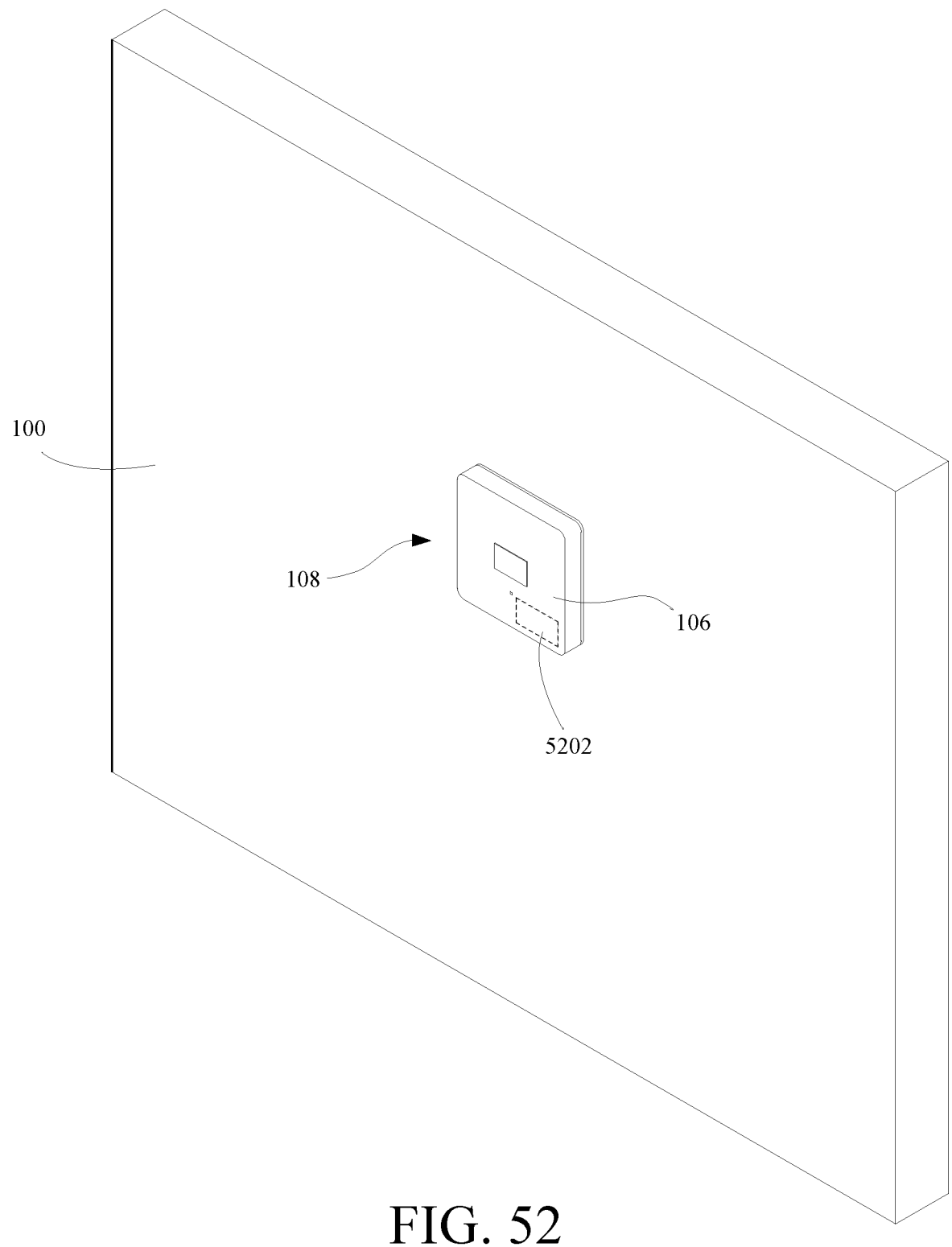

Detailed Description—FIG. 52—Embodiment Q

FIG. 52 shows an isometric view of the peephole viewer camera apparatus 108 of this embodiment. The apparatus 108 is very similar to embodiment A, but includes a keyholder magnet 5202 on the front facing surface of camera apparatus front housing 106.

Magnet 5202 may be embedded under the surface of housing 106, such that it is not visible and the housing 106 has a uniform surface finish of any color. The surface of housing 106 may offer a visual indication that the area underneath has a magnet.

Alternatively, the magnet may be placed on the surface of housing 106 such that it offers a visual cue to the user that it is a magnetized area.

Note that although the magnet 5202 is shown in the lower right corner of housing 106, it may be located anywhere on housing 106. Likewise, its size and shape may be varied from its depiction in the drawing.

Operation—FIG. 52—Embodiment Q

Key-holder magnet 5202 is a convenience feature of apparatus 108. When installed on the door 100 over the peephole viewer, the apparatus 108 is easy to reach, at about shoulder height on most doors. The person may place his keys on key-holder magnet 5202, and they will stick to the surface of apparatus 108.

For people who are physically disabled or in a wheelchair, the door to their home likely has a peephole door viewer installed at a lower accessible height. Therefore, the apparatus 108 will still be within easy reach and the key-holder magnet 5202 feature is still accessible.

Conclusions, Ramifications and Scope

The above description of illustrated implementations, including what is described in the Abstract, is not intended to be exhaustive or to limit the scope of the disclosure to the precise forms disclosed. While specific implementations of, and examples for, the embodiments disclosed herein are described herein for illustrative purposes, various equivalent modifications are possible within the scope of the disclosure, as those skilled in the relevant art will recognize.

The invention claimed is:

1. Apparatus for monitoring activity on the outdoors-facing side of a door through the door's integrated peephole viewer, mounted on the indoors-facing side of the door, comprising a main housing with:
   a) An image sensor with one or more lenses;
   b) a mirror mounted at 45 degree offset between the image sensor optical axis and the door's peephole viewer optical axis, such that the mirror redirects the optical path, aligning the optical axis of the image sensor and lenses with the door's peephole viewer optical axis, providing a view through the door's peephole viewer;
   c) A CPU and video processor configured to collect and store image and video activity data seen through the peephole viewer;
   d) A communications module configured to transmit image, video, and activity data over a communication network to a local server or cloud server.

2. The apparatus according to claim 1 such that the 45-degree mirror is mounted on a hinge, additionally comprising an electronic actuator which is configured to flip the mirror up and out of the way when a person is in close proximity, allowing the person a clear view through the peephole viewer.

3. The apparatus according to claim 1 such that the 45-degree mirror is mounted on a hinge with an attached lever configured to be manually rotated by the user, allowing the mirror to flip up and out of the way, allowing the user a clear view through the peephole viewer.

4. The apparatus according to claim 1, additionally comprising one or more internal sensors configured to gather activity data representing activity on either sides of the door.

5. Apparatus for monitoring activity on the outdoors-facing side of a door through the door's integrated peephole viewer, mounted on the indoors-facing side of the door, comprising:
   a) a main housing which is removable from the door, has physical alignment features and magnets, additionally comprising a door bracket with physical alignment features and magnets, which is, attached to the door by means of removable adhesive, configured to physically couple with the apparatus' removable main housing;
   b) An image sensor with one or more lenses, such that the image sensor and lenses have an optical path providing a view through the door's peephole viewer;
   c) A CPU and video processor configured to collect and store image and video activity data seen through the peephole viewer;
   d) A communications module configured to transmit image, video, and activity data over a communication network to a local server or cloud server.

6. The apparatus according to claim 5 additionally comprising a ring whose inner diameter matches the outer diameter of the door's peephole viewer, physically supporting the apparatus' main housing when mounted on the door, and allowing non-permanent mounting to the door.

7. The apparatus according to claim 5, additionally comprising one or more internal sensors configured to gather activity data representing activity on either sides of the door.

8. Apparatus for monitoring activity on the outdoors-facing side of a door through the door's integrated peephole viewer, mounted on the indoors-facing side of the door, comprising a main housing with:
   a) An image sensor with one or more lenses, such that the image sensor and lenses have an optical path providing a view through the door's peephole viewer;
   b) A CPU and video processor configured to collect and store image and video activity data seen through the peephole viewer;
   c) A communications module configured to transmit image, video, and activity data over a communication network to a local server or cloud server;
   d) one or more external sensors connected via a sensor communication network such that at least one of the connected external sensors is a peephole viewer device comprising: front and rear threaded housing tubes for installation through the door; one or more lenses; front flange with integrated sensors configured to gather occupancy information about the outdoors-facing side of the door; and a cable for connection to the apparatus via the sensor communication network.

9. The apparatus according to claim 8, additionally comprising one or more internal sensors configured to gather activity data representing activity on either sides of the door.

10. Apparatus for monitoring activity on the outdoors-facing side of a door through the door's integrated peephole viewer, mounted on the indoors-facing side of the door, comprising a main housing with:
    a) An image sensor with one or more lenses, such that the image sensor and lenses have an optical path providing a view through the door's peephole viewer;
    b) A CPU and video processor configured to collect and store image and video activity data seen through the peephole viewer;
    c) A communications module configured to transmit image, video, and activity data over a communication network to a local server or cloud server;
    d) one or more external sensors connected via a sensor communication network such that at least one of the connected external sensors is a welcome mat device, comprising a welcome mat with embedded proximity sensors to be placed on the floor of the outdoors-facing side of the door, configured to connect to and communicate with the apparatus via the sensor communication network.

11. The apparatus according to claim 10, additionally comprising one or more internal sensors configured to gather activity data representing activity on either sides of the door.

12. Apparatus for monitoring activity on the outdoors-facing side of a door through the door's integrated peephole viewer, mounted on the indoors-facing side of the door, comprising a main housing with:
   a) An image sensor with one or more lenses, such that the image sensor and lenses have an optical path providing a view through the door's peephole viewer;
   b) A CPU and video processor configured to collect and store image and video activity data seen through the peephole viewer;
   c) A communications module configured to transmit image, video, and activity data over a communication network to a local server or cloud server;
   d) one or more external sensors connected via a sensor communication network such that at least one of the connected external sensors is a wireless proximity sensor module with a plurality of proximity sensors, mounted at angles between zero and 120 degrees, to allow a wide virtual field of view, configured to connect to and communicate with the apparatus via the sensor communication network.

13. The apparatus according to claim 12, additionally comprising one or more internal sensors configured to gather activity data representing activity on either sides of the door.

14. Apparatus for monitoring activity on the outdoors-facing side of a door through the door's integrated peephole viewer, mounted on the indoors-facing side of the door, comprising a main housing with:
   a) An image sensor with one or more lenses, such that the image sensor and lenses have an optical path providing a view through the door's peephole viewer;
   b) A CPU and video processor configured to collect and store image and video activity data seen through the peephole viewer;
   c) A communications module configured to transmit image, video, and activity data over a communication network to a local server or cloud server;
   d) one or more external sensors connected via a sensor communication network such that at least one of the connected external sensors is a door hanger with an embedded proximity sensor, configured to connect to and communicate with the apparatus via the sensor communication network.

15. The apparatus according to claim 14, additionally comprising one or more internal sensors configured to gather activity data representing activity on either sides of the door.

* * * * *